US010526516B2

(12) United States Patent
Parker et al.

(10) Patent No.: US 10,526,516 B2
(45) Date of Patent: Jan. 7, 2020

(54) PROTEIN ADHESIVES CONTAINING AN ANHYDRIDE, CARBOXYLIC ACID, AND/OR CARBOXYLATE SALT COMPOUND AND THEIR USE

(71) Applicant: Evertree, Paris (FR)

(72) Inventors: Anthony A. Parker, Newtown, PA (US); Joseph J. Marcinko, West Deptford, NJ (US)

(73) Assignee: Evertree, Venette (FR)

( * ) Notice: Subject to any disclaimer, the term of this patent is extended or adjusted under 35 U.S.C. 154(b) by 32 days.

(21) Appl. No.: 15/844,983

(22) Filed: Dec. 18, 2017

(65) Prior Publication Data

US 2018/0208817 A1    Jul. 26, 2018

Related U.S. Application Data

(63) Continuation of application No. 14/417,358, filed as application No. PCT/IB2013/002188 on Jul. 30, 2013, now Pat. No. 9,873,823.

(60) Provisional application No. 61/677,399, filed on Jul. 30, 2012.

(51) Int. Cl.
| | | |
|---|---|---|
| C09J 189/00 | (2006.01) | |
| C08K 3/015 | (2018.01) | |
| C09J 197/02 | (2006.01) | |
| D21H 17/14 | (2006.01) | |
| D21H 17/15 | (2006.01) | |
| D21H 17/22 | (2006.01) | |
| D21H 17/26 | (2006.01) | |
| D21H 17/30 | (2006.01) | |
| D21H 17/37 | (2006.01) | |
| D21H 17/00 | (2006.01) | |
| B32B 7/12 | (2006.01) | |
| B32B 15/01 | (2006.01) | |
| B32B 18/00 | (2006.01) | |
| B32B 21/04 | (2006.01) | |
| B32B 29/00 | (2006.01) | |
| B32B 37/06 | (2006.01) | |
| B32B 37/10 | (2006.01) | |
| B32B 37/12 | (2006.01) | |
| C08K 5/00 | (2006.01) | |
| C08K 5/09 | (2006.01) | |
| C08K 5/15 | (2006.01) | |
| C08L 97/02 | (2006.01) | |
| C09J 11/06 | (2006.01) | |
| D21H 17/36 | (2006.01) | |

(52) U.S. Cl.
CPC .............. *C09J 189/00* (2013.01); *B32B 7/12* (2013.01); *B32B 15/01* (2013.01); *B32B 18/00* (2013.01); *B32B 21/042* (2013.01); *B32B 29/005* (2013.01); *B32B 37/06* (2013.01); *B32B 37/10* (2013.01); *B32B 37/1284* (2013.01); *C08K 3/015* (2018.01); *C08K 5/0058* (2013.01); *C08K 5/09* (2013.01); *C08K 5/15* (2013.01); *C08L 97/02* (2013.01); *C09J 11/06* (2013.01); *C09J 197/02* (2013.01); *D21H 17/14* (2013.01); *D21H 17/15* (2013.01); *D21H 17/22* (2013.01); *D21H 17/26* (2013.01); *D21H 17/30* (2013.01); *D21H 17/37* (2013.01); *D21H 17/72* (2013.01); *B32B 2037/1253* (2013.01); *B32B 2260/021* (2013.01); *B32B 2260/04* (2013.01); *B32B 2315/02* (2013.01); *B32B 2315/08* (2013.01); *B32B 2317/12* (2013.01); *B32B 2317/18* (2013.01); *D21H 17/36* (2013.01); *Y10T 428/2865* (2015.01); *Y10T 428/31678* (2015.04); *Y10T 428/31982* (2015.04)

(58) Field of Classification Search
CPC ........................ C09J 189/00; C09J 2400/30
USPC ..... 428/535, 537.1, 478.4; 106/124.1, 125.1, 106/150.3, 156.1
See application file for complete search history.

(56) References Cited

U.S. PATENT DOCUMENTS

| | | | |
|---|---|---|---|
| 1,460,757 | A | 7/1923 | Johnson et al. |
| 2,271,620 | A | 2/1942 | Brier et al. |
| 2,381,407 | A | 8/1945 | Levinson et al. |
| 2,431,256 | A | 11/1947 | Keil et al. |
| 2,727,869 | A | 12/1955 | Ash et al. |
| 2,810,657 | A | 10/1957 | Preusser et al. |
| 2,881,076 | A | 4/1959 | Sair |
| 3,053,784 | A | 9/1962 | Herrick et al. |
| 3,075,930 | A | 1/1963 | Stewart et al. |
| 3,258,436 | A | 6/1966 | Stephens |
| 3,441,528 | A | 4/1969 | Dede, Jr. |
| 3,450,651 | A | 6/1969 | Carstensen |
| 3,489,633 | A | 1/1970 | Holmquist |

(Continued)

FOREIGN PATENT DOCUMENTS

| | | | |
|---|---|---|---|
| CN | 001418562 A | | 5/2003 |
| CN | 001698453 A | | 11/2005 |

(Continued)

OTHER PUBLICATIONS

Allen et al. (2010) "Investigations of the Molecular Interactions of Soy-Based Adhesives," Forest Products Journal 60(6):534-540.

(Continued)

*Primary Examiner* — Douglas J McGinty
(74) *Attorney, Agent, or Firm* — Dechert LLP

(57) ABSTRACT

The invention provides protein adhesives, and methods of making and using such adhesives. The protein adhesives contain a protein-bonding agent and plant protein composition, such as an isolated water-soluble protein fraction or ground plant meal obtained from plant biomass. The protein-bonding agent can be an anhydride compound, carboxylic acid compound, carboxylate salt compound, or combinations thereof. The protein adhesives are useful in bonding together lignocellulosic materials and other types of materials.

34 Claims, 23 Drawing Sheets

(56) References Cited

U.S. PATENT DOCUMENTS

| | | |
|---|---|---|
| 3,629,162 A | 12/1971 | Richardson et al. |
| 3,658,731 A | 4/1972 | Richardson et al. |
| 3,805,532 A | 4/1974 | Kistner |
| 3,897,581 A | 7/1975 | Nakatsuka et al. |
| 3,931,088 A | 1/1976 | Sakurada et al. |
| 3,965,051 A | 6/1976 | Markusch et al. |
| 3,965,056 A | 6/1976 | Stout et al. |
| 3,966,658 A | 6/1976 | Robitschek et al. |
| 3,966,971 A | 6/1976 | Morehouse et al. |
| 3,981,831 A | 9/1976 | Markusch et al. |
| 3,983,081 A | 9/1976 | Dieterich et al. |
| 4,052,347 A | 10/1977 | Dieterich et al. |
| 4,097,422 A | 6/1978 | Markusch |
| 4,097,423 A | 6/1978 | Dieterich |
| 4,098,645 A | 7/1978 | Hartdegen et al. |
| 4,105,594 A | 8/1978 | Dieterich et al. |
| 4,109,057 A | 8/1978 | Nakamura et al. |
| 4,129,696 A | 12/1978 | Markusch et al. |
| 4,144,205 A | 3/1979 | Hartman et al. |
| 4,153,764 A | 5/1979 | Blount |
| 4,170,697 A | 10/1979 | Blount |
| 4,185,147 A | 1/1980 | Blount |
| 4,211,848 A | 7/1980 | Blount |
| 4,220,757 A | 9/1980 | Blount |
| 4,226,982 A | 10/1980 | Blount |
| 4,241,194 A | 12/1980 | Blount |
| 4,243,757 A | 1/1981 | Blount |
| 4,246,360 A | 1/1981 | Brown et al. |
| 4,247,657 A | 1/1981 | Blount |
| 4,251,638 A | 2/1981 | Reischl |
| 4,283,311 A | 8/1981 | Blount |
| 4,293,456 A | 10/1981 | Reischl |
| 4,316,745 A | 2/1982 | Blount |
| 4,320,208 A | 3/1982 | Reischl et al. |
| 4,322,364 A | 3/1982 | Hughes et al. |
| 4,327,195 A | 4/1982 | Cioca et al. |
| 4,336,340 A | 6/1982 | Blount |
| 4,339,366 A | 7/1982 | Blount |
| 4,367,326 A | 1/1983 | Blount |
| 4,376,173 A | 3/1983 | Blount |
| 4,377,646 A | 3/1983 | Blount |
| 4,377,659 A | 3/1983 | Blount |
| 4,377,674 A | 3/1983 | Blount |
| 4,380,592 A | 4/1983 | Blount |
| 4,382,136 A | 5/1983 | Blount |
| 4,383,049 A | 5/1983 | Blount |
| 4,383,089 A | 5/1983 | Blount |
| 4,390,450 A | 6/1983 | Gibson et al. |
| RE31,340 E | 8/1983 | Blount |
| 4,451,638 A | 5/1984 | Blount |
| 4,478,938 A | 10/1984 | Freedman |
| 4,497,862 A | 2/1985 | Cioca et al. |
| 4,528,154 A | 7/1985 | Nguyen et al. |
| 4,609,690 A | 9/1986 | Gruber et al. |
| RE32,476 E | 8/1987 | Kistner |
| 4,689,381 A | 8/1987 | Krinski et al. |
| 4,711,911 A | 12/1987 | Blount |
| 5,015,677 A | 5/1991 | Benedict et al. |
| 5,035,902 A | 7/1991 | Bilinski et al. |
| 5,130,404 A | 7/1992 | Freeland |
| 5,133,991 A | 7/1992 | Norman et al. |
| 5,273,773 A | 12/1993 | Katayama et al. |
| 5,348,760 A | 9/1994 | Parker et al. |
| 5,366,550 A | 11/1994 | Schad |
| 5,506,285 A | 4/1996 | Timm et al. |
| 5,523,293 A | 6/1996 | Jane et al. |
| 5,607,633 A | 3/1997 | Sleeter et al. |
| 5,648,420 A | 7/1997 | Fujiwara et al. |
| 5,656,689 A | 8/1997 | Fujiwara et al. |
| 5,681,505 A | 10/1997 | Phillips et al. |
| 5,703,157 A | 12/1997 | Fujiwara et al. |
| 5,710,190 A | 1/1998 | Jane et al. |
| 5,719,301 A | 2/1998 | Sleeter |
| 5,766,331 A | 6/1998 | Krinski et al. |
| 5,962,541 A | 10/1999 | Peterson et al. |
| 5,968,995 A | 10/1999 | Rizk et al. |
| 6,033,654 A | 3/2000 | Stedronsky et al. |
| 6,080,405 A | 6/2000 | Ishibashi et al. |
| 6,176,891 B1 | 1/2001 | Komoriya et al. |
| 6,194,512 B1 | 2/2001 | Chen et al. |
| 6,231,985 B1 | 5/2001 | Chen et al. |
| 6,291,559 B1 | 9/2001 | Krinski et al. |
| 6,306,997 B1 | 10/2001 | Kuo et al. |
| 6,335,043 B1 | 1/2002 | Jiang et al. |
| 6,352,661 B1 | 3/2002 | Thompson et al. |
| 6,365,650 B1 | 4/2002 | Chen et al. |
| 6,420,443 B1 | 7/2002 | Clark et al. |
| 6,465,569 B1 | 10/2002 | Kurth |
| 6,489,391 B1 | 12/2002 | Schilling et al. |
| 6,495,056 B2 | 12/2002 | Kubo et al. |
| 6,497,760 B2 | 12/2002 | Sun et al. |
| 6,518,387 B2 | 2/2003 | Kuo et al. |
| 6,649,667 B2 | 11/2003 | Clatty |
| 6,730,299 B1 | 5/2004 | Tayot et al. |
| 6,797,318 B2 | 9/2004 | Takeuchi et al. |
| 6,841,101 B2 | 1/2005 | Nakos et al. |
| 6,852,407 B2 | 2/2005 | Yasue |
| 6,866,880 B2 | 3/2005 | Bhattacharya et al. |
| 6,884,756 B2 | 4/2005 | Lynch et al. |
| 6,893,579 B2 | 5/2005 | Espiard et al. |
| 7,049,269 B2 | 5/2006 | Hara |
| 7,060,798 B2 | 6/2006 | Li et al. |
| 7,071,248 B2 | 7/2006 | Chen et al. |
| 7,081,159 B2 | 7/2006 | Thames et al. |
| 7,153,812 B2 | 12/2006 | Hara |
| 7,175,701 B2 | 2/2007 | Oyasato et al. |
| 7,226,615 B2 | 6/2007 | Yuksel et al. |
| 7,252,735 B2 | 8/2007 | Li |
| 7,253,244 B2 | 8/2007 | Gruenewaelder et al. |
| 7,265,169 B2 | 9/2007 | Li et al. |
| 7,285,583 B2 | 10/2007 | Stumphauzer et al. |
| 7,345,136 B2 | 3/2008 | Wescott et al. |
| 7,387,795 B2 | 6/2008 | Hollenberg et al. |
| 7,393,930 B2 | 7/2008 | Li et al. |
| 7,410,744 B2 | 8/2008 | Watanabe et al. |
| 7,416,598 B2 | 8/2008 | Sun et al. |
| 7,625,441 B2 | 12/2009 | Gagnon et al. |
| 7,704,537 B2 | 4/2010 | Lopez et al. |
| 7,722,712 B2 | 5/2010 | Li |
| 7,736,559 B2 | 6/2010 | Rivers et al. |
| 7,772,313 B2 | 8/2010 | Stumphauzer et al. |
| 7,781,501 B2 | 8/2010 | Dopico et al. |
| 7,785,440 B2 | 8/2010 | Li |
| 7,789,932 B2 | 9/2010 | Anderson et al. |
| 7,803,855 B2 | 9/2010 | Kintzley et al. |
| 8,057,892 B2 | 11/2011 | Yang et al. |
| 8,147,968 B2 | 4/2012 | Brady et al. |
| 8,378,010 B2 | 2/2013 | Browning et al. |
| 8,399,544 B2 | 3/2013 | Varnell et al. |
| 8,465,581 B2 | 6/2013 | Wescott et al. |
| 8,519,031 B2 | 8/2013 | Parker et al. |
| 8,623,931 B2 | 1/2014 | Parker et al. |
| 8,916,668 B2 | 12/2014 | Parker et al. |
| 9,309,444 B2 | 4/2016 | Parker et al. |
| 9,416,303 B2 | 8/2016 | Parker et al. |
| 9,816,019 B2 | 11/2017 | Parker et al. |
| 9,873,823 B2 * | 1/2018 | Parker ................... C09J 189/00 |
| 9,909,044 B2 | 3/2018 | Parker et al. |
| 2002/0005251 A1 | 1/2002 | Sun et al. |
| 2002/0010233 A1 | 1/2002 | Yasue |
| 2003/0148084 A1 | 8/2003 | Trocino |
| 2003/0203136 A1 | 10/2003 | Takeuchi |
| 2003/0212227 A1 | 11/2003 | Stroobants et al. |
| 2003/0219615 A1 | 11/2003 | Kikuchi et al. |
| 2003/0224179 A1 | 12/2003 | Skinner et al. |
| 2004/0007156 A1 | 1/2004 | Thames et al. |
| 2004/0025657 A1 | 2/2004 | Hosoi et al. |
| 2004/0170670 A1 | 9/2004 | Smith et al. |
| 2005/0070635 A1 | 3/2005 | Breyer et al. |
| 2005/0113257 A1 | 5/2005 | Lynch et al. |
| 2005/0165220 A1 | 7/2005 | Barker et al. |
| 2005/0166796 A1 | 8/2005 | Sun et al. |
| 2005/0222358 A1 | 10/2005 | Wescott et al. |
| 2005/0234156 A1 | 10/2005 | Thames et al. |

(56) References Cited

U.S. PATENT DOCUMENTS

| | | |
|---|---|---|
| 2005/0250900 A1 | 11/2005 | Stofko |
| 2005/0257905 A1 | 11/2005 | Shoseyov |
| 2005/0272892 A1 | 12/2005 | Hse et al. |
| 2005/0277733 A1 | 12/2005 | Wescott et al. |
| 2005/0282988 A1 | 12/2005 | Li |
| 2006/0116288 A1 | 6/2006 | Mori et al. |
| 2006/0135368 A1 | 6/2006 | Anderson et al. |
| 2006/0156954 A1 | 7/2006 | Li et al. |
| 2006/0194010 A1 | 8/2006 | Hiscock |
| 2006/0231968 A1 | 10/2006 | Cowan et al. |
| 2007/0020476 A1 | 1/2007 | Kintzley et al. |
| 2007/0128542 A1 | 6/2007 | Watanabe et al. |
| 2007/0148339 A1 | 6/2007 | Wescott et al. |
| 2007/0180877 A1 | 8/2007 | Anderson et al. |
| 2007/0244300 A1 | 10/2007 | Schweizer et al. |
| 2007/0281145 A1 | 12/2007 | Khabbaz |
| 2008/0021187 A1 | 1/2008 | Wescott et al. |
| 2008/0027159 A1 | 1/2008 | Rivers et al. |
| 2008/0050602 A1 | 2/2008 | Spraul et al. |
| 2008/0063759 A1 | 3/2008 | Raymond et al. |
| 2008/0063760 A1 | 3/2008 | Raymond et al. |
| 2008/0064852 A1 | 3/2008 | Ddamulira et al. |
| 2008/0095914 A1 | 4/2008 | Deak et al. |
| 2008/0125577 A1 | 5/2008 | Gosnell et al. |
| 2008/0213597 A1 | 9/2008 | Li |
| 2008/0234458 A1 | 9/2008 | West |
| 2008/0255333 A1 | 10/2008 | Trocino |
| 2008/0281069 A1 | 11/2008 | Jennissen |
| 2008/0287635 A1 | 11/2008 | Sun et al. |
| 2008/0292886 A1 | 11/2008 | Allen et al. |
| 2009/0013482 A1 | 1/2009 | Kennedy |
| 2009/0013743 A1 | 1/2009 | Lynch et al. |
| 2009/0081468 A1 | 3/2009 | Mortensen |
| 2009/0098387 A1 | 4/2009 | Brady et al. |
| 2009/0197036 A1 | 8/2009 | Hwang et al. |
| 2010/0048875 A1 | 2/2010 | Segall et al. |
| 2010/0063255 A1 | 3/2010 | Logie et al. |
| 2010/0069533 A1 | 3/2010 | Brady et al. |
| 2010/0069534 A1 | 3/2010 | Wescott et al. |
| 2010/0093896 A1 | 4/2010 | Spraul et al. |
| 2010/0240805 A1 | 9/2010 | Miller et al. |
| 2010/0258033 A1 | 10/2010 | Yang et al. |
| 2010/0285295 A1 | 11/2010 | Wang et al. |
| 2010/0305227 A1 | 12/2010 | Parker et al. |
| 2010/0310877 A1 | 12/2010 | Parker et al. |
| 2011/0048280 A1 | 3/2011 | Wescott et al. |
| 2011/0132551 A1 | 6/2011 | Klapdohr et al. |
| 2011/0189479 A1 | 8/2011 | Zhang et al. |
| 2011/0293934 A1 | 12/2011 | Allen et al. |
| 2011/0311833 A1 | 12/2011 | Parker et al. |
| 2012/0115992 A1 | 5/2012 | Khabbaz et al. |
| 2012/0183794 A1 | 7/2012 | Guo et al. |
| 2013/0065012 A1 | 3/2013 | Parker et al. |
| 2013/0131231 A1 | 5/2013 | Bouguettaya et al. |
| 2013/0224482 A1 | 8/2013 | Brady et al. |
| 2013/0252007 A1 | 9/2013 | Khabbaz |
| 2014/0178695 A1 | 6/2014 | Parker et al. |
| 2014/0235737 A1 | 8/2014 | Parker et al. |
| 2015/0044483 A1 | 2/2015 | Parker et al. |
| 2015/0203730 A1 | 7/2015 | Parker et al. |
| 2015/0267095 A1 | 9/2015 | Parker et al. |
| 2016/0230057 A1 | 8/2016 | Parker et al. |
| 2016/0298012 A1 | 10/2016 | Parker et al. |
| 2016/0304688 A1 | 10/2016 | Parker et al. |
| 2017/0066952 A1 | 3/2017 | Parker et al. |
| 2018/0134934 A1 | 5/2018 | Parker et al. |

FOREIGN PATENT DOCUMENTS

| | | |
|---|---|---|
| CN | 101130678 A | 2/2008 |
| EP | 0161043 A2 | 11/1985 |
| EP | 0973640 A1 | 1/2000 |
| EP | 1268702 A2 | 1/2003 |
| EP | 1268702 B1 | 1/2003 |
| EP | 1588628 A1 | 10/2005 |
| EP | 1742542 A2 | 1/2007 |
| EP | 0973640 B1 | 9/2007 |
| EP | 1900642 A1 | 3/2008 |
| EP | 1900650 A1 | 3/2008 |
| EP | 2046880 A1 | 4/2009 |
| EP | 1268702 B2 | 9/2009 |
| EP | 2163590 A1 | 3/2010 |
| EP | 2236578 A1 | 10/2010 |
| EP | 1742542 B1 | 1/2011 |
| GB | 0480097 A | 2/1938 |
| GB | 1065015 A | 4/1967 |
| GB | 2001331 A | 1/1979 |
| JP | 51-73097 | 6/1976 |
| JP | S61217 A | 1/1986 |
| JP | S61233 A | 1/1986 |
| JP | H04-502416 A | 5/1992 |
| JP | H05-507925 A | 11/1993 |
| JP | 2002-249987 A | 9/2002 |
| JP | 2004-214475 B2 | 1/2009 |
| RU | 2252238 C1 | 5/2005 |
| RU | 2325419 C1 | 5/2008 |
| SU | 064311 A1 | 11/1944 |
| SU | 192330 A | 11/1967 |
| WO | WO-1990006094 A1 | 6/1990 |
| WO | WO-1991019470 A1 | 12/1991 |
| WO | WO-1993019125 A1 | 9/1993 |
| WO | WO-1998043813 A1 | 10/1998 |
| WO | WO-2001059026 A2 | 8/2001 |
| WO | WO-2002062866 A1 | 8/2002 |
| WO | WO-2003075673 A1 | 9/2003 |
| WO | WO-2005035665 A1 | 4/2005 |
| WO | WO-2005072260 A2 | 8/2005 |
| WO | WO-2005099477 A2 | 10/2005 |
| WO | WO-2005100451 A2 | 10/2005 |
| WO | WO-2005113700 A1 | 12/2005 |
| WO | WO-2006041469 A1 | 4/2006 |
| WO | WO-2006112672 A1 | 10/2006 |
| WO | WO-2006132785 A2 | 12/2006 |
| WO | WO-2007008385 A1 | 1/2007 |
| WO | WO-2007031211 A1 | 3/2007 |
| WO | WO-2007033481 A1 | 3/2007 |
| WO | WO-2007064970 A1 | 6/2007 |
| WO | WO-2007086632 A1 | 8/2007 |
| WO | WO-2008011455 A1 | 1/2008 |
| WO | WO-2008024444 A2 | 2/2008 |
| WO | WO-2008118741 A1 | 10/2008 |
| WO | WO-2009013482 A2 | 1/2009 |
| WO | WO-2009048598 A1 | 4/2009 |
| WO | WO-2009086141 A2 | 7/2009 |
| WO | WO-2010031165 A1 | 3/2010 |
| WO | WO-2010065758 A2 | 6/2010 |
| WO | WO-2010102284 A2 | 9/2010 |
| WO | WO-2010102297 A2 | 9/2010 |
| WO | WO-2010120356 A1 | 10/2010 |
| WO | WO-2011025911 A1 | 3/2011 |
| WO | WO-2011097364 A1 | 8/2011 |
| WO | WO-2011150203 A2 | 12/2011 |
| WO | WO-2011156380 A2 | 12/2011 |
| WO | WO-2012076566 A2 | 6/2012 |
| WO | WO-2013036739 A1 | 3/2013 |
| WO | WO-2013036774 A1 | 3/2013 |

OTHER PUBLICATIONS

Derwent abstract of JPH04214475A (published 1992) (2 pages).
English Language Translation of the Abstract of CN1698453 (2005) (1 page).
English Language Translation of CN1418562 (2003) (3 pages).
English Language Translation of Japanese Patent No. JP2002249987 (2002) (24 pages).
Hettiarachchy et al. (1995) "Alkali-Modified Soy Protein with Improved Adhesive and Hydrophobic Properties," *J. Am. Oil Chem. Soc.* 72(12):1461-1464.
Hettiarachchy et al. (1996) "Preparation and Functional Properties of a Protein Isolate from Defatted Wheat Germ," *Cereal Chem.* 73(3):364-367.

(56) References Cited

OTHER PUBLICATIONS

International Preliminary Report on Patentability and Written Opinion of the International Searching Authority of International Patent Application No. PCT/US2011/039453, dated Dec. 10, 2012 (11 pages).
International Preliminary Report on Patentability and Written Opinion for International Application No. PCT/US2010/026526, dated Sep. 6, 2011. (11 pages).
International Preliminary Report on Patentability and Written Opinion for International Application No. PCT/US2010/026553, dated Sep. 6, 2011. (7 pages).
International Search Report and Written Opinion dated Feb. 7, 2012 for International Application No. PCT/US2011/039453, International Filing Date Jun. 7, 2011 (20 pages).
International Search Report and Written Opinion for International Application No. PCT/IB2013/02188 dated Mar. 19, 2014 (8 pages).
International Search Report and Written Opinion dated Feb. 5, 2013 for International Application No. PCT/US12/54116, International Filing Date Sep. 7, 2012 (9 pages).
International Search Report and Written Opinion dated Nov. 26, 2012 for International Application No. PCT/US12/54124, International Filing Date Sep. 7, 2012 (9 pages).
International Search Report of International Patent Application No. PCT/US2010/026526, dated Mar. 15, 2011 (6 pages).
International Search Report of International Patent Application No. PCT/US2010/026553, dated Nov. 16, 2010 (4 pages).
Javni et al. (2003) "Effect of Different Isocyanates on the Properties of Soy-Based Polyurethanes," Journal of Applied Polymer Science 88:2912-2916.
Kent et al., "Handbook of Industrial Chemistry and Biotechnology," Eleventh Edition, vol. 1, pp. 607-609 (2007).
Kretschmer et al. (1957) "Infrared Spectroscopy and Optical Rotatory Dispersion of Zein, Wheat Gluten and Gliadin," *J. Phys. Chem.* 61:1627-1631.
Kumar et al. (2002) "Adhesives and plastics based on soy protein products," Industrial Crops and Products 16:155-172.
Lambuth, A.L., Soybean Glues, in *Handbook of Adhesives*, 2nd ed., Van Nostrand Reinhold, New York, 1977, pp. 172-180.
Lin et al. (1996) "Physical, Mechanical and Thermal Properties of Water-Blown Rigid Polyurethane Foam Containing Soy Protein Isolate," Cereal Chem 73(2):189-196.
Lin et al. (1997) "Water-Blown Flexible Polyurethane Foam Extended with Biomass Materials," Journal of Applied Polymer Science 65(4):695-703.
Lorenz et al., "Analysis of Soy Flour/Phenol-Formaldehyde Adhesives for Bonding Wood", Wood Adhesives 2005: Technical Forum (Poster) Session, p. 501-505, (2005).
Mehta, "Proteins Extracted from Oilseed Rape (Canola), Soy or Castor Meals Using a New Technique are Yielding Formaldehyde-free Structural Adhesives Suitable for Use in Wood Composites, Say Scientists at Advanced Biopolymer Technologies, in Mantua, USA", Wood Focus Magazine, p. 1-4, (2010).
Mo et al. (1999) "Effects of Molding Temperature and Pressure on Properties of Soy Protein Polymers," Journal of Applied Polymer Science 73:2595-2602.
Park et al. (1999) "Physical and Mechanical Properties of Soy Protein-Based Plastic Foams," *J. Am. Oil Chem. Soc.* 76:1201-1205.
Paulson et al., "Emulsification Properties of Succinylated Canola Protein Isolate", Journal of Food Science, vol. 53, No. 3, p. 817-820, (1988).
Paulson et al., "Functionality of Modified Plant Proteins in Model Food Systems", J. Inst. Can. Sci. Technol. Aliment., vol. 17, No. 4, p. 202-208, (1984).

Shih (1994) "Interaction of Soy Isolate with Polysaccharide and Its Effect on Film Properties," *J. Am. Oil Chem. Soc.* 71(11):1281-1285.
Swain et al. (2005) "Biodegradable Polymers. Part II. Thermal degradation of biodegradable plastics cross-linked from formaldehyde-soy protein concentrate," J. Therm. Anal. Cal. 79:33-38.
Wang et al. (2007) "Soy Protein Adhesion Enhanced by Glutaraldehyde Crosslink," Journal of Applied Polymer Science 104:130-136.
Wang et al. (2009) "Improved Water Resistance of Soy Protein Adhesive at Isoelectric Point," Transactions of the ASABE 52(1):173-177.
Weimer et al. "Wood adhesives prepared from lucerne fiber fermentation residues of *Ruminococcus albus* and *Clostridium thermocellum*," *Appl. Microbiol. Biotechnol.*, vol. 66, pp. 635-640, 2005.
Wescott et al., "Durable Soy-Based Adhesive Dispersions", Wood Adhesives Convention 2005, San Diego, CA, Nov. 2-4, 2005: Session 3A—Bio-Based Adhesives, p. 263-269, Forest Products Society, Peachtree, GA (Publ).
Wu et al. (2001) "Effects of the Molecular Weight on the Properties of Thermoplastics Prepared from Soy Protein Isolate," Journal of Applied Polymer Science 82:3373-3380.
Zhang et al. (2003) "Ways of Strengthening Biodegradable Soy-Dreg Plastics," Journal of Applied Polymer Science 88:422-427.
Zhong et al. (2001) "Properties of soy protein isolate/polycaprolactone blends compatibilized by methylene diphenyl diisocyanate," Polymer 42:6961-6969.
Zhong et al. (2007) "Isoelectric pH of Polyamide-Epichlorohydrin Modified Soy Protein Improved Water Resistance and Adhesion Properties," Journal of Applied Polymer Science 103:2261-2270.
Pizzi, (2006), "Recent Developments in Eco-Efficient Bio-Based Adhesives for Wood Bonding: Opportunities and Issues," J Adhes Sci Technol, 20(8):829-46.
Chinese Office Action dated Oct. 10, 2013 for Chinese Patent Application No. 201080019599.3 (14 pages).
Deanin et al., "Synthetic Resins and Plastics," *Handbook of Industrial Chemistry and Biotechnology*, (11th Ed, 2007), JA Kent (Ed), Springer Publishing Co. US, New York, NY (Publ), pp. 607-609.
Nanofil product literature downloaded on Apr. 16, 2017 from http://zeus.plmsc.psu.edu/~manias/news/sud-chemie_nanofil_flier.pdf.
Osman et al. "Polyurethane Adhesive Nanocomposites as Gas Permeation Barrier," *Macromolecules* (2003) vol. 36, No. 26, pp. 9851-9858.
Yang, In, et al. "Development of adhesive resins formulated with rapeseed flour akali hydrolyzates for plywood panels," *Journal of the Korean Wood Science and Technology* 38.4 (2010): 323-332 (Jul. 2010).
English-language translation of Yang, In, et al. "Development of adhesive resins formulated with rapeseed flour akali hydrolyzates for plywood panels," *Journal of the Korean Wood Science and Technology* 38.4 (2010): 323-332 (Jul. 2010). (Translation is 31 pages).
Particle Size Conversion Table, http://www.sigmaaldrich.com/chemistry/stockroom-reagents/learning-center/technical-library/particle-size-conversion.html, downloaded on Jun. 22, 2017.
U.S. Appl. No. 15/883,263, Protein-Containing Emulsions and Adhesives, and Manufacture and Use Thereof, filed Jan. 30, 2018.
U.S. Appl. No. 15/076,861, Protein-Containing Foams, Manufacture and Use Thereof, filed Mar. 22, 2016.
U.S. Appl. No. 15/711,272, Protein-Containing Adhesives, and Manufacture and Use Thereof, filed Sep. 21, 2017.
U.S. Appl. No. 14/343,521, Protein-Containing Adhesives, and Manufacture and Use Thereof, filed Aug. 22, 2014.
U.S. Appl. No. 14/964,856, Protein-Containing Adhesives, and Manufacture and Use Thereof, filed Dec. 10, 2015.

\* cited by examiner

PROTEIN ADHESIVES CONTAINING AN ANHYDRIDE, CARBOXYLIC ACID, AND/OR CARBOXYLATE SALT COMPOUND AND THEIR USE

CROSS REFERENCE TO RELATED APPLICATIONS

This application is a continuation of U.S. Ser. No. 14/417,358, filed Jan. 26, 2015, which is the national stage of International (PCT) Patent Application Serial No. PCT/IB2013/002188, filed Jul. 30, 2013, which claims the benefit of and priority to U.S. Provisional Patent Application Ser. No. 61/677,399, filed Jul. 30, 2012, the contents of each of which are hereby incorporated by reference for all purposes.

FIELD OF THE INVENTION

The invention relates to protein adhesives, and to methods of making and using such adhesives. The protein adhesives contain a protein-bonding agent and a plant protein composition, such as isolated water-soluble protein fraction or ground plant meal obtained from plant biomass. The protein-bonding agent can be an anhydride compound, carboxylic acid compound, carboxylate salt compound, or combinations thereof. The protein adhesives are useful in bonding together lignocellulosic materials and other types of materials.

BACKGROUND

Adhesive compositions are used extensively in the labeling, packaging, and wood products industries. Adhesives are used in the labeling industry to bond a label to a substrate, such as a bottle, package or envelope. Adhesives are used in the packing industry to bond together components to form a package, such as a paper envelope or a cardboard box.

Adhesives are used in the wood products industry to make composites such as chipboard, fiberboard, and related composite wood products. Recent environmental concerns emphasize the need for adhesive compositions that are environmentally friendly. In particular, the need exists for adhesive compositions that reduce the need for petroleum feedstock, minimize use of toxic chemicals, and are amenable to the cure conditions and performance requirements for use in the labeling, packaging, and wood products industries.

In response to the need for environmentally friendly adhesive compositions, there has been renewed interest in using certain soy products to form adhesive compositions. However, there are multiple challenges in developing an adhesive composition from soy products. For example, the adhesive composition when cured to form a binder must have sufficient bond strength. Another challenge is that the adhesive composition must have sufficient pot life so that it does not cure before being applied to a substrate to be bound to the adhesive. It is also important that the soy product be capable of production on large scale at economically feasible terms, and that it is amenable to cure conditions used in the labeling, packaging, and wood products industries.

The present invention addresses these needs and provides other related advantages.

SUMMARY OF THE INVENTION

The invention provides protein adhesive compositions, methods of making and using such adhesives, and articles prepared using such adhesives. The protein adhesive compositions contain a protein-bonding agent and a plant protein composition, such as isolated water-soluble protein fraction or ground plant meal obtained from plant biomass. The protein-bonding agent can be an anhydride compound, carboxylic acid compound, carboxylate salt compound, or combination thereof. The plant protein composition is advantageous because it is prepared from plant biomass, a renewable feedstock that is generally a waste by-product of the agricultural industry. The adhesive compositions are useful in bonding together lignocellulosic materials, as well as other types of materials. One preferred aspect of the invention provides transparent, pressure-sensitive adhesives, which contain isolated water-soluble protein fraction, an anhydride compound, and a plasticizer. Another preferred aspect of the invention provides transparent, pressure-sensitive adhesives, which contain isolated water-soluble protein fraction, a carboxylic acid compound or a carboxylate salt compound, and optionally a plasticizer. These transparent, pressure-sensitive adhesives are contemplated to be particularly useful for sealing envelopes, adhering labels to lignocellulosic materials, and otherwise bonding together lignocellulosic materials.

Accordingly, one aspect of the invention provides an adhesive composition comprising: (a) an isolated water-soluble protein fraction; and (b) at least 0.1% (w/w) of a protein-bonding agent selected from the group consisting of an anhydride compound, carboxylic acid compound, carboxylate salt compound, and combinations thereof. The adhesive composition may further comprise water to produce a liquid adhesive composition that is particularly useful in bonding together lignocellulosic materials. One advantage of using isolated water-soluble protein fraction as the protein component is that upon curing the adhesive composition provides a solid binder composition that is transparent. Another desirable feature of the solid binder composition is that it exhibits adhesive tack at ambient temperature. Adhesive tack at ambient temperature permits the solid binder composition to function as a pressure-sensitive adhesive, whereby an article can be bonded to the solid binder composition simply by temporarily applying pressure to force the article into contact with the pressure-sensitive adhesive. The degree of adhesive tack can be manipulated by adding a plasticizer, such as glycerin, to the adhesive composition. It is appreciated that use of a plasticizer is optional, and the amount of plasticizer included in the composition is selected in order to achieve the desired amount of tack for the end application.

Another aspect of the invention provides an adhesive composition comprising: (a) ground plant meal; and (b) at least 0.1% (w/w) of a protein-bonding agent selected from the group consisting of an anhydride compound, carboxylic acid compound, carboxylate salt compound, and combinations thereof. The adhesive composition may further comprise water to produce a liquid adhesive composition that is particularly useful in bonding together lignocellulosic materials. It is desirable that upon curing the adhesive composition provide a solid binder composition with sufficient adhesive tack at ambient temperature to bond together lignocellulosic materials. The degree of adhesive tack can be manipulated by adding a plasticizer, such as glycerin, to the adhesive composition.

Another aspect of the invention provides a solid binder composition formed by curing an adhesive composition described herein.

Another aspect of the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first article to the second article. The method optionally also comprises the step of, after step (b), permitting the adhesive composition to cure, which can be facilitated by the application of pressure, heat or both pressure and heat.

Another aspect of the invention provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article or both the first and second articles are lignocellulosic materials, or composite materials containing lignocellulosic material. The first article, the second article or both the first and second articles can comprise a metal, a resin, a ceramic, a polymer, a glass or a combination thereof. The first article, the second article, or both the first article and the second article can be a composite. In addition, the invention provides an article produced by each of the foregoing methods of manufacture.

Another aspect of the invention provides an article comprising (i) a substrate and (ii) a pressure-sensitive adhesive formed by curing an adhesive composition on the substrate. In certain embodiments, the substrate is a lignocellulosic substrate, such as paper or cardboard.

Another aspect of the invention provides an article comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. The invention provides an article (for example, a composite material, laminate, or a laminate containing composite material) produced using one or more of the adhesive compositions described herein.

Depending upon the adhesive used, the solid binder composition formed by curing the adhesive composition may be transparent and/or have a certain degree of adhesive tack at ambient temperature. Also, an article formed by bonding substrates together using the adhesive composition can be characterized according to the strength of the bond between the substrates.

For example, when the article contains lignocellulosic material in the composite material or laminate, the article may be characterized by exhibiting no less than 50%, or optionally no less than 75%, cohesive failure of the lignocellulosic component when the article is placed under a loading stress sufficient to break the article. In certain embodiments, the article exhibits no less than 50% cohesive failure of the lignocellulosic component when the article is placed under a loading stress sufficient to break the article.

BRIEF DESCRIPTION OF THE DRAWINGS

The foregoing and other objects, features and advantages of the invention will become apparent from the following description of preferred embodiments, as illustrated in the accompanying drawings. Like-referenced elements identify common features in the corresponding drawings. The drawings are not necessarily to scale, with emphasis instead being placed on illustrating the principles of the present invention, in which.

DETAILED DESCRIPTION

Figure 1:
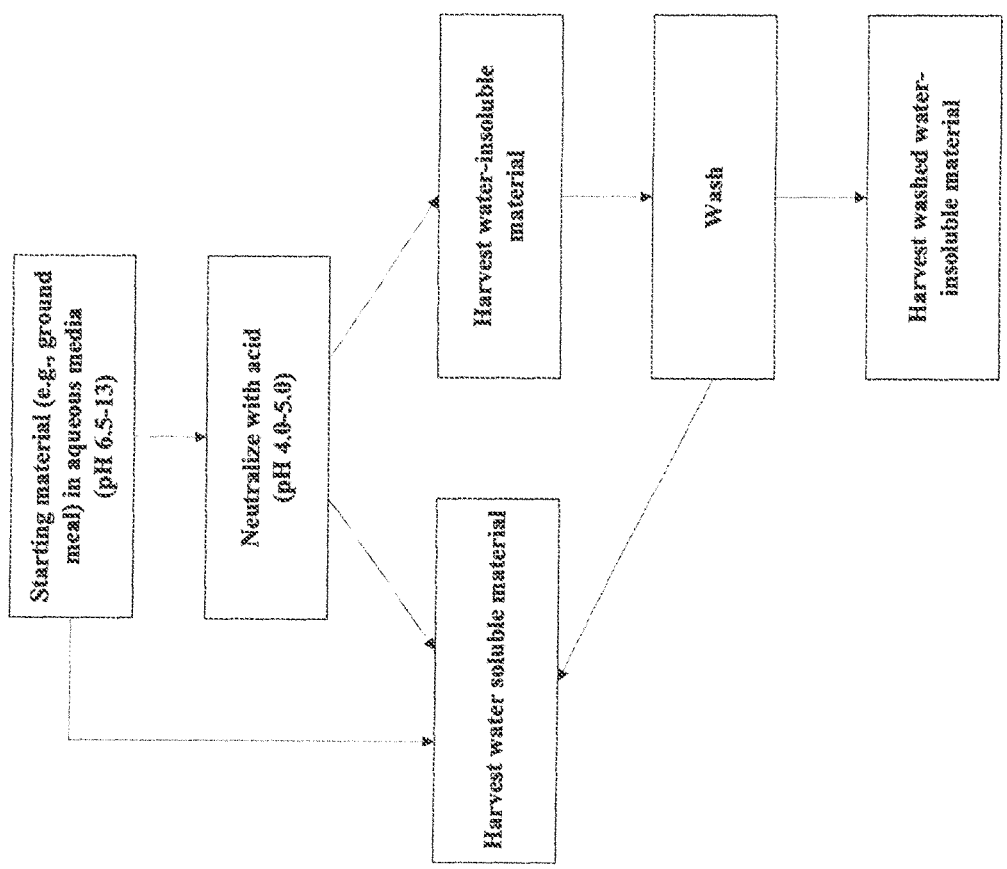
FIG. 1 is a flow chart showing the steps of an exemplary method for producing isolated polypeptide compositions useful in the practice of the invention.

The invention provides protein adhesive compositions, methods of making and using such adhesives, and articles prepared using such adhesives. The protein adhesive compositions contain a protein-bonding agent and a plant protein composition, such as isolated water-soluble protein fraction or ground plant meal obtained from plant biomass. The protein-bonding agent can be an anhydride compound, carboxylic acid compound, carboxylate salt compound, or combination thereof. The plant protein composition is advantageous because it is prepared from plant biomass, a renewable feedstock that is generally a waste by-product of the agricultural industry. The adhesive compositions are useful in bonding together lignocellulosic materials, as well as other types of materials. One preferred aspect of the invention provides transparent, pressure-sensitive adhesives, which contain isolated water-soluble protein fraction, an anhydride compound, and a plasticizer. These transparent, pressure-sensitive adhesives are contemplated to be particularly useful for sealing envelopes, adhering a label to lignocellulosic materials, and otherwise bonding together lignocellulosic materials.

The following sections describe the protein adhesive compositions, materials that may be included in the protein adhesive compositions, methods of making and using such adhesives, and articles formed from such adhesives. Features described in one section are not to be limited to any particular section, but may be combined with features in another section.

I. Protein Adhesive Compositions

One aspect of the invention provides an adhesive composition comprising a plant protein composition and a protein-bonding agent. The plant protein composition may be a isolated water-soluble protein fraction, ground plant meal, or isolated water-insoluble/water-dispersible protein fraction, each of which are described in more detail in Section II below. Exemplary adhesive compositions are described in more detail below.

Part A: Adhesive Compositions Containing Isolated Water-Soluble Protein Fraction One aspect of the invention provides an adhesive composition comprising: (a) an isolated water-soluble protein fraction; and (b) at least 0.1% (w/w) of a protein-bonding agent selected from the group consisting of an anhydride compound, carboxylic acid compound, carboxylate salt compound, and combinations thereof. Adhesive compositions containing isolated water-soluble protein fraction as the protein component can provide an advantage in that upon curing they form a solid binder composition that is transparent.

Physical properties of the adhesive composition can be adjusted by altering the relative amount of (a) isolated water-soluble protein fraction and (b) protein-bonding agent used in the adhesive composition. For example, in certain embodiments, the ratio of (i) the weight percent of isolated water-soluble protein fraction in the adhesive composition to (ii) the weight percent of protein-bonding agent in the adhesive composition is from about 25:1 to about 1:4, about 20:1 to about 1:1, about 15:1 to about 1:1, or about 10:1 to about 1:1. In certain other embodiments, the ratio of (i) the weight percent of isolated water-soluble protein fraction in the adhesive composition to (ii) the weight percent of protein-bonding agent in the adhesive composition is from about 10:1 to about 2:1. In certain other embodiments, the ratio of (i) the weight percent of isolated water-soluble protein fraction in the adhesive composition to (ii) the weight percent of protein-bonding agent in the adhesive composition is from about 5:1 to about 1:1, or from about 4:1 to about 2:1.

In certain other embodiments, the ratio of (i) the weight percent of isolated water-soluble protein fraction in the adhesive composition to (ii) the weight percent of protein-bonding agent in the adhesive composition is from about 20:1 to about 1:20. In certain other embodiments, the ratio of (i) the weight percent of isolated water-soluble protein fraction in the adhesive composition to (ii) the weight percent of protein-bonding agent in the adhesive composition is from about 10:1 to about 1:2. In certain other embodiments, the ratio of (i) the weight percent of isolated water-soluble protein fraction in the adhesive composition to (ii) the weight percent of protein-bonding agent in the adhesive composition is from about 8:1 to about 1:1.

In certain other embodiments, the protein-bonding agent is an anhydride compound and the ratio of (i) the weight percent of isolated water-soluble protein fraction in the adhesive composition to (ii) the weight percent of anhydride compound in the adhesive composition is from about 20:1 to about 1:1. In certain other embodiments, the ratio of (i) the weight percent of isolated water-soluble protein fraction in the adhesive composition to (ii) the weight percent of anhydride compound in the adhesive composition is from about 10:1 to about 2:1. In certain other embodiments, the ratio of (i) the weight percent of isolated water-soluble protein fraction in the adhesive composition to (ii) the weight percent of anhydride compound in the adhesive composition is from about 5:1 to about 1:1, or from about 4:1 to about 2:1.

In addition, physical properties of the adhesive composition can be adjusted by altering the overall amount of isolated water-soluble protein fraction in the adhesive composition. For example, in certain embodiments, the adhesive composition comprises from about 1% (w/w) to about 95% (w/w) isolated water-soluble protein fraction, from about 1% (w/w) to about 90% (w/w) isolated water-soluble protein fraction, from about 5% (w/w) to about 90% (w/w) isolated water-soluble protein fraction, from about 10% (w/w) to about 80% (w/w) isolated water-soluble protein fraction, or from about 15% (w/w) to about 50% (w/w) isolated water-soluble protein fraction. In certain other embodiments, the adhesive composition comprises from about 1% (w/w) to about 65% (w/w) isolated water-soluble protein fraction. In certain other embodiments, the adhesive composition comprises from about 5% (w/w) to about 80% (w/w) isolated water-soluble protein fraction. In certain other embodiments, the adhesive composition comprises from about 5% (w/w) to about 50% (w/w) isolated water-soluble protein fraction. In certain other embodiments, the adhesive composition comprises from about 1% (w/w) to about 10% (w/w) isolated water-soluble protein fraction. In certain other embodiments, adhesive the composition comprises from about 2% (w/w) to about 5% (w/w) isolated water-soluble protein fraction.

The isolated water-soluble protein fraction is described in more detail in Section II and may be characterized by one or more of the following features: (i) an amide-I absorption band between about 1633 $cm^{-1}$ and 1680 $cm^{-1}$, as determined by solid state FTIR; (ii) an amide-II band between approximately 1522 $cm^{-1}$ and 1560 $cm^{-1}$, as determined by solid state FTIR; (iii) two prominent 1° amide N—H stretch absorption bands centered at about 3200 $cm^{-1}$, and at about 3300 $cm^{-1}$, as determined by solid state FTIR; (iv) a prominent cluster of protonated nitrogen nuclei defined by $^{15}N$ chemical shift boundaries at about 94 ppm and at about 100 ppm, and $^{1}H$ chemical shift boundaries at about 7.6 ppm and at about 8.1 ppm, as determined by solution state, two-dimensional proton-nitrogen coupled NMR; (v) an average molecular weight of between about 600 and about 2,500 Daltons; or (vi) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing.

In certain embodiments, the isolated water-soluble protein fraction is derived from corn, wheat, sunflower, cotton, rapeseed, canola, castor, soy, camelina, flax, jatropha, mallow, peanuts, algae, sugarcane begasse, tobacco, whey, or a combination thereof.

The adhesive composition may optionally further comprise isolated water-insoluble/water-dispersible protein fraction. The isolated water-insoluble/water-dispersible protein fraction is described in detail in Section II and may be characterized by one or more of the following features: (a) an amide-I absorption band between about 1620 $cm^{-1}$ and 1632 $cm^{-1}$ and an amide-II band between approximately 1514 $cm^{-1}$ and 1521 $cm^{-1}$, as determined by solid state Fourier Transform Infrared Spectoscopy (FTIR), (b) a prominent 2° amide N—H stretch absorption band centered at about 3272 $cm^{-1}$, as determined by solid state FTIR, (c) an average molecular weight of between about 600 and about 2,500 Daltons, (d) two protonated nitrogen clusters defined by $^{15}N$ chemical shift boundaries at about 86.2 ppm and about 87.3 ppm, and $^{1}H$ chemical shift boundaries at about 7.14 ppm and 7.29 ppm for the first cluster, and $^{1}H$ chemical shift boundaries at about 6.66 ppm and 6.81 ppm for the second cluster, as determined by solution state, two-dimensional proton-nitrogen coupled NMR, and (e) is capable of dispersing an oil-in-water or water-in-oil to produce a homogeneous emulsion that is stable for least 5 minutes.

One benefit of including a quantity (e.g., from about 0.1% (w/w) about 5% (w/w) of the adhesive composition) of isolated water-insoluble/water-dispersible protein fraction in the adhesive composition is that it may make the adhesive composition more amenable for use with a hydrophobic plasticizer. Exemplary hydrophobic plasticizers include oil-based plasticizers, such as linseed oil, soy oil, castor oil, and derivatives of each of the foregoing, such as an ester (e.g., an alkyl ester) of any of the foregoing oils.

Part B: Adhesive Compositions Containing Ground Plant Meal

Another aspect of the invention provides an adhesive composition comprising: (a) ground plant meal; and (b) at least 0.1% (w/w) of a protein-bonding agent selected from the group consisting of an anhydride compound, carboxylic acid compound, carboxylate salt compound, and combinations thereof. Adhesive compositions containing ground plant meal as the protein component provide advantages in that ground plant meal is readily available at minimal cost from commercial sources and is a renewal feedstock.

Physical properties of the adhesive composition can be adjusted by altering the relative amount of (a) ground plant meal and (b) protein-bonding agent used in the adhesive composition For example, in certain embodiments, the adhesive composition comprises from about 1% (w/w) to about 25% (w/w) ground plant meal. In certain other embodiments, the adhesive composition comprises from about 2% (w/w) to about 10% (w/w) ground plant meal.

In certain other embodiments, the composition comprises from about 2% (w/w) to about 5% (w/w) ground plant meal. In certain embodiments, the ratio of (i) the weight percent of ground plant meal in the adhesive composition to (ii) the weight percent of protein-bonding agent in the adhesive composition is from about 10:1 to about 1:1. In certain embodiments, the ratio of (i) the weight percent of ground plant meal in the adhesive composition to (ii) the weight percent of protein-bonding agent in the adhesive composition is from about 5:1 to about 1:1.

In certain embodiments, the protein-bonding agent is an anhydride compound and the ratio of (i) the weight percent of ground plant meal in the adhesive composition to (ii) the weight percent of anhydride compound in the adhesive composition is from about 25:1 to about 1:4, from about 15:1 to about 1:1, from about 10:1 to about 1:1, or from about 4:1 to about 2:1. In certain embodiments, the ratio of (i) the weight percent of ground plant meal in the adhesive composition to (ii) the weight percent of anhydride compound in the adhesive composition is from about 5:1 to about 1:1.

The adhesive composition may optionally further comprise isolated water-soluble protein fraction. Isolated water-soluble protein fraction is described in more detail in Section II.

Additionally, the adhesive composition may optionally further comprise isolated water-insoluble/water-dispersible protein fraction. The isolated water-insoluble/water-dispersible protein fraction is described in detail in Section II and may be characterized by one or more of the following features: (a) an amide-I absorption band between about 1620 $cm^{-1}$ and 1632 $cm^{-1}$ and an amide-II band between approximately 1514 $cm^{-1}$ and 1521 $cm^{-1}$, as determined by solid state Fourier Transform Infrared Spectroscopy (FTIR), (b) a prominent 2° amide N—H stretch absorption band centered at about 3272 $cm^{-1}$, as determined by solid state FTIR, (c) an average molecular weight of between about 600 and about 2,500 Daltons, (d) two protonated nitrogen clusters defined by $^{15}N$ chemical shift boundaries at about 86.2 ppm and about 87.3 ppm, and $^{1}H$ chemical shift boundaries at about 7.14 ppm and 7.29 ppm for the first cluster, and $^{1}H$ chemical shift boundaries at about 6.66 ppm and 6.81 ppm for the second cluster, as determined by solution state, two-dimensional proton-nitrogen coupled NMR, and (e) is capable of dispersing an oil-in-water or water-in-oil to produce a homogeneous emulsion that is stable for least 5 minutes.

Part C: Adhesive Compositions Containing Isolated Water-Insoluble/Water-Dispersible Protein Fraction Another aspect of the invention provides an adhesive composition comprising: (a) an isolated water-insoluble/water-dispersible protein fraction; and (b) at least 0.1% (w/w) of a protein-bonding agent selected from the group consisting of an anhydride compound, carboxylic acid compound, carboxylate salt compound, and combinations thereof. The isolated water-insoluble/water-dispersible protein fraction is described in more detail in Section II and may be derived from corn, wheat, sunflower, cotton, rapeseed, canola, castor, soy, camelina, flax, jatropha, mallow, peanuts, algae, sugarcane begasse, tobacco, whey, or a combination thereof.

In certain embodiments, the protein-bonding agent is an anhydride compound.

II. Plant Protein Composition

The plant protein composition is derived from plant biomass and, as such, provides the benefit that it is a renewable feedstock. The plant protein composition may be isolated water-soluble protein fraction, isolated water-insoluble/water-dispersible protein fraction, or ground plant meal as described in more detail below.

A. Preparation of isolated Water-Soluble Protein Fraction and Preparation of Isolated Water-Insoluble/Water-Dispersible Protein Fraction The water-soluble protein fraction and the water-insoluble/water-dispersible protein fraction can be obtained from plant material using the Water Washing Method or the Acid Precipitation Method described below. The plant material used as starting material in the Water Washing Method and the Acid Precipitation Method can be, for example, corn, wheat, sunflower, cotton, rapeseed, canola, castor, soy, camelina, flax, jatropha, mallow, peanuts, algae, sugarcane bagasse, tobacco, or whey. In certain embodiments, the plant material used as starting material in the Water Washing Method and the Acid Precipitation Method is plant meal or a protein isolate. The protein composition obtained from the Water Washing Method and or Acid Precipitation Method may optionally be further modified by enzymatic digestion and/or chemical modification.

The terms "protein" and "polypeptide" are used synonymously and refer to polymers containing amino acids that are joined together, for example, via peptide bonds or other bonds, and may contain naturally occurring amino acids or modified amino acids. The polypeptides can be isolated from natural sources or synthesized using standard chemistries. The polypeptides may be modified or derivatized by either natural processes, such as post-translational processing, or by chemical modification techniques well known in the art. Modifications or derivatizations may occur anywhere in the polypeptide, including, for example, the peptide backbone, the amino acid side-chains and the amino or carboxyl termini. Modifications include, for example, cyclization, disulfide bond formation, demethylation, deamination, formation of covalent cross-links, formation of pyroglutamate, formylation, gamma-carboxylation, glycosylation, GPI anchor formation, hydroxylation, iodination, methylation, myristolyation, oxidation, pegylation, proteolytic digestion, phosphorylation, etc.

Water Washing Method

Water-insoluble/water-dispersible protein fraction can be isolated from plant meal (e.g., castor meal, soy meal, or canola meal) by washing with water to remove water-soluble proteins and water-soluble components. The residue left after the water wash is the water-insoluble/water-dispersible protein fraction. The water-soluble protein fraction can be isolated by concentrating aqueous extracts from the water washing. Plant meal used in the process can be ground to reduce particle size, which may, in certain instances, provide processing advantages.

Water-insoluble/water-dispersible protein fraction can also be isolated from, for example, soy protein isolate or from soy flour. The procedure involves washing the soy protein isolate or soy flour with water to remove water-soluble proteins and water-soluble components from the respective soy protein isolate or the water-flour mixture.

The water-insoluble/water-dispersible protein fraction described above may be used directly as a wet slurry in an adhesive composition, or it may be dried and optionally ground to form a particulate mixture. Similarly, the water-soluble protein fraction described above may be used directly as a wet slurry in an adhesive composition, or it may be dried and optionally ground to form a particulate mixture.

In certain embodiments, the pH of the water used to wash the plant meal is about 7. In certain other embodiments, the pH of the water used to perform one or more of the washes may be alkaline.

It is appreciated that the water-insoluble/water-dispersible protein fraction obtained using the Water Washing Method may, in certain instances, contain water-insoluble components in addition to water-insoluble protein. If the performance requirements of an adhesive require a water-insoluble/water-dispersible protein fraction having a larger amount of water-insoluble protein, then the Acid Precipitation Method can be used to prepare the water-insoluble/water-dispersible protein fraction.

Acid Precipitation Method

Water-insoluble/water-dispersible protein fraction comprising a relatively higher quantity of water-insoluble protein can be prepared using the Acid Precipitation Method. The Acid Precipitation Method is shown schematically in FIG. 1. This method can also be used to obtain water-soluble protein fraction.

As shown in FIG. 1, the starting material (for example, ground meal) is dispersed in alkaline, aqueous media at pH 6.5-13 for at least 5 minutes, at least 20 minutes, at least 40 minutes or at least 1 hour, to form a mixture. Starting materials include, for example, canola meal, canola protein isolate, castor meal, castor protein isolate, soy meal, or soy protein isolate, or a combination thereof. Then, the pH of the mixture is lowered by the addition of acid (to provide a mixture with a pH in the range of, for example, 4.0-5.0) to precipitate both a portion of water-soluble proteins and water-insoluble proteins. Then, the water-insoluble material (i.e., the precipitate) is harvested. The harvested material is washed with water and the remaining water-insoluble/water-dispersible material is harvested. The resulting water-insoluble/water-dispersible material can be used as is or dried using drying techniques known in the art.

Further, as shown in FIG. 1, the water-soluble proteins can be harvested at a number of places. For example, water-soluble proteins can be harvested after the starting material is mixed in aqueous media, after neutralization, and as a supernatant from the washing steps. The resulting protein can be used as is or dried using drying techniques known in the art.

The water-insoluble/water-dispersible material produced according to the method in FIG. 1 can disperse or emulsify oil in water or water in oil. The physical and chemical properties of the water-soluble/water-dispersible fraction are described in more detail below. In addition, the physical and chemical properties of the water-soluble protein fraction are described in more detail below.

Enzymatic Digestion/Chemical Hydrolysis

The Water Washing Method and Acid Precipitation Method can include one or more enzyme digestion and/or chemical hydrolysis steps. Digestion can be facilitated using one or more enzymes, and hydrolysis can be facilitated using one or more chemicals, for example, acid- or alkali-based hydrolysis. For example, in the Acid Precipitation Method, the starting material (for example, the ground meal) can be exposed to enzymatic digestion before or after, or both before and after the incubation of the starting material in the alkaline aqueous media. Alternatively, or in addition, an enzymatic digestion step can be performed on the material following addition of acid to provide a mixture with a pH in the range of 4.0 to 5.0. Alternatively, or in addition, the harvested water-insoluble/water-dispersible material can be exposed to enzymatic digestion prior to washing. Alternatively, or in addition, the material harvested after washing can be exposed to enzymatic digestion. Chemical hydrolysis, however, can occur with or replace the enzymatic digestion steps noted above.

It is understood that enzymes useful in the digestion of the protein fractions include endo- or exo-protease of bacterial, fungal, animal or vegetable origin or a mixture of thereof. Useful enzymes include, for example, a serine-, leucine-, lysine-, or arginine-specific protease. Exemplary enzymes include trypsin, chymotrypsins A, B and C, pepsin, rennin, microbial alkaline proteases, papain, ficin, bromelain, cathepsin B, collagenase, microbial neutral proteases, carboxypeptidases A, B and C, camosinase, anserinase, V8 protease from *Staphylococcus aureus* and many more known in the art. Also combinations of these proteases may be used.

Also commercially available enzyme preparations such as, for example, Alcalase®, Chymotrypsine 800s, Savinase®, Kannase®, Everlase®, Neutrase®, Flavourzyme® (all available from Novo Nordisk, Denmark), Protex 6.0L, Peptidase FP, Purafect®, Purastar OxAm®, Properase® (available from Genencor, USA), Corolase L10 (Rohm, Germany), Pepsin (Merck, Germany), papain, pancreatin, proleather N and Protease N (Amano, Japan), BLAP and BLAP variants available from Henkel, K-16-like proteases available from KAO, or combinations thereof. Table 1 describes the amino acid specificity of certain useful endonucleases.

TABLE 1

| No. | Amino Acid | Notation | Commercial Endopeptidase(s) |
|---|---|---|---|
| 1 | Alanine | A | Pronase ®; Neutrase ®: |
| 2 | Cysteine | C | Papain |
| 3 | Aspartic | D | Fromase ®; |
| 4 | Glutamic | E | Alcalase ®; |
| 5 | Phenylalanine | F | Neutrase ®: Fromase ® |
| 6 | Glycine | G | Flavorzyme ®; Neutrase ®: |
| 7 | Histidine | H | Properase ®; |
| 8 | Isoleucine | I | Neutrase ®: |
| 9 | Lysine | K | Alcalase ®; Trypsin; Properase ® |
| 10 | Leucine | L | Alcalase ®; Esperase ®; Neutrase ®: |
| 11 | Methionine | M | Alcalase ®; Neutrase ®: |
| 12 | Asparagine | N | Savinase ®; Flavourzyme ®; Duralase ®; |
| 13 | Proline | P | Pronase ®; Neutrase ®: |
| 14 | Glutamine | Q | Alcalase ® |
| 15 | Arginine | R | Trypsin; Properase ®; |
| 16 | Serine | S | Savinase ®; Flavourzyme ®; Duralase ®; |
| 17 | Threonine | T | Savinase ®; Flavourzyme ®; Duralase ®; |
| 18 | Valine | V | Neutrase ®: |
| 19 | Tryptophan | W | Neutrase ®: Fromase ® |
| 20 | Tyrosine | Y | Alcalase ®; Esperase ®; Fromase ® |

Depending upon the choice of enzyme(s), enzymatic digestion usually is conducted under aqueous conditions at the appropriate pH conditions (for example, depending upon the enzyme or enzyme mixture at neutral or at low pH). In certain digestion systems, the digestion optimally occurs at a pH less than 9, or less than 8. For certain applications the pH of the aqueous protein digestion system is in the range of 3-9, 4-8 or 5-7.5.

Once digestion has proceeded to the desired extent, the resulting product optionally is washed and used as is or dried to form a powder. The drying can be performed by techniques known in the art, including spray drying, freeze drying, oven drying, vacuum drying, or exposure to desiccating salts (such as phosphorous pentoxide or lithium chloride).

Chemical Modification of Proteins

In certain embodiments, the proteins in the isolated protein fractions are further derivatized. Suitable processes for derivatization of the protein fractions are provided in the literature. The nature and extent of modification will depend in large part on the composition of the starting material. The derivative can be produced by, for example, replacing at least a portion of primary amine groups of said isolated protein with hydroxyl groups, deaminating the protein, or replacing a portion of amide groups of the protein with carboxyl groups, etc. In other embodiments, the isolated protein compositions described herein are obtained by reacting the protein with protein modifying agents, for example, nitrous oxide, nitrous acid, salts of nitrous acid, or a combination thereof.

B. Characterization of the Water-Insoluble/Water-Dispersible Protein Fraction

The water-insoluble/water-dispersible protein fraction can be characterized accordingly to multiple physical properties. For example, the water-insoluble/water-dispersible protein fraction can be characterized according to its capacity to disperse oil in water or water in oil. The water-insoluble/water-dispersible protein fraction should, at a minimum, disperse at least some oil in water or water in oil. The amount of oil that can be dispersed in water or the amount of water that can be dispersed in oil is a physical property that characterizes a water-insoluble/water-dispersible protein fraction.

The water-insoluble/water-dispersible protein fraction can also be characterized according to i) absorption band(s)

observed by solid state FTIR, ii) molecular weight range of the proteins in the fraction, and iii) features in a solution state, two-dimensional proton-nitrogen coupled NMR spectrum of the fraction.

Accordingly, in certain embodiments, the water-insoluble/water-dispersible fraction is characterized by one or more of the following features: (i) a prominent amide-I absorption band between about 1620 $cm^{-1}$ and 1645 $cm^{-1}$, (ii) an amide-II band between approximately 1514 $cm^{-1}$ and 1545 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1642 $cm^{-1}$ and an amide-II band between approximately 1514 $cm^{-1}$ and 1540 $cm^{-1}$, as determined by solid state FTIR, (ii) a prominent 2° amide N—H stretch absorption band centered at about 3272 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}N$ chemical shift boundaries at about 86.2 ppm and about 87.3 ppm, and $^1H$ chemical shift boundaries at about 7.14 ppm and 7.29 ppm for the first cluster, and $^1H$ chemical shift boundaries at about 6.66 ppm and 6.81 ppm for the second cluster, as determined by solution state, two-dimensional proton-nitrogen coupled NMR.

As described above, water-insoluble/water-dispersible fraction is capable of suspending or emulsifying oil in water or water in oil to produce a homogeneous suspension or emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the oil. As shown in Example 4, the water-insoluble/water-dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water-dispersible protein fraction produces a dispersion or emulsion exhibits substantially no phase separation by visual inspection for at least 5 minutes after mixing the polypeptide composition with the oil. The assay can be performed with the other oils.

In certain other embodiments, the water-insoluble/water-dispersible fraction is further characterized by its ability to emulsify or disperse, in water, one or more of the following hydrophobic liquids and hydrophobic solids: a silicone (e.g., a silicone oil or a silicone gel), a fluorocarbon (e.g., a solid wax fluorocarbon or a liquid oil fluorocarbon), a fluorinated polyol, a wax (e.g., a solid carboxylic acid ester (e.g., an ester of stearic acid), a salt of a carboxylic acid (e.g., a salt of stearic acid, e.g., zinc stearate), a hydrocarbon wax, and a fluorinated hydrocarbon wax), a liquid carboxylic acid ester that is hydrophobic, and a liquid hydrocarbon.

In yet other embodiments, the water-insoluble/water-dispersible fraction is further characterized by its ability to emulsify or disperse one or more of the following agents in water: BE Square 165 Amber Petroleum Microcrystalline Wax from Baker Hughes, Inc.; limonene; FluoroLink D-10 Fluorinated polyol from Solvay Solexis, Inc; Tego Protect-5000 functionalized silicone fluid from Evonik Tego Chemie GmbH; Soy Lecithin; Castor Oil; Zinc Stearate; Dow Corning FS-1265 Fluid, 300 cST (Trifluoropropyl Methicone) from Dow Corning; and T-Sil-80, hydroxy terminated polydimethylsiloxane from Siovation, Inc.

In yet other embodiments, the water-insoluble/water-dispersible fraction is further characterized by its ability to emulsify or disperse an amalgam comprising a partially exfoliated clay in an oil carrier. In yet other embodiments, the water-insoluble/water-dispersible fraction is further characterized by its ability to emulsify or disperse a melted wax in water. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the agent.

In certain embodiments, the water-insoluble/water-dispersible fraction is substantially free of primary amines, carboxylic acids, amine salts, and carboxylate salts.

The water-insoluble/water-dispersible protein fraction can act as a surfactant to an organic polyisocyanate (e.g., PMDI), lowering interfacial tension to the point where the water insoluble organic polyisocyante is readily emulsified with minimal energy input, creating an oil-in-water or water-in-oil emulsion.

In certain embodiments, the polypeptide fractions used in the compositions and methods provided herein, can have a weight average molecular weight of between about 500 and 25,000 Daltons. Useful polypeptide fractions can have a weight average molecular weight of between about 500 and 2,500 Daltons, between about 700 and 2,300 Da., between about 900 and 2,100 Da., between about 1,100 and 1,900 Da., between about 1,300 and 1,700 Da., or between about 1,000 and 1,300 Da., between about 2,000 and 2,500 Da., or between about 1,000 and 2,500 Da.

In certain embodiments, the water-insoluble/water-dispersible protein fraction provides a stable emulsion, dispersion or suspension, for example, an aqueous emulsion, dispersion or suspension, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion, dispersion or suspension optionally comprises from about 1% to about 50% (w/w) of oil and from about 1% to about 99% (w/w) of the isolated polypeptide composition. The term "stable" when used in reference to the emulsions, suspensions and dispersions refers to the ability of the polypeptide fraction described herein to create a kinetically stable emulsion for the duration of the intended application of the dispersion or emulsion. The terms "emulsion," "dispersion," and "suspension" are used interchangeably herein.

In certain embodiments, the polypeptide composition has a polydispersity index (PDI) of between about 1 and 1.15. In certain embodiments, the PDI of the adhesives provided created using the polypeptides described herein is between about 1 and about 3, between 1 and 1.5, between 1.5 and 2, between 2 and 2.5, between 2.5 and 3, between 1 and 2, between 1.5 and 2.5, or between 2 and 3.

C. Characterization of Water-Soluble Protein Fraction

The water-soluble protein fraction, for example, the water-soluble protein fraction isolated pursuant to the protocol set forth in FIG. 1, are substantially or completely soluble in water.

The water-soluble protein fraction has one or more of the following six features. (i) An amide-I absorption band between about 1633 cm$^{-1}$ and 1680 cm$^{-1}$, as determined by solid state FTIR. (ii) An amide-II band between approximately 1522 cm$^{-1}$ and 1580 cm$^{-1}$, as determined by solid state FTIR. (iii) Two prominent 1° amide N—H stretch absorption bands in the range of from about 3100-3200 cm$^{-1}$, and in the range of from about 3300-3400 cm$^{-1}$, as determined by solid state FTIR. (iv) A prominent cluster of protonated nitrogen nuclei defined by $^{15}$N chemical shift boundaries at about 94 ppm and about 100 ppm, and $^1$H chemical shift boundaries at about 7.6 ppm and 8.1 ppm, as determined by solution state, two-dimensional proton-nitrogen coupled NMR. (v) An average molecular weight of between about 600 and about 2,500 Daltons, for example, as determined by MALDI. (vi) An inability to stabilize an oil-in-water or water-in-oil dispersion or emulsion, where the water and oil components of the mixture form an unstable suspension that macroscopically phase separates under static conditions within five minutes after mixing. This can be tested by dissolving or dispersing 14 parts (by weight) of a protein sample of interest in 86 parts (by weight) of water and then mixing the resulting solution with 14 parts (by weight) of oil, for example, PMDI. Under these conditions, a water-soluble protein is characterized by an inability to stabilize an oil-in-water emulsion, where the oil and water components form an unstable suspension that macroscopically phase separates under static conditions within five minutes after mixing. In certain embodiments, the water-soluble protein has at least two, three, or four of the above features.

D. Ground Plant Meal

Plant meal can be obtained from commercial sources or derived from corn, wheat, sunflower, cotton, rapeseed, canola, castor, soy, camelina, flax, jatropha, mallow, peanuts, algae, sugarcane bagasse, tobacco, whey, or a combination thereof. Plant meal can be ground using techniques known in the art, such as hammer mill (cryogenic or ambient) or ball mill. In certain embodiments, the plant meal is ground and screened to isolate plant meal particles having a particle size in the range of from about 1 μm to about 400 μm, from about 1 μm to about 350 μm, from about 1 μm to about 300 μm, from about 1 μm to about 250 μm, from about 1 μm to about 200 μm, from about 1 μm to about 100 μm, from about 1 μm to about 50 μm, from about 5 μm to about 250 μm, from about 5 μm to about 200 μm, from about 5 μm to about 150 μm, from about 5 μm to about 100 μm, from about 5 μm to about 50 μm, from about 10 μm to about 250 μm, from about 10 μm to about 100 μm, from about 10 μm to about 90 μm, from about 10 μm to about 70 μm, from about 10 μm to about 50 μm, from about 20 μm to about 150 μm, from about 20 μm to about 100 μm, from about 20 μm to about 80 μm, from about 20 μm to about 70 μm, from about 20 μm to about 60 μm, from about 25 μm to about 150 μm, from about 25 μm to about 100 μm, from about 25 μm to about 50 μm, from about 50 μm to about 150 μm, or from about 50 μm to about 100 μm.

An additive may be added to the plant meal prior to grinding to aid in the grinding process or produce a ground plant meal with superior physical properties for use in manufacturing an adhesive composition, e.g., providing a ground plant meal with improved flow properties, superior packing density, reduced tendency to cake, reduced tendency to bridge, superior particle dispersibility in aqueous mixtures, modulation of particle coupling and/or wetting characteristics with other materials in the adhesive composition, and the like. Alternatively, the additive may be added to the plant meal during the grinding process used to produce ground plant meal.

Additives that impart superior performance properties to the adhesive composition or the wood composite formed from the adhesive composition may be added to the plant meal before or during grinding or may be added to the ground plant meal produced from the grinding process. Exemplary additives include those described in sections below, and, in particular, include composite-release promoting agents. The additive may be in solid or liquid form, and the additive may be characterized according to whether it reacts with materials in the adhesive composition or does not react with materials in the adhesive composition.

Exemplary solid additives include (i) inorganic additives such as silica, pigments, catalysts, clays (including intercalated clays, exfoliated clays, and partially exfoliated clays), and the like, and (ii) organic compounds such as fatty acids (e.g., stearic acid, lauric acid), hydrocarbon waxes/liquids, ureas, and fluorocarbon waxes/liquids. Solid additives may be used in amounts ranging, for example, from about 0.001% w/w to 40% w/w of the ground plant meal mixture, from about 0.1% w/w to about 20% w/w of the ground plant meal mixture, or from about 0.5% w/w to about 15% w/w of the ground plant meal mixture.

Liquid additives may be dry blended with ground plant meal. The amount of liquid additive should be less than that which causes the ground plant meal to cake or bridge during a manufacturing process. Accordingly, in certain embodiments, the amount of liquid additive(s) is less than about 10% by weight of the ground plant meal mixture containing the additive(s). In certain other embodiments, the amount of liquid additive(s) is less than about 5% by weight, or even less than about 2% by weight, of the ground plant meal mixture containing the additive. The liquid additive may be characterized as reactive or non-reactive. Reactive liquid additives may include organosilanes, low molecular weight alcohols such as glycerin or propylene glycol, liquid polyol oligomers, liquid polyurethane oligomers, addition-polymerizable monomers, condensation-polymerizable monomers, and reactive oils such as epoxidized soy oil or castor oil.

III. Protein-Bonding Agents

The protein-bonding agent may be an anhydride compound, carboxylic acid compound, carboxylate salt compound, or a combination thereof. Exemplary anhydride compounds, carboxylic acid compounds, and carboxylate salt compounds are described below. In certain embodiments, the protein-bonding agent is provided in the form of a latex (e.g., an aqueous emulsion). Providing the protein-bonding agent is provided in the form of a latex can provide advantages in certain situations, such as (i) allowing incorporation of a high molecular weight polymer without substantially affecting viscosity of the adhesive composition, and/or (ii) permitting modulation of the Tg of the resulting pressure-sensitive adhesive.

Physical properties of the adhesive composition, and a solid binder composition formed from the adhesive composition, can be adjusted by adjusting the amount of protein-bonding agent in the adhesive composition. Accordingly, in certain embodiments, the adhesive composition comprises 0.1% (w/w) to about 50% (w/w) protein-bonding agent. In certain other embodiments, the adhesive composition comprises from 0.1% (w/w) to about 20% (w/w) protein-bonding agent. In certain other embodiments, the adhesive composition comprises from 0.1% (w/w) to about 1.5% (w/w) protein-bonding agent. In certain other embodiments, the adhesive composition comprises from about 0.5% (w/w) to about 1% (w/w) protein-bonding agent, about 3% (w/w) to about 10% (w/w) protein-bonding agent, or about 5% (w/w) to about 20% (w/w) protein-bonding agent.

In certain embodiments, the protein-bonding agent and any optional polyol are the only components in the adhesive composition that can form a covalent bond with a protein of the isolated-water soluble protein fraction. In certain other embodiments, any component capable of forming a covalent bond with the isolated-water soluble protein fraction other than said protein-bonding agent and said polyol is present in an amount less than about 10% (w/w), 5% (w/w), or 1% (w/w) of the adhesive composition. In certain other embodiments, any component capable of forming a covalent bond with the isolated-water soluble protein fraction other than said protein-bonding agent is present in an amount less than about 10% (w/w), 5% (w/w), or 1% (w/w) of the adhesive composition.

Part A: Anhydride Compounds

The term "anhydride compound" refers to a compound containing at least one —C(O)—O—C(O)— functional group and includes, for example, (i) small organic compounds that contain at least one —C(O)—O—C(O)— functional group, oligomers that contain at least one —C(O)—O—C(O)— functional group, and polymers that contain at least one —C(O)—O—C(O)— functional group. Exemplary anhydride compounds useful in the practice of the invention are described below.

Exemplary small organic compounds containing at least one —C(O)—O—C(O)— functional group include maleic anhydride, phthalic anhydride, succinic anhydride, methacrylic anhydride, glutaric anhydride, citraconic anhydride, isatoic anhydride, diglycolic anhydride, itaconic anhydride, trans-1,2-cyclohexanedicarboxylic anhydride, 2,3-dimethylmaleic anhydride, valeric anhydride, homophthalic anhydride, stearic anhydride, phenylsuccinic anhydride, and 3,4,5,6-tetrahydrophthalic anhydride.

Exemplary classes of anhydride compounds that are small organic compounds containing at least one —C(O)—O—C(O)— functional group include, for example, compounds represented by formula $R^1$—C(O)—O—C(O)—$R^2$, wherein $R^1$ and $R^2$ each represent independently for each occurrence alkyl, heteroalkyl, cycloalkyl, heterocycloalkyl, aryl, heteroaryl, aralkyl, or heteroaralkyl, each of which are optionally substituted by 1, 2, or more substituents; or $R^1$ and $R^2$ are taken together with the atoms to which they are attached to form a 3-7 membered saturated or unsaturated ring that is optionally substituted by 1, 2, or more substituents.

In certain embodiments, the anhydride compound is an anhydride monomer, such as maleic anhydride. In certain other embodiments, the anhydride compound is an anhydride monomer or a polymer containing an anhydride.

In certain other embodiments, the anhydride compound is a polymer containing an anhydride. Exemplary classes of polymers containing an anhydride functional group include, for example, poly(alkylvinylether-co-unsaturated anhydride), polyalkylene-unsaturated anhydride copolymer, and arylalkene-unsaturated anhydride copolymer. Exemplary specific polymers containing an anhydride functional group include, for example, poly(methylvinylether-co-maleic anhydride), polypropylene-maleic anhydride copolymer, polyethylene-maleic anhydride copolymer, and styrene-maleic anhydride.

Accordingly, in certain embodiments, the anhydride compound is a poly(alkylvinylether-co-unsaturated anhydride), polyalkylene-unsaturated anhydride copolymer, or arylalkene-unsaturated anhydride copolymer. In certain other embodiments, the anhydride compound is poly(methylvinylether-co-maleic anhydride), polypropylene-maleic anhydride copolymer, polyethylene-maleic anhydride copolymer, or styrene-maleic anhydride copolymer. In certain other embodiments, the anhydride compound is a poly(methylvinylether-co-maleic anhydride).

In certain embodiments, the anhydride compound is a anhydride functionalized form of carboxymethyl cellulose, poly(sebacic acid), or poly(succinic acid).

In certain embodiments, the anhydride compound comprises (i) at least one anhydride functional group, and (ii) at least one carboxylic acid or carboxylate functional group. One example of such a compound is partially hydrolyzed poly(methylvinylether-co-maleic anhydride), which refers to poly(methylvinylether-co-maleic anhydride) that has been subjected to aqueous alkaline conditions in order to convert some (e.g., at least 5%, 10%, or 25%) of the anhydride groups to carboxylate groups (e.g., an alkali metal carboxylate group). Counterion(s) of the carboxylate groups can include, for example, metal ions such as $Na^+$, $K^+$, $Ca^{2+}$, $Mg^{2+}$, $Zn^{2+}$, and $Fe^{2+}$ originating from, for example, metal salts such as NaOH and/or $Ca(OH)_2$. Partially hydrolyzed poly(methylvinylether-co-maleic anhydride) can provide advantages when used in an adhesive composition comprising water because, for example, the partially hydrolyzed poly(methylvinylether-co-maleic anhydride) is more soluble in water than poly(methylvinylether-co-maleic anhydride). Accordingly, in certain embodiments, the anhydride compound is a partially hydrolyzed poly(methylvinylether-co-maleic anhydride). Accordingly, in certain embodiments, the anhydride compound is a partially hydrolyzed poly(methylvinylether-co-maleic anhydride) in which the ratio of anhydride groups to carboxylate groups in the range of about 20:1 to about 1:1, about 20:1 to about 5:1, or 20:1 to about 10:1.

In certain embodiments, the anhydride compound is a polymer comprising: (a) at least one

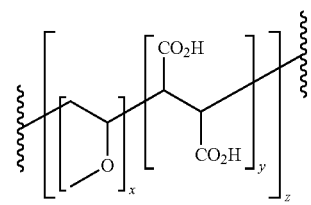

or a salt thereof, wherein x is independently for each occurrence an integer from 1 to 10, y is independently for each occurrence an integer of from 1 to 10, and z is independently for each occurrence an integer of from 1 to 10; and (b) at least one

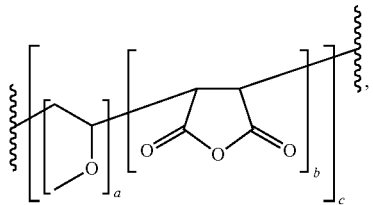

wherein a is independently for each occurrence an integer from 1 to 10, b is independently for each occurrence an integer of from 1 to 10, and c is independently for each occurrence an integer of from 1 to 10.

In certain embodiments, the anhydride compound is a poly(methylvinylether-co-maleic anhydride), polypropylene-maleic anhydride copolymer, polyethylene-maleic anhydride copolymer, or styrene-maleic anhydride copolymer, each of which has partially hydrolyzed in order to convert some (e.g., at least 5%, 10%, or 25%) of the anhydride groups to carboxylate groups (e.g., an alkali metal carboxylate group) or carboxylic acid groups.

In certain embodiments, the anhydride compound is a polymer (such as one of the polymers described above) having a weight average molecular weight in the range of from about 30,000 g/mol to about $3\times10^6$ g/mol, about 50,000 g/mol to about $2\times10^6$ g/mol, about 100,000 g/mol to about $1\times10^6$ g/mol, about $1\times10^6$ g/mol to about $3\times10^6$ g/mol, or about 1.5 to about $2.5\times10^6$ g/mol.

In other embodiments, the anhydride compound is a conjugate formed by bonding (e.g., by grafting) an anhydride group to a naturally occurring compound. Exemplary naturally occurring compounds suitable for grafting include, for example, linseed oil and castor oil.

Physical properties of the adhesive composition, and a solid binder composition formed from the adhesive composition, can be adjusted by adjusting the amount of anhydride compound in the adhesive composition. Accordingly, in certain embodiments, the adhesive composition comprises from 0.1% (w/w) to about 50% (w/w) anhydride compound. In certain other embodiments, the adhesive composition comprises from 0.1% (w/w) to about 20% (w/w) anhydride compound. In certain other embodiments, the adhesive composition comprises from 0.1% (w/w) to about 1.5% (w/w) anhydride compound. In certain other embodiments, the adhesive composition comprises from about 0.5% (w/w) to about 1% (w/w) anhydride compound.

Part B: Carboxylic Acid Compound

The term "carboxylic acid compound" refers to a compound containing at least one —$CO_2H$ functional group and includes, for example, (i) small organic compounds that contain at least one —$CO_2H$ functional group, oligomers that contain at least one —$CO_2H$ functional group, and polymers that contain at least one —$CO_2H$ functional group. Exemplary carboxylic acid compounds useful in the practice of the invention are described below.

Exemplary small organic compounds containing at least one —$CO_2H$ functional group include citric acid, sebacic acid, maleic acid, phthalic acid, succinic acid, methacrylic acid, glutaric acid, citraconic acid, isatoic acid, diglycolic acid, itaconic acid, trans-1,2-cyclohexanedicarboxylic acid, 2,3-dimethylmaleic acid, valeric acid, homophthalic acid, stearic acid, phenylsuccinic acid, and 3,4,5,6-tetrahydrophthalic acid. In certain embodiments, the carboxylic acid compound is a small organic compound that contains 2 or 3 —$CO_2H$ functional groups.

Exemplary classes of carboxylic acid compounds that are small organic compounds containing one to three —$CO_2H$ functional groups include, for example, compounds represented by formula $R^1$—$(CO_2H)_{1-3}$, wherein $R^1$ is alkyl, heteroalkyl, cycloalkyl, heterocycloalkyl, aryl, heteroaryl, aralkyl, or heteroaralkyl, each of which are optionally substituted by 1, 2, or more substituents; or $R^1$ and $R^2$ are taken together with the atoms to which they are attached to form a 3-7 membered saturated or unsaturated ring that is optionally substituted by 1, 2, or more substituents.

In certain other embodiments, the carboxylic acid compound is a polymer containing at least one carboxylic acid group. Exemplary classes of polymers containing at least one carboxylic acid group include, for example, naturally occurring polymers that contain at least one carboxylic acid group, and synthetic polymers that contain at least one carboxylic acid group. Exemplary specific polymers containing a carboxylic acid group include alginic acid, carboxymethyl cellulose, poly(sebacic acid), poly(succinic acid), poly(glycolic acid), poly(lactic acid), and copolymers of lactic acid and glycolic acid (such as RESOMER® polymers sold by Evonik Industries). In certain embodiments, the carboxylic acid compound comprises alginic acid, carboxymethyl cellulose, poly(sebacic acid), poly(succinic acid), poly(glycolic acid), poly(lactic acid), or a copolymer of lactic acid and glycolic acid.

In embodiments where the carboxylic acid compound is a polymer, the polymer may have, for example, a weight average molecular weight in the range of from about 30,000 g/mol to about $3\times10^6$ g/mol, about 50,000 g/mol to about $2\times10^6$ g/mol, about 100,000 g/mol to about $1\times10^6$ g/mol, about $1\times10^6$ g/mol to about $3\times10^6$ g/mol, or about 1.5 to about $2.5\times10^6$ g/mol.

In certain embodiments, the carboxylic acid compound is (i) a polysaccharide containing at least one carboxylic acid group, or (ii) an acrylic acid copolymer. In certain other embodiments, the carboxylic acid compound is alginic acid.

Part C: Carboxylate Salt Compound

The term "carboxylate salt compound" refers to a compound containing at least one —$CO_2^-M^+$ functional group (where M+ is a moiety bearing an positive charge, such as metal cation like $Na^+$, $K^+$, $Ca^{2+}$, $Mg^{2+}$, $Zn^{2+}$, or $Fe^{2+}$, or a quaternary amine like $NH_4^+$) and includes, for example, (i) small organic compounds that contain at least one —$CO_2^-M^+$ functional group, oligomers that contain at least one —$CO_2^-M^+$ functional group, and polymers that contain at least one —$CO_2^-M^+$ functional group. Exemplary carboxylate salt compounds useful in the practice of the invention are described below.

In certain embodiments, the carboxylate salt compound contains at least one —$CO_2^-M^+$ functional group where $M^+$ is a metal cation. In certain other embodiments, the metal cation is selected from the group consisting of an alkali metal cation, an alkaline earth metal cation, a transition metal cation, and combinations thereof. In certain other embodiments, the metal cation is selected from the group consisting of an alkali metal cation, an alkaline earth metal cation, and combinations thereof. In certain other embodiments, the metal cation is selected from the group consisting of $Na^+$, $K^+$, $Ca^{2+}$, $Mg^{2+}$, $Zn^{2+}$, $Fe^{2+}$, and combinations thereof, wherein any divalent metal cation is bonded to two carboxylate groups. In certain other embodiments, the metal cation is selected from the group consisting of $Na^+$, $Ca^{2+}$, and combinations thereof, wherein $Ca^{2+}$ is bonded to two carboxylate groups. It is appreciated that the definition of $M^+$ in $-CO_2^-M^+$ results in a compound that is charge neutral, such as where if $M^+$ is a divalent cation then the divalent cation is bonded to (i) two carboxylate groups or (ii) one carboxylate group and one anion such as —OH or a halogen.

Exemplary small organic compounds containing at least one $-CO_2^-M^+$ functional group include a citrate salt, sebacate salt, maleate salt, phthalate salt, succinate salt, methacrylate salt, glutarate salt, citraconate salt, isatoic acid salt, diglycolate salt, itaconate salt, trans-1,2-cyclohexanedicarboxylate salt, 2,3-dimethylmaleate salt, valerate salt, homophthalate salt, stearate salt, phenylsuccinate salt, and 3,4,5,6-tetrahydrophthalate salt. In certain other embodiments, the carboxylate salt compound is a polymer containing at least one carboxylate salt group. Exemplary classes of polymers containing at least one carboxylate salt group include, for example, naturally occurring polymers that contain at least one carboxylate salt group, and synthetic polymers that contain at least one carboxylate salt group. An exemplary specific polymer containing a carboxylic acid group is sodium alginate. In certain embodiments, the carboxylic acid compound is (i) a polysaccharide containing at least one carboxylate salt group, or (ii) a copolymer comprising an alkylene carboxylate salt (such as the sodium or potassium salt of an acrylic acid copolymer). In certain other embodiments, the carboxylate salt compound is a metal salt of alginate, such as an alkali metal salt of alginate.

In embodiments where the carboxylate salt compound is a polymer, the polymer may have, for example, a weight average molecular weight in the range of from about 30,000 g/mol to about $3\times10^6$ g/mol, about 50,000 g/mol to about $2\times10^6$ g/mol, about 100,000 g/mol to about $1\times10^6$ g/mol, about $1\times10^6$ g/mol to about $3\times10^6$ g/mol, or about 1.5 to about $2.5\times10^6$ g/mol.

In certain embodiments, the carboxylate salt compound is a carboxylate salt functionalized carboxymethyl cellulose, poly(sebacic acid), or poly(succinic acid).

IV. Plasticizer

The adhesive compositions may further comprise a plasticizer. One benefit provided by the plasticizer is that it may increase the adhesive tack of a solid binder composition formed by curing the adhesive composition. Although not wishing to be bound by a particular theory, the plasticizer may increase adhesive tack by lowering the glass transition temperature of the solid binder composition formed by curing the adhesive composition.

One exemplary class of plasticizers are polyols. Accordingly, in certain embodiments, the plasticizer is a polyol.

Exemplary specific plasticizers, include, for example, glycerol, sorbitol, glycerol diacetate, ethylphthalyl glycolate, butylphthalylethyl glycolate, butylglycolate, propylene glycol, polyethylene glycol, polyethylene glycol sorbitan monooleate, sorbitan monooleate, 1,2-propane diol, and 1,3-propane diol. Accordingly, in certain embodiments, the plasticizer is glycerol, sorbitol, glycerol diacetate, ethylphthalyl glycolate, butylphthalylethyl glycolate, butylglycolate, propylene glycol, polyethylene glycol, polyethylene glycol sorbitan monooleate, sorbitan monooleate, 1,2-propane diol, or 1,3-propane diol. In certain other embodiments, the plasticizer is glycerol.

Physical properties of the adhesive composition, and a solid binder composition formed from the adhesive composition, can be adjusted by adjusting the amount of plasticizer in the adhesive composition. Accordingly, in certain embodiments, the adhesive composition comprises from about 1% to about 50% (w/w) of a plasticizer. In certain other embodiments, the adhesive the composition comprises from about 1% (w/w) to about 30% (w/w) of a plasticizer. In certain other embodiments, the adhesive composition comprises from about 5% (w/w) to about 30% (w/w) of a plasticizer. In certain other embodiments, the adhesive the composition comprises from about 5% (w/w) to about 10% (w/w) of a plasticizer.

V. Water

The adhesive composition may further comprise water. In certain embodiments, the adhesive composition contains an amount of water sufficient to produce the adhesive composition as a liquid (as compared to a granular mixture). Liquid adhesives can provide advantages, such as easy of application to a substrate.

The amount of water in the adhesive composition can be selected in order to achieve certain performance characteristics for the adhesive composition. Accordingly, in certain embodiments, water is present in an amount of from about 20% w/w to about 95% w/w of the adhesive composition. In certain other embodiments, water is present in an amount of from about 40% w/w to about 60% w/w of the adhesive composition. In certain other embodiments, water is present in an amount of from about 40% w/w to about 80% w/w of the adhesive composition. In certain other embodiments, water is present in an amount of from about 80% w/w to about 90% w/w of the adhesive composition. In certain other embodiments, water is present in an amount of from about 35% w/w to about 60% w/w of the adhesive composition.

In embodiments where the adhesive composition contains a sufficient amount of water so as to be able to measure the pH of the adhesive composition, the adhesive composition may be further characterized according to its pH. In certain embodiments, the adhesive composition has a pH in the range of from about 7 to about 10.

VI. Epoxide Compound

The adhesive compositions may optionally further comprise an epoxide compound. The epoxide compound may undergo reaction with amine groups of the protein component, which can modify physical properties of the adhesive composition. In certain embodiments, the epoxide compound is an alkyl epoxide, heteroalkyl epoxide, cycloalkyl epoxide, heterocycloalkyl epoxide, aryl epoxide, heteroaryl epoxide, aralkyl epoxide, or heteroaralkyl epoxide, each of which are optionally substituted by 1, 2, or more substituents. Additional exemplary epoxide compounds include epoxidized soy oil and epoxidized linseed oil. The epoxide compound may be provided in the form of an emulsion, such as an emulsion containing epoxidized soy oil and/or epoxidized linseed oil.

VII. Reactive Prepolymer

The adhesive compositions may optionally comprise a reactive prepolymer. The term "prepolymer" is understood to mean a compound, material or mixture that is capable of reacting with a plant protein composition described herein to form an adhesive polymer. Exemplary prepolymers include, for example, isocyanate-based prepolymers, epoxy-based prepolymers, and latex prepolymers. Further exemplary prepolymers include an organic polyisocyanate; a reaction product between an organic polyisocyanate and a polypeptide, a polyol, an amine based polyol, an amine containing compound, a hydroxy containing compound, or a combination thereof; an epoxy containing compound; a reaction product between an epoxy containing compound and a polypeptide, a polyol, an amine based polyol, an amine containing compound, a hydroxy containing compound, or a combination thereof; an organosilane; a polymer latex; a polyurethane; and a mixture thereof.

In certain embodiments, the reactive prepolymer is a polyisocyanate-based prepolymer, an epoxy-based prepolymer, a latex-based prepolymer, a latex prepolymer, or a combination thereof.

The term "prepolymer" includes full prepolymers and partial prepolymers (referred to as semiprepolymers, pseudoprepolymers, or quasiprepolymers in certain embodiments). One example of a quasi prepolymer is a NCO-terminated product prepared from a diisocyanate and polyol in which the prepolymer is a mixture of (i) a product prepared from the diisocyanate and polyol, and (ii) unreacted diisocyanate. On the other hand, an example of a full prepolymer is the product formed by reacting an isocyanate with a particular polyol blend so that there are substantially no residual monomeric isocyanates in the finished product.

An isocyanate-based prepolymer can be an organic polyisocyanate, which can be (i) a polyisocyanate (or monomeric diisocyanate) that has not been reacted with another compound, (ii) a polyisocyanate modified by various known self-condensation reactions of polyisocyanates, such as carbodiimide modification, uretonimine modification, trimer (isocyanurate) modification or a combination thereof, so long as the modified polyisocyanate still contains free isocyanate groups available for further reaction, or (iii) the product formed by reaction of a polyisocyanate base with a compound having nucleophilic functional groups capable of reacting with an isocyanate group. Exemplary compounds containing a nucleophilic functional group capable of reacting with an isocyanate group include a polypeptide (for example, one or more of the protein fractions described herein), a polyol, an amine based polyol, an amine containing compound, a hydroxy containing compound, carboxylic acid containing compound, carboxylate salt containing compound, or a combination thereof. The term "polyisocyanate" refers to difunctional isocyanate species, higher functionality isocyanate species, and mixtures thereof.

One desirable feature of an isocyanate-based prepolymer is that the prepolymer remain stable enough for storage and use, desirably liquid and of reasonable viscosity at ambient temperatures (25° C.), and contains free isocyanate (—NCO) groups which can participate in forming adhesive bonds.

As noted above, the organic polyisocyanate can be prepared from a "base polyisocyanate." The term "base isocyanate" as used herein refers to a monomeric or polymeric compound containing at least two isocyanate groups. The particular compound used as the base polyisocyanate can be selected so as to provide an adhesive having certain desired properties. For example, base polyisocyanate can be selected based on the number-average isocyanate functionality of the compound. For example, in certain embodiments, the base polyisocyanate can have a number-average isocyanate functionality of 2.0 or greater, or greater than 2.1, 2.3 or 2.4. In certain embodiments, the reactive group functionality of the polyisocyanate component ranges from greater than 1 to several hundred, 2 to 20, or 2 to 10. In certain other embodiments, the reactive group functionality of the polyisocyanate component is at least 1.9. In certain other embodiments, the reactive group functionality of the polyisocyanate component is about 2. Typical commercial polyisocyanates (having an isocyanate group functionality in the range of 2 to 3) may be pure compounds, mixtures of pure compounds, oligomeric mixtures (an important example being polymeric MDI), and mixtures of these.

Useful base polyisocyanates have, in one embodiment, a number average molecular weight of from about 100 to about 5,000 g/mol, from about 120 to about 1,800 g/mol, from about 150 to about 1,000 g/mol, from about 170 to about 700 g/mol, from about 180 to about 500 g/mol, or from about 200 to about 400 g/mol. In certain other embodiments, at least 80 mole percent or, greater than 95 mole percent of the isocyanate groups of the base polyisocyanate composition are bonded directly to an aromatic group. In certain embodiments, the adhesives described herein have a concentration of free organically bound isocyanate (—NCO) groups in the range of from about 5% to 35% (w/w), about 7% to 31% (w/w), 10% to 25% (w/w), 10% to 20% (w/w), 15% to 27% (w/w).

In certain embodiments, the base polyisocyanate is an aromatic polyisocyanate, such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. In certain embodiments, polymethylene polyphenyl polyisocyanates (MDI series polyisocyanates) having a number averaged functionality greater than 2 are utilized as the base polyisocyanate.

In certain embodiments, the MDI base polyisocyanate comprises a combined 2,4'-MDI and 2,2'-MDI content of less than 18.0%, less than 15.0%, less than 10.0%, or less than 5.0%.

In certain other embodiments, the MDI diisocyanate isomers, mixtures of these isomers with tri- and higher functionality polymethylene polyphenyl polyisocyanates, the tri- or higher functionality polymethylene polyphenyl polyisocyanates themselves, and non-prepolymer derivatives of MDI series polyisocyanates (such as the carbodiimide, uretonimine, and/or isocyanurate modified derivatives) are utilized as polyisocyanates for use as the base polyisocyanate. In certain other embodiments, the base polyisocyanate composition comprises an aliphatic polyisocyanate (e.g., in a minor amount), e.g., an aliphatic polyisocyanate comprising an isophorone diisocyanate, 1,6-hexamethylene diisocyanate, 1,4-cyclohexyl diisocyanate, or saturated analogues of the above-mentioned aromatic polyisocyanates, or mixtures thereof.

In certain other embodiments, the base polyisocyanate comprises a polymeric polyisocyanate, e.g., a polymeric diphenylmethane diisocyanate (polymethylene polyphenyl polyisocyanate) species of functionality 3, 4, 5, or greater. In certain embodiments, the polymeric polyisocyanates of the MDI series comprise RUBINATE-M® polyisocyanate, or a mixture of MDI diisocyanate isomers and higher functionality oligomers of the MDI series. In certain embodiments, the base polyisocyanate product has a free —NCO content of about 31.5% by weight and a number averaged functionality of about 2.7.

In certain embodiments, the isocyanate group terminated prepolymers are urethane prepolymers. These can be produced by reaction of a hydroxyl-functional compound with an isocyanate functional compound. In certain other embodiments, allophanate prepolymers are utilized. Allophanate prepolymers typically require higher temperatures (or allophanate catalysts) to facilitate reaction of the polyol with the polyisocyanate to form the allophanate prepolymer.

Polyisocyanates used in the compositions described can have the formula $R(NCO)_n$ where n is 2 and R can be an aromatic, a cycloaliphatic, an aliphatic, each having from 2 to about 20 carbon atoms. Examples of polyisocyanates include, but are not limited to, diphenylmethane-4,4'-diisocyanate (MDI), toluene-2,4-diisocyanate (TDI), toluene-2,6-diisocyanate (TDI), methylene bis(4-cyclohexylisocyanate (CHMDI), 3-isocyanatomethyl-3,5,5-trimethylcyclohexyl isocyanate (IPDI), 1,6-hexane diisocyanate (HD1), naphthalene-1,5-diisocyanate (NDI), 1,3- and 1,4-phenylenediisocyanate, triphenylmethane-4,4',4''-triisocyanate, polymeric diphenylmethane diisocyanate (PMDI), m-xylene diisocyanate (XDI), 1,4-cyclohexyl diisocyanate (CHD1), isophorone diisocyanate, isomers, dimers, trimers and mixtures or combinations of two or more thereof. The term "PMDI" encompasses PMDI mixtures in which monomeric MDI, for example 4,4'-, 2,2'- and/or 2,4'-MDI, is present. PMDI is, in one embodiment, prepared by phosgenation of the corresponding PMDA in the presence of an inert organic solvent. PMDA is in turn obtained by means of an acid aniline-formaldehyde condensation which can be carried out industrially either continuously or batchwise. The proportions of diphenylmethanediamines and the homologous polyphenylpolymethylenepolyamines and their positional isomerism in the PMDA are controlled by selection of the ratios of aniline, formaldehyde and acid catalyst and also by means of a suitable temperature and residence time profile. High contents of 4,4'-diphenylmethanediamine together with a simultaneously low proportion of the 2,4' isomer of diphenylmethanediamine are obtained on an industrial scale by the use of strong mineral acids such as hydrochloric acid as catalyst in the aniline-formaldehyde condensation.

The epoxy-based prepolymer can be an epoxide containing compound. Alternatively, the epoxy-based prepolymer can be a reaction product between an epoxy and a polypeptide, a polyol, an amine based polyol, an amine containing compound, a hydroxy containing compound, or a combination thereof.

In certain embodiments, the composition is an epoxy resin comprising free epoxy groups. Alternatively, the epoxy resin composition is prepared by combining a precursor epoxy resin composition with the isolated and fractionated polypeptide compositions described herein. The epoxy resin composition can comprise derivatives of digested proteins as described herein.

Epoxy resins refer to molecular species comprising two or more epoxide (oxirane) groups per molecule. Epoxy resins can contain mono-epoxides as reactive diluents, but the main constituents by weight of such resins are still di- and/or higher functionality species (containing two or more epoxide groups per molecule).

Epoxy resins useful as precursor epoxy resins can include those which comprise difunctional epoxide and/or higher functionality polyepoxide species. Precursor epoxy resins include but are not limited to diglycidyl ether of bisphenol-A, diglycidyl ethers of bisphenol-A alkoxylates, epoxy novolac resins, expoxidized soy oil, epoxidized linseed oil, epichlorohydrin, a glycidyl ether type epoxy resin derived from a polyphenol by reaction with epichlorohydrin, and combinations thereof. In another embodiment, precursor epoxy resins are modified by combining them with the polypeptide compositions described herein, either in bulk or in aqueous suspension.

The modified epoxy resins can be used in multi-part mixing-activated adhesive formulations. Alternatively, multi-part formulations can comprise polyisocyanates and/or known amine based epoxy curatives as additional components. Alternatively, modified epoxy resins can be used with any cure catalysts or other additives known in the epoxy resin art. The polypeptide compositions described herein contain functional groups which react with epoxide groups in the epoxy resin. The extent of this reaction depends upon the preparative conditions, use or non-use of catalysts, the specific resins and protein component described herein selected, etc.

An important subset of epoxy resins can be made by reacting a precursor polyol with an epihalohydrin, such as epichlorohydrin. The products of the reaction are called glycidyl ethers (or sometimes as polyglycidyl ethers or diglycidyl ethers). In certain embodiments, all the hydroxyl groups in the precursor polyols are converted to the corresponding glycidyl ethers.

An important class of glycidyl ether type epoxy resins are derived from polyphenols, by reaction with epichlorohydrin. The starting polyphenols are di- or higher functionality phenols. Industrially important examples of this type of epoxy resin comprise, for example, diglycidyl ether of bisphenol-A (also known as DGEB-A); diglycidyl ether of 2,6,2',6'-tetrachloro bisphenol A; diglycidyl ether of bisphenol-F (DGEB-F); epoxidized novolac resins; mixtures of these, and the like.

Partially or fully saturated (hydrogenated) analogs of these epoxy resins may also be used. A non limiting example of a known saturated epoxy resin of this type is DGEB-H, which is the fully hydrogenated (ring saturated) aliphatic analog of DGEB-A.

Amines, which contain active hydrogen atoms may also be reacted with epichlorohydrin to form epoxy resins. Examples of these types of resins include, for example, N,N,N',N'-tetraglycidyl diphenylmethane diamine (such as the 4,4' isomer); p-glycidyloxy-N,N-diglycidylaniline; N,N-diglycidylaniline; mixtures of these; and the like.

Heterocyclic nitrogen compounds that contain active hydrogen atoms may likewise be converted into the corresponding epoxy resins by reaction with epichlorohydrin. Non limiting examples of such resins include, for example, N,N',N''-triglycidyl isocyanurate; N,N'-diglycidyl-5,5-dimethylhydantoin; mixtures of these; and the like.

Many other kinds of epoxy resins are known which are not made by reaction of an active hydrogen precursor with an epihalohydrin. Non-limiting examples of these types of epoxy resins, known in the art, include, for example, dicyclopentadiene diepoxide (also known as DCPD dioxide), vinycyclohexene diepoxide (dioxide), epoxidized polyunsaturated vegetable oils (such as epoxidized linseed oil, epoxidized soy oil, etc.), epoxidized polydiene resins (such as epoxidized polybutadienes), 3,4-epoxy-6-methyl cyclohexylmethyl-3,4-epoxy-6-methyl cyclohexane carboxylate, mixtures of these, and the like. In principle, any precursor molecule which contains two or more units of reactive aliphatic "C=C" unsaturation per molecule might be converted into an epoxy resin.

It should be understood that any of the base epoxy resins known in the art, such as those listed above, are frequently modified with diluents, flexibilizers, and/or other additives. The optional possibility of using one or more known art modifiers or additives, in addition to the required protein derivatives, is within the level of skill in the art. Those skilled in the art of formulating adhesive systems using epoxy resins will appreciate how and when to use known optional additives and modifiers.

In addition, the prepolymers can include one, two or more polyol compounds. Exemplary polyol compounds include an amine alkoxylate, polyoxypropylene glycol, propylene glycol, polyoxyethylene glycol, polytetramethylene glycol, polyethylene glycol, propane diol, glycerin, or a mixture thereof.

Polyols useful in preparing the adhesives described herein include all known polyols, for example, polyols used in the polyurethanes art. In certain embodiments, the polyol comprises primary and/or secondary hydroxyl (i.e., —OH) groups. In certain other embodiments, the polyol comprises at least two primary and/or secondary hydroxyl (i.e., —OH) groups per molecule. Mono functional alcohols (such as aliphatic alcohols, aromatic alcohols, or hydroxyl functional monomers such as hydroxyl functional acrylates (to yield UV or thermally curable materials) can be used to cap an isocyanate group. In certain other embodiments, the polyol comprises a hydroxyl (i.e., —OH) group functionality between 1.6 and 10, between 1.7 to 6, between 2 to 4, or between 2 to 3. In certain other embodiments, the weight average molecular weight range for the optional polyols is from 100 to 10,000 g/mol, from 400 to 6,000 g/mol, or from 800 to 6,000 g/mol.

In certain other embodiments, useful polyols are polyester polyols or polyether polyols, such as an aliphatic polyether polyol. One exemplary aliphatic polyether polyol is polyoxypropylene glycol, with a number average molecular weight in the range of from 1,500 to 2,500 g/mol.

In certain embodiments, the total amount of all polyol, or polyols, in the isocyanate reactive component is from 1% to 80%, or from 3% to 70%, or from 5% to 60% by weight of the total.

In certain other embodiments, alkanolamines comprising primary, secondary, and/or tertiary amine groups can be used.

In certain embodiments, useful water-dispersible polymer latexes can include latexes of polymethylmethacrylate and its copolymers, latexes of polymethacrylate and its copolymers, latexes of polyvinylchloride and its copolymers, latexes of polyvinylacetate and its copolymers, polyvinyl alcohol and its copolymers, etc.

Further, as discussed above, the prepolymer species can comprise a terminated isocyanate. Here, for example, a polyol is reacted with the base polyisocyanate composition prior to or during mixing with the polypeptide fractions herein. Those skilled in the art will recognize many variations on the use of optional prepolymers in preparing wood adhesive compositions.

The amount of reactive prepolymer used in the adhesive compositions can be selected based on the desired properties of the adhesive composition. For example, when optimizing the viscosity of a one-part adhesive, the ratio of prepolymer (e.g., PMDI, Epoxy and the like) to protein component (i.e., ground plant meal or isolated polypeptide composition) can be from about 10:1 and 4:1 in order to form an adhesive composition that is relatively less viscous.

VIII. Additives

One or more additives can be included in the adhesive composition in order to achieve particular performance properties. Exemplary additives include an intercalated clay, partially exfoliated clay, exfoliated clay, cellulose nanoparticles, tacking agents, extenders, fillers, viscosifying agents, surfactants, adhesion promoters, antioxidants, antifoaming agents, antimicrobial agents, antibacterial agents, fungicides, pigments, inorganic particulates, gelling agents, cross-linking agents, pH modulators, composite-release promoters, fire retardants, and wood preservatives. In certain embodiments, the additive is a surfactant, an antioxidant, a fungicide, or a tackifier.

The additive may be characterized according to whether it is a water-dispersible additive or a water-soluble additive. Water-soluble additives include hydroxyl-functional or amine-functional compounds (such as glycerin, propylene glycol, polypropylene glycol, polyethylene glycol, trimethylol propane and its adducts, phenols, polyphenols, etc.). One benefit of using glycerin and various low-viscosity polyols is that they allow less water to be used in the adhesive composition.

In certain embodiments, the additive is a non-volatile (e.g., having a boiling point of greater than about 180° C. at 760 mmHg), inert viscosity-reducing diluent. In yet other embodiments, the additive is an antioxidant, antifoaming agent, anti-bacterial agent, fungicide, pigment, viscosifying agent, gelling agent, aereosolozing agent, inorganic particulate (e.g., titanium dioxide, yellow iron oxide, red iron oxide, black iron oxide, zinc oxide, aluminum oxide, aluminum trihydrate, calcium carbonate), clay such as montmorillonite, a wetting agent, and the like.

In certain embodiments, the additive is a composite-release promoter (such as a composite-release promoter selected from the group consisting of a $C_{10\text{-}25}$ alkanoic acid, a salt of a $C_{10\text{-}25}$ alkanoic acid, a $C_{10\text{-}25}$ alkenoic acid, a salt of an $C_{10\text{-}25}$ alkenoic acid, and a silicone).

In certain other embodiments, the additive is a pH modulator. In certain other embodiments, the additive is a fire retardant or wood preservative. In certain other embodiments, the additive is a fire retardant, wood preservative, antimicrobial agent, antibacterial agent, or fungicide, any of which may be in the form of nanoparticles.

Exemplary classes of additives are described in more detail in the sections below.

Intercalated Clay

Intercalated clays can be obtained from commercial sources or prepared by exposing a clay to an intercalating agent. Exemplary types of clay that may be converted to intercalated form include, for example, smectite clays, illite clays, chlorite clays, layered polysilicates, synthetic clays, and phyllosilicates. Exemplary specific clays that may be converted to intercalated form include, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the clay converted to intercalated form is montmorillonite.

Exemplary intercalating agents include, for example, quaternary amine compounds (such as a tetra-alkylammoniun salt), polymers (e.g., a polycaprolactone, maleated polyethylene, or maleated polypropylene) an acrylic monomer, phosphonium compounds, arsonium compounds, stibonium compounds, oxonium compounds, sulfonium compounds, polypropene, fatty acid esters of pentaerythritol, a steroyl citric acid ester, and alcohols (such as aliphatic alcohols, aromatic alcohols (e.g., phenols), aryl substituted aliphatic alcohols, alkyl substituted aromatic alcohols, and polyhydric alcohols).

Intercalated clays can be characterized by, for example, the following physical properties: interlayer spacing, d-spacings, clay particle size, particle size distribution, peak degradation temperature, and thickness of layers. Exemplary physical property features for intercalated clays contemplated to be amenable for use in the present invention include, for example, one or more of the following: (i) an intercalated clay having an interlayer spacing of about 0.5 Å to about 100 Å (or about 1 Å to about 20 Å), (ii) a mean particle size of about 1 µm to about 150 µm (or about 20 µm to about 100 µm), (iii) a particle size distribution where about 90 percent to about 50 percent of the intercalated clay particles have a particle size of from about 20 µm to about 100 µm (or about 85 percent to about 65 percent of the intercalated clay particles have a particle size of about 20 µm to about 100 µm), (iv) a peak degradation temperature of about 200° C. to about 600° C. (or from about 300° C. to about 500° C.), and (v) layers in the intercalated clay have a thickness of about 0.5 Å to about 100 Å (or about 5 Å to about 50 Å).

In certain other embodiments, the intercalated clay is intercalated montmorillonite having a particle size of less than about 500 nm, or less than about 100 nm. In certain other embodiments, the intercalated clay is intercalated montmorillonite having a particle size of about 60 nm to about 400 nm.

The clay (e.g., an intercalated clay) may be surface treated with an organic compound, such as a hydrophobic organic compound or hydrophilic organic compound, in order to promote dispersion of the clay in a formulation, such as an adhesive composition described herein. Surface treatment methods and compositions are described in the literature and are contemplated to be amenable for use in the present invention.

Different intercalated clays may impart different performance properties to the adhesive composition. Accordingly, in certain embodiments, the intercalated clay is an intercalated smectite. In certain other embodiments, intercalated clay is a smectite that has been intercalated with a quaternary ammonium compound. In certain other embodiments, the intercalated clay is an intercalated montmorillonite. In yet other embodiments, the intercalated clay is montmorillonite intercalated with a dimethyl-di($C_{14}$-$C_{18}$)alkyl ammonium salt.

Exfoliated Clay & Partially Exfoliated Clay

Exfoliated clay or a partially exfoliated clay can be prepared by exposing an intercalated clay to exfoliation conditions using procedures described in the literature. One procedure for preparing a partially exfoliated clay is to subject an intercalated clay to high shear mixing and/or sonication (e.g., using ultrasound) until the intercalated clay has partially exfoliated. The procedure may be performed by placing the intercalated clay (e.g., quaternary amine intercalated montmorillonite) in a hydrophobic liquid medium (such as mineral oil, soy oil, castor oil, silicone oil, a terpene (e.g., limonene), plant oil alkyl esters (e.g., soy methyl ester and canola methyl ester), mixtures thereof (e.g., a mixture of a silicone oil and limonene), etc.) to form a mixture, and then subjecting the mixture to high shear mixing and/or ultrasound until the intercalated clay has partially exfoliated. Partial exfoliation occurs when clay platelets separate from the intercalated clay particles. Partial exfoliation can be observed macroscopically in many instances because it can cause a low viscosity mixture of intercalated clay and hydrophobic liquid medium to form a gel. This gel can be added to protein adhesives or components used to form a protein adhesive described herein. Alternatively, the intercalated clay may be added to a protein adhesive composition, and the protein adhesive composition is subjected to exfoliation conditions to generate the partially exfoliated clay in situ.

An exfoliated clay can be prepared by exposing an intercalated clay to high shear mixing and/or sonication (e.g., using ultrasound) until substantially all (e.g., greater than 90% w/w, 95% w/w, or 98% w/w) the intercalated clay has exfoliated. The exfoliation procedure can be performed by placing the intercalated clay (e.g., quaternary amine intercalated montmorillonite) in a hydrophobic liquid medium (such as mineral oil, soy oil, castor oil, silicone oil, a terpene (e.g., limonene), plant oil alkyl esters (e.g., soy methyl ester and canola methyl ester), mixtures thereof (e.g., a mixture of a silicone oil and limonene), etc.) to form a mixture, and then subjecting the mixture to high shear mixing and/or sonication (e.g., using ultrasound) until substantially all the intercalated clay has exfoliated. Alternatively, the intercalated clay may be added to a protein adhesive composition, and the protein adhesive composition is subjected to exfoliation conditions to generate the exfoliated clay in situ. Alternatively, a clay (such as sodium montmorrilonite) may be added to an adhesive composition, together with a quaternary ammonium compound, and optionally together with a satisfactory oil carrier (e.g., one that has the ability to solvate the quaternary compound), and the resulting adhesive composition is subjected to conditions to intercalate the clay and to generate the exfoliated clay or partially exfoliated clay in situ. In addition, if so desired, the quaternary ammonium compound can be pre-dissolved in the oil carrier before it is added to the adhesive composition together with a clay.

Exemplary partially exfoliated clays contemplated to be amenable for use in present invention include partially exfoliated forms of smectite clay, illite clay, chlorite clay, layered polysilicates, synthetic clay, and phyllosilicates. Exemplary specific partially exfoliated clays contemplated to be amenable for use in present invention include partially exfoliated forms of, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the partially exfoliated clay is partially exfoliated clay montmorillonite.

A partially exfoliated clay can be characterized by, for example, the amount of clay particles that are in the form of platelets. In certain embodiments, about 0.1% w/w to about 40% w/w, about 0.1% w/w to about 20% w/w, about 0.1% w/w to about 10% w/w, about 0.1% w/w to about 5% w/w, or about 5% w/w to about 20% w/w of the clay particles are in the form of platelets. In certain embodiments, about 0.1% w/w to about 40% w/w of the clay particles are in the form of platelets having a size of about 1 Å to about 50 Å, about 30 Å to about 50 Å, or about 5 Å to about 20 Å.

Exemplary exfoliated clays contemplated to be amenable for use in present invention include exfoliated forms of smectite clay, illite clay, chlorite clay, layered polysilicates, synthetic clay, and phyllosilicates. Exemplary specific exfoliated clays contemplated to be amenable for use in present invention include exfoliated forms of, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the exfoliated clay is an exfoliated smectite. In certain embodiments, the exfoliated clay is exfoliated montmorillonite.

An exfoliated clay can be characterized by, for example, the size of platelets and the aspect ratio of platelets. In certain embodiments, the size of the platelets is about 1 Å to about 50 Å, about 30 Å to about 50 Å, or about 5 Å to about 20 Å. In certain embodiments, aspect ratio of the platelets is about 100 to about 10,000, about 100 to about 5,000, or about 200 to about 2,000. In certain other embodiments, the exfoliated clay has a mean particle size of less than about 500 nm, less than 100 nm, or less than 25 nm. In certain other embodiments, the exfoliated clay has a mean particle size of from about 60 nm to about 400 nm, about 50 nm to about 300 nm, about 40 nm to about 200 nm, or about 20 nm to about 150 nm.

In certain other embodiments, a partially exfoliated clay is formed by exposing a clay to an effective amount of plant protein composition (e.g., an isolated water-soluble protein fraction or ground plant meal) to form a mixture and subjecting the mixture to exfoliation conditions, such as high shear mixing and/or sonication. In certain other embodiments, an exfoliated clay is formed by exposing a clay to an effective amount of plant protein composition (e.g., an isolated water-soluble protein fraction or ground plant meal) to form a mixture and subjecting the mixture to exfoliation conditions, such as high shear mixing and/or sonication.

Cellulose Nanoparticles

Cellulose nanoparticles can be added to the adhesive composition to achieve certain performance properties, such as to provide an adhesive with increased toughness and/or bond strength. Cellulose nanoparticles can be obtained from commercial sources or isolated from plant-based fibers by acid-hydrolysis. Cellulose nanoparticles can be characterized by, for example, the size of the nanoparticle, the cross-sectional shape of the nanoparticle, and/or the cross-sectional length and aspect ratio of the nanoparticle. Accordingly, in certain embodiments, the cellulose nanoparticle has a size of from about 1 nm to about 2000 nm, about 10 nm to about 1000 nm, about 10 nm to about 500 nm, or about 10 nm to about 200 nm. In certain embodiments, the cross-sectional shape of the nanoparticle may be triangular, square, pentagonal, hexagonal, octagonal, circular, or oval. In certain other embodiments, the average cross-sectional length of the cellulose nanoparticle is about 0.1 nm to about 100 nm, or about 1 nm to about 10 nm.

Tacking Agent

Exemplary tacking agents include, for example, glycerin, a terpene resin, a rosin ester (e.g., pentaerythritol rosin ester, or a glycerol rosin ester), corn syrup, soy oil, a poly($C_2$-$C_6$) alkylene, mineral oil, an ethylene/propylene/styrene copolymer, a butylene/ethylene/styrene copolymer, or a mixture of one or more of the foregoing. In certain embodiments, the additive is polybutene. In certain embodiments, the polybutene has a weight average molecular weight of from about 200 g/mol to about 20,000 g/mol, from about 200 g/mol to about 10,000 g/mol, from about 200 g/mol to about 5,000 g/mol, from about 200 g/mol to about 2,000 g/mol, from about 200 g/mol to about 1,000 g/mol, from about 500 g/mol to about 2,000 g/mol, or from about 500 g/mol to about 1,000 g/mol. Other tacking agents include a solid selected from the group consisting of, a rosin ester derivative, and a hydrocarbon-based derivative. When the tacking agent is a solid, the tacking agent may optionally be pre-dissolved in an oil-phase (if present) of the adhesive composition (e.g., in PMDI if present). Alternatively, the solid tacking agent can be pre-melted and dispersed in water by means of the protein component, or the solid tacking agent can be ground and dispersed as fine particulates directly into the adhesive composition.

In certain embodiments, the tacking agent is provided as an emulsion, such as an emulsion of terpene resin or a rosin ester.

Extender

Exemplary extenders include, for example, inert extenders or active extenders. In certain embodiments, the inert extender is vegetable particulate matter, limonene, vegetable oil, mineral oil, dibasic esters, propylene carbonate, non-reactive modified aromatic petroleum hydrocarbons, soy oil, castor oil, and in general any non-active hydrogen containing liquid that can be incorporated into an isocyanate based adhesive. Another inert extender is any non-active hydrogen containing solid that is soluble, e.g., soluble in oil or soluble in water. The active extender can be a pyrrolidone monomer or polymers, an oxizolidone monomer or polymers, an epoxidized oil, or an unsaturated oil, such as linseed oil. Another active extender is a vinyl monomer or mixture of vinyl monomers.

Surfactants & Adhesion Promoters

Exemplary surfactants include, for example, monomeric types, polymeric types, or mixtures thereof. Exemplary adhesion promoters include, for example, organosilanes and titanates.

Antimicrobial Agent

Antimicrobial agents known in the art that do not substantially react with PMDI are contemplated for use in the adhesive compositions and composites described herein. One exemplary antimicrobial agent is polyalkylene glycol polymers, such as polypropylene glycol.

Crosslinking Agent

In other embodiments, the additive can be a crosslinking agent, for example, a crosslinking agent that can be used to bond lignocellulosic material to glass. Exemplary crosslinking agents include an organosilane, such as dimethyldichlorosilane (DMDCS), alkyltrichlorosilane, methyltrichlorosilane (MTCS), N-(2-aminoethyl)-3-aminopropyl trimethoxysilane (AAPS), or a combination thereof. In other embodiments the protein fractions are combined with an organosilane to form an adhesive for bonding one or more substrates together in any combination, said substrates including glass, paper, wood, ceramic, steel, aluminum, copper, brass, etc. The term "organosilane" refers to any group of molecules including monomers, hydrolyzed monomers, hydrolyzed dimers, oligomers, and condensation products of a trialkoxysilane having a general formula:

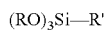

(RO)$_3$Si—R' where R is preferably a propyl, ethyl, methyl, isopropyl, butyl, isobutyl, sec-butyl, t-butyl, or acetyl group, and R' is an organofunctional group where the functionality may include an aminopropyl group, an aminoethylaminopropyl group, an alkyl group, a vinyl group, a phenyl group, a mercapto group, a styrylamino group, a methacryloxypropyl group, a glycidoxy group, an isocyante group, or others.

Similarly, a bis-trialkoxysilane having the general formula (RO)$_3$Si—R'—Si(OR)$_3$ can also be employed as an "organosilane" either alone or in combination with a trialkoxysilane, where R is preferably a propyl, ethyl, methyl, isopropyl, butyl, isobutyl, sec-butyl, t-butyl, or acetyl group, and R' is a bridging organofunctional residue which may contain functionality selected from the group consisting of amino groups, alky groups, vinyl groups, phenyl groups, mercapto groups, and others. Similarly, a tetraalkoxysilane having the general formula $(RO)_4Si$ can also be employed as an "organosilane" either alone or in combination with a trialkoxysilane, or a bis-trialkoxysilane, where R is preferably a propyl, ethyl, methyl, isopropyl, butyl, isobutyl, sec-butyl, t-butyl, or acetyl group.

pH Modulator

The pH modulator can be an acid or base. In certain embodiments, the pH modulator is an alkali metal hydroxide (e.g., sodium hydroxide) or an alkali metal salt of a carboxylate organic compound (e.g., an alkali metal salt of citrate, such as di-sodium citrate).

Composite-Release Promoter

The composite-release promoter acts to facilitate release of the wood composite from the press apparatus used to make the composite. In the absence of a composite-release promoter, certain composites may stick to the press apparatus, making it difficult to separate the composite from the press apparatus. The composite-release promoter solves this problem by facilitating release of the wood composite. Exemplary composite-release promoters include silicones (e.g., silicones described above), fatty acids, a salt of a fatty acid, waxes, and amide compounds. Exemplary fatty acids or salts thereof include a $C_{10\text{-}25}$ alkanoic acid, a salt of a $C_{10\text{-}25}$ alkanoic acid, a $C_{10\text{-}25}$ alkenoic acid, a salt of an $C_{10\text{-}25}$ alkenoic acid; e.g., stearic acid, zinc stearate, lauric acid, oleic acid or a salt thereof (such as an alkali metal salt of oleic acid, such as potassium oleate). It is understood that a mixture of two or more of the aforementioned exemplary composite-release promoters can also be used in the adhesive compositions herein. An exemplary amide compound is N,N'-ethylenebisstearamide. Exemplary waxes include those described above for the agent that improves moisture resistance, and in particular, Hexion EW-58H; E Square 165 Amber Petroleum Microcrystalline Wax commercially available from Baker Hughes, Inc.; and Masurf FS 115 Emulsion (28% Solids) commercially available from Mason Chemical Company. One additional advantage of the protein component in the adhesive composition is that it can facilitate dispersion of the composite-release promoter—this feature allows less composite-release promoter to be used in the adhesive composition and final composite product. Reducing the amount of composite-release promoter is advantageous for agents that are relatively more expensive, such as certain silicone composite-release promoters.

In certain embodiments, the composite-release promoter is a silicone.

Further, in certain embodiments, a composite-release promoter is present in the final composite at a weight percent in the range of about 0.01% (w/w) to about 5% (w/w), about 0.01% (w/w) to about 2% (w/w), or about 0.01% (w/w) to about 1% (w/w).

Additional Polymer Additives

In certain embodiments, the adhesive composition further comprises either an ethylene copolymer resin, a hydroxyl functionalized polymer, or mixtures thereof. Non limiting examples of suitable ethylene copolymer resins include ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, and ethylene vinyl alcohol (EVOH) resins. Non-limiting examples of hydroxyl functionalized polymers include water soluble or partially water soluble polymers such as polyvinylalcohol, polyvinylbutyral-co-vinylalcohol, polyvinylacetate-co-vinylalcohol and the like; and carbohydrates such as carboxymethylcellulose, ethylmethylcellulose, etc.

The ethylene copolymer can be used as a water dispersion agent (i.e., an EVA latex). The dispersion agent can be a polymer latex containing a carboxylated vinyl acetate-ethylene terpolymer stabilized with poly-(vinyl alcohol), commercially known as AIRFLEX 426® from Air Products, Inc. (63% solids by weight). In certain other embodiments, the dispersion agent is Wacker VINNAPAS® 426, which is a carboxylated, high solids vinyl acetate-ethylene (VAE) copolymer dispersion with a glass transition temperature (Tg) of 0° C., sold by Wacker Chemie, AG. The ethylene copolymer can be used at a level of from 5% to 50% by weight, from 10% to 40% by weight, or from 15% or 30% by weight of the total isocyanate reactive component (the level of ethylene copolymer is expressed on a solids basis, and does not include the level of water in the latex).

The identity and quantity of ethylene copolymer in the adhesive composition may be selected in order to achieve particular performance properties for the adhesive composition. For example, the glass transition temperature (Tg) of a pressure-sensitive adhesive may be modulated by identity and quantity of ethylene copolymer in the adhesive composition.

In certain embodiments, the adhesive composition further comprises a latex polymer. In certain embodiments, the latex polymer is an acrylic acid polymer emulsion, styrene polymer emulsion, vinyl acetate polymer emulsion, ethylene vinyl acetate polymer emulsion, ethyl methacrylate polymer emulsion, or a carboxylated vinyl acetate-ethylene terpolymer emulsion, such as AIRFLEX 426® or VINNAPAS® 426, as described above).

In certain embodiments, the total amount of latex polymer(s) in the adhesive composition is in the range of from about from 5% to 50% by weight of the adhesive composition, from 10% to 40% by weight of the adhesive composition, or from 15% or 30% by weight of the adhesive composition (where the amount of latex polymer is expressed on a solids basis, and does not include any water in the latex).

Fire Retardants

Exemplary fire retardants include, for example, (i) phosphoric acid or a salt thereof, such as a mono-ammonium phosphate, di-ammonium phosphate, ammonium poly-phosphate, melamine phosphate, guanidine phosphate, urea phosphate, alkali metal phosphate, and alkaline earth metal phosphate, (ii) a halogenated phosphate compound, (iii) a phosphate ester, such as tri-o-cresyl phosphate and tris(2,3-dibromopropyl) phosphate, (iv) a chlorinated organic compound, such as a chlorinated hydrocarbon or chlorinated paraffin, (iv) a brominated organic compound, such as a brominated hydrocarbon, bromo-bisphenol A, tetrabromo-bisphenol A (TBBPA), decabromobiphenyl ether, octabromobiphenyl ether, tetrabromobiphenyl ether, hexabromocyclododecane, bis(tetrabromophthalimido) ethane, tribromophenol, and bis(tribromophenoxy) ethane, (v) a brominated oligomer or brominated polymer, such as TBBPA polycarbonate oligomer, brominated polystyrene, and TBBPA epoxy oligomer, (vi) a borate compound, such as an alkali metal borate, ammonium borate, or mixture comprising one or more of borax, boric acid, boric oxide, and disodium octoborate, (vii) aluminium materials, such as aluminium trihydrate and aluminium hydroxide, (viii) an alkaline earth metal hydroxide, such as magnesium hydroxide, (ix) an alkali metal bicarbonate, such as sodium bicarbonate, (x) an alkaline earth metal carbonate, such as calcium carbonate, (xi) antimony trioxide, (xii) hydrated silica, (xiii) hydrated alumina, (xiv) dicyandiamide, (xv) ammonium sulfate, and (xvi) a mixture of guanylurea phosphate and boric acid, such as those described in International Patent Application Publication No. WO 02/070215, which is hereby incorporated by reference, (xvii) graphite, (xviii) melamine, and (xix) a phosphonate compound, such as diethyl-N,N-bis(2-hydroxyethyl) aminoethyl phosphonate; dimethyl-N,N-bis(2-hydroxyethyl) aminomethyl phosphonate; dipropyl-N,N-bis(3-hydroxypropyl) aminoethyl phosphonate; and dimethyl-N,N-bis(4-hydroxybutyl) aminomethyl phosphonate, such as described in U.S. Pat. No. 6,713,168, which is hereby incorporated by reference.

In certain embodiments, the fire retardant is (i) phosphoric acid or a salt thereof, such as a mono-ammonium phosphate, di-ammonium phosphate, ammonium poly-phosphate, melamine phosphate, guanidine phosphate, urea phosphate, alkali metal phosphate, and alkaline earth metal phosphate, (ii) a phosphate ester, such as tri-o-cresyl phosphate and tris(2,3-dibromopropyl) phosphate, aluminium trihydrate and aluminium hydroxide, (iii) an alkaline earth metal hydroxide, such as magnesium hydroxide, (iv) an alkali metal bicarbonate, such as sodium bicarbonate, (v) antimony trioxide, or (vi) hydrated alumina.

Wood Preservatives

Exemplary wood preservatives include, for example, (i) chromated copper arsenate (CCA), (ii) alkaline copper quaternary, (iii) copper azole, (iv) a borate preservative compound, (v) a sodium silicate-based preservative compound, (vi) a potassium silicate-based preservative compound, (vii) a bifenthrin preservative compound, (viii) a coal-tar creosote, (ix) linseed oil, (x) tung oil, and (xi) an insecticide, such as an organochloride compound, organophosphate compound, carbamate compound, pyrethroid, neonicotinoid, and ryanoid.

IX. General Considerations for Adhesive Compositions

The adhesive composition may be in the form of a liquid or powder. Liquid form adhesives may provide advantages for certain applications, such as where it is desirable to distribute a thin film of adhesive over a large surface area. In certain embodiments, the adhesive composition is in the form of an aqueous dispersion. Dry blend adhesives may provide advantages for certain applications, such as those where it is desirable to minimize the amount of volatile compounds (e.g., water) in the adhesive composition. Factors that can affect the viscosity, moisture resistance, bond strength, and other properties of the adhesive composition are described below.

Dry Blend Adhesive Compositions

The adhesive composition may be in the form of a dry blend. A first type of dry blend adhesive composition may be formed by mixing ground plant meal with one or more liquid or solid additives. The liquid or solid additives are typically added in an amount less than about 10% w/w of the plant meal. Alternatively, the liquid or solid additives are may be blended with the plant meal during grinding to form the ground plant meal. The ground plant meal containing one or more additives is desirably a dry and flowable material. Exemplary additives are described above in Section VIII, and include intercalated clays, partially exfoliated clays, exfoliated clays, mixture of a silicone and a terpene compound (e.g., limonene), mineral oil, soy oil, castor oil, soy methyl ester, canola methyl ester urea, glycerin, propylene glycol, propylene carbonate, polyols, crosslinkers like PMDI, epoxies such as glycidyl end-capped poly(bisphenol-A-co-epichlorohydrin) (BPA) and trimethylolpropane triglycidyl ether, polymer latexes, and catalysts.

A second type of dry blend adhesive composition may be formed by mixing ground plant meal with a dry powder ingredient, such as an additive that is not a liquid (e.g., a clay (such as an intercalated clay, a partially exfoliated clay, or an exfoliated clay), or a silicone.

A third type of dry blend adhesive may be formed by mixing the first type of adhesive (as described above) with any other dry or liquid ingredient that may impart beneficial properties to the adhesive composition.

The dry adhesives described above may be used as binders in the manufacture of wood composites. Such wood composites may be prepared by first mixing wood particulates with the dry blend adhesive composition to form a mixture, and then subjecting the mixture to elevated temperature and pressure to facilitate densification and curing of the adhesive. The amount of cured adhesive in the wood composite may be, for example, from about 0.2% and 20% w/w of the cured wood composite.

Amount of Plant Protein Composition

The amount of plant protein composition in the adhesive composition can be adjusted to achieve particular performance properties. For example, in certain embodiments, the adhesive composition comprises no less than about 2%, 5%, 10%, 15%, 20%, 25%, or 30% by weight of the plant protein composition (i.e., water-soluble peptide fraction or ground plant meal) described herein (based on the dry weight of the protein component). The maximum loading of the protein component can be based on, for example, optimizing stability and viscosity. In certain embodiments, the total concentration of plant protein composition may be of up to 35% (w/w). Higher viscosity compositions formed from higher weight percentages of the plant protein composition described herein can be beneficial in applications where it is desirable for the uncured adhesive to exhibit cold-tack, flow resistance, sag resistance, and gap-filling characteristics. In certain embodiments, the adhesive composition comprises from about 1% to about 5%, about 5% to about 10%, about 10% to about 20%, about 15% to about 30%, or about 1% to about 10% by weight plant protein composition.

Amount of Non-volatile Solid Materials

The overall amount of non-volatile solid materials in the adhesive composition can be adjusted to achieve particular performance properties. For example, in certain embodiments, the adhesive composition comprises at least 10% (w/w) non-volatile solid material. In certain other embodiments, the adhesive composition comprises at least 20% (w/w) non-volatile solid material. In certain other embodiments, the adhesive composition comprises at least 50% (w/w) non-volatile solid material.

Viscosity Considerations

In certain embodiments, the viscosity of the adhesive composition is no more than (NMT) 500,000 cps, NMT 300,000 cps, NMT 200,000 cps, or NMT 100,000 cps, NMR 50,000 cps, NMT 25,000 cps, NMT 10,000 cps, or NMT 5,000 cps as measured at 25° C. until the adhesive composition is cured.

In order to optimize the viscosity of the adhesive composition, the adhesive composition may contain plant protein composition in an amount such that the viscosity of the adhesive formulation increases by no more than about 25% within about 20 minutes, or no more than about 50% within about 20 minutes, after mixing the anhydride and plant protein composition. In certain other embodiments, the plant protein composition is present in an amount such that the viscosity of the adhesive formulation increases by no more than about 40% within about 30 minutes (or no more than about 40% with about 100 minutes) after mixing the anhydride and plant protein composition. In certain other embodiments, the plant protein composition is present in an amount such that the viscosity of the adhesive formulation remains less than about 1100 cps within about 150 minutes after mixing, less than about 1100 cps within about 200 minutes after mixing, less than about 1500 cps within about 150 minutes after mixing, less than about 1500 cps within about 225 minutes after mixing, less than about 50,000 cps within about 150 minutes after mixing, less than about 50,000 cps within about 20 minutes after mixing, less than about 30,000 cps within about 20 minutes after mixing, less than about 300,000 cps within about 60 minutes after mixing, or less than about 100,000 cps within about 60 minutes after mixing the anhydride compound and plant protein composition.

Certain of the adhesives described herein are liquids having viscosities low enough to render them pourable, sprayable, or curtain-coatable. For pourable or sprayable adhesive compositions, the viscosity of the adhesive composition is desirably no more than (NMT) 500 cps, NMT 1000 cps, NMT 2000 cps, or NMT 5000 cps, as measured at 25° C. The viscosity of the adhesive composition can be optimized by adjusting the amount of protein component (i.e., ground plant meal or water-soluble peptide fraction) described herein and/or the conditions used for preparing the composition. Alternatively, certain of the adhesives described herein are non-pourable, extrudable, spreadable gels or pastes. Non-pourable, extrudable, spreadable gels, or pastes may become pourable, sprayable, or curtain-coatable liquids at elevated temperature, and may optionally revert to non-pourable, extrudable or spreadable gels or pastes upon cooling.

The adhesive composition can be also characterized according to the weight percent of the plant protein composition (e.g., water-soluble protein or ground plant meal) in the adhesive composition. In certain embodiments, the plant protein composition is present in an amount from about 1% to about 90% (w/w), from about 1% to about 70% (w/w), from about 1% to about 50% (w/w), from about 1% to about 30% (w/w), from about 10% to about 90% (w/w), from about 10% to about 70% (w/w), from about 10% to about 50% (w/w), from about 10% to about 30% (w/w), from about 20% to about 90% (w/w), from about 20% to about 70% (w/w), from about 20% to about 50% (w/w), or from about 20% to about 30% (w/w) of the adhesive composition. In certain other embodiments, the plant protein composition is present in an amount from about 5% to about 35% (w/w), or from about 5% to about 50% (w/w), of the adhesive composition.

In addition, the plant protein composition (e.g., an isolated water-soluble protein fraction or ground plant meal) and the adhesive composition can be designed to have a polydispersity index. The term "polydispersity index" refers to the ratio between the weight average molecular weight and the number average molecular weight (i.e., PDI =Mw/Mn).

The terms "number average molecular weight," denoted by the symbol Mn and "weight average molecular weight," denoted by the symbol Mw, are used in accordance with their conventional definitions as can be found in the open literature. The weight average molecular weight and number average molecular weight can be determined using analytical procedures described in the art, e.g., chromatography techniques, sedimentation techniques, light scattering techniques, solution viscosity techniques, functional group analysis techniques, and mass spectroscopy techniques (e.g., MALDI mass spectroscopy). For instance, as illustrated in Example 2, average molecular weight and number average molecular weight of the polypeptide composition was determined by MALDI mass spectroscopy.

Further, it is contemplated that plant protein compositions (e.g., an isolated water-soluble protein fraction or ground plant meal) having different molecular weights may provide adhesive compositions having different properties. As such, the weight average molecular weight, number average molecular weight, and polydispersity index can be an important indicator when optimizing the features of the adhesive composition. In particular, it is contemplated that the ability to optimize the molecular weight characteristics of the plant protein compositions (e.g., an isolated water-soluble protein fraction or ground plant meal) provides advantages when preparing an adhesive composition for a particular use. Further advantages include obtaining adhesive compositions with similar properties even though the protein composition may be obtained from a different source (e.g., soy vs. castor) or when similar protein sources are harvested during different seasons, over varying periods of time, or from different parts of the world. For example, proteins isolated from soy and castor (each having different molecular weight distributions) can be made to have similar molecular weight distributions through digestion and fractionation processes described herein (see Example 2). Accordingly, the ability to measure and control the consistency of molecular weight distributions is contemplated to be beneficial when optimizing various features of the adhesive composition, e.g., long-term reproducibility of physical properties and process characteristics of formulated adhesives. The molecular weight characteristics of the ground plant meal, water-soluble protein fraction, or water-insoluble/water-dispersible protein fraction can be altered by subjecting the proteins therein to enzymatic digestion or fractionation according to the procedures described herein.

In certain embodiments, the PDI of the adhesives provided herein is from about 1 to about 3, from 1 to 1.5, from 1.5 to 2, from 2 to 2.5, from 2.5 to 3, from 1 to 2, from 1.5 to 2.5, or from 2 to 3.

Tack Strength/Bond Strength

The tack or bond strength of the pressure-sensitive adhesives (PSA) can be controlled through a number of means, such as shifting the glass transition ($T_g$) to higher or lower temperatures (by controlling the levels of monomeric and/or polymeric plasticizers) or incorporating flatting agents such as silicas, glass spheres, clays, and the like; by adjusting the crosslink density to higher or lower levels; by increasing or decreasing the plasticizer concentration; by blending with higher or lower molecular weight polymers; or by employing some combination of these techniques.

It is understood that when evaluating the tack or bond strength of a composite formed using an adhesive, the maximum achievable strength of the composite is dictated by the cohesive strength of the wood itself. To illustrate, if the adhesive is cohesively stronger than the wood, then wood failure will be the outcome. Further, it is contemplated that the adhesive composition may be tailored to provide a bond strength appropriate for particular applications by selecting particular plant protein composition, prepolymers, catalysts, and/or other additives.

Articles fabricated from one or more of the adhesives described herein can contain from about 1% to about 15%, or from about 2% to about 10%, or from about 3% to about 8%, or from about 4% to about 7%, or from about 3% to about 6% (w/w) of binder (adhesive) per cured article. In certain embodiments, the article fabricated from the adhesive may contain greater than 5% (w/w) of binder per cured article. In certain other embodiments, the article comprises from about 1.5% to about 2.5% of binder per cured article.

Composite materials can contain from about 5% to about 85% (w/w), about 15% to about 75% (w/w), about 30% to about 65% (w/w), about 1% to about 10%, about 10% to about 20%, or about 20% to about 70% (w/w) binder. Laminate materials can contain from about 0.1% to about 10% (w/w), about 0.5% to about 5%, about 1% to about 3% (w/w), about 1% to about 10%, about 20% to about 30%, or about 30% to about 70% (w/w) binder.

Adhesive Composition Cure Temperature

Adhesives can be cured by allowing the adhesive to stand under ambient conditions, or the adhesive may be cured by exposing the adhesive to heat, pressure, or both. Furthermore, in certain embodiments, these adhesives are stable but can cure when exposed to moisture in air. In certain other embodiments, the adhesive compositions are cold curable. In certain embodiments, the adhesives are cured in the presence of moisture at a temperature of about 10° C. to about the ambient temperature range (25° C., to as high as 30° C.). In certain other embodiments, the cold cure temperature ranges from 20° C. to 27° C. In other embodiments, the adhesives are hot cured, at temperatures greater than 30° C. Hot curing may occur at temperatures in the range from 50° C. to 150° C., or from 80° C. to 125° C., or from 90° C. to 110° C.

Metals

The adhesive compositions may optionally comprise a metal. In certain embodiments, the composition comprises an alkali metal, an alkaline earth metal, a transition metal, or combination thereof. In certain embodiments, said alkali metal when present is in the form of an alkali metal salt, an alkali metal hydroxide, or an alkali metal alkoxide; said alkaline earth metal when present is in the form of an alkaline earth metal salt, an alkaline earth metal hydroxide, or an alkaline earth metal alkoxide; and said transition metal when present is in the form of a transition metal salt, transition metal hydroxide, or transition metal alkoxide.

In other embodiments, the composition comprises an alkali metal hydroxide or an alkaline earth metal hydroxide. In certain embodiments, the alkali metal is sodium or potassium. In certain embodiments, the alkaline earth metal is calcium or magnesium. In certain embodiments, the transition metal is zinc or iron. In certain embodiments, the adhesive composition comprises a sodium salt (e.g., NaCl), sodium hydroxide, calcium salt (e.g., CaCl$_2$), calcium hydroxide, or a combination thereof.

Relative Amount of Protein Fractions

Adhesive compositions can be further characterized according to the relative amount of (i) water-soluble protein fraction and (ii) water-insoluble/water-dispersible protein fraction. In certain embodiments, the weight percent ratio of (i) water-soluble protein fraction to (ii) water-insoluble/water-dispersible protein fraction is at least 1:1, 2:1, 3:1, 4:1, 5:1, 8:1, 10:1, 15:1, or 20:1. In certain embodiments, the adhesive composition is characterized by having (i) at least 10% (w/w), 15% (w/w), or 20% (w/w) water-soluble protein fraction, and (ii) less than 10% (w/w), 5% (w/w), or 1% (w/w) water-insoluble/water-dispersible protein fraction. In certain embodiments, the adhesive composition is characterized by having (i) at least 10% water-soluble protein fraction, and (ii) less than 1% (w/w) water-insoluble/water-dispersible protein fraction. In certain other embodiments, the adhesive composition is characterized by having (i) from about 10% to about 25% (w/w) water-soluble protein fraction, and (ii) less than 1% (w/w) water-insoluble/water-dispersible protein fraction. In certain other embodiments, the only protein component in the adhesive composition is water-soluble protein fraction (that is, the adhesive composition does not contain water-insoluble/water-dispersible protein fraction).

Combinations

This disclosure describes multiple aspects and embodiments. All combinations of such aspects and embodiments are contemplated. For example, the adhesive composition may comprise: (a) at least 1% (w/w) of an isolated water-soluble protein fraction; (b) at least 1% (w/w) of a protein-bonding agent selected from the group consisting of (i) a metal salt of alginic acid, (ii) poly(methylvinylether-co-maleic anhydride, and (iii) partially hydrolyzed poly(methylvinylether-co-maleic anhydride); (c) water; and (d) a polyol. In certain embodiments, the adhesive composition comprises from about 5% (w/w) to about 30% (w/w) isolated water-soluble protein fraction. In certain embodiments, the adhesive composition comprises from about 10% (w/w) to about 25% (w/w) isolated water-soluble protein fraction.

In certain embodiments, the protein-bonding agent is a metal salt of alginic acid, such as sodium alginate. In certain embodiments, the protein-bonding agent selected is poly (methylvinylether-co-maleic anhydride or partially hydrolyzed poly(methylvinylether-co-maleic anhydride. In certain embodiments, the adhesive composition comprises from about 1% (w/w) to about 6% (w/w), or more preferably from about 2% (w/w) to about 5% (w/w), of protein-bonding agent. In certain embodiments, the adhesive composition comprises from about 30% (w/w) to about 60% (w/w), or more preferably from about 40% (w/w) to about 50% (w/w), water. In certain embodiments, the polyol is glycerin. In certain embodiments, the adhesive composition comprises from about 10% (w/w) to about 40% (w/w), or more preferably from about 10% (w/w) to about 20% (w/w) or from about 25% (w/w) to about 35% (w/w), polyol. In certain embodiments, the adhesive composition comprises sodium or calcium (such as in the form of a sodium cation or calcium cation). In certain embodiments, the adhesive composition is in the form of a liquid.

X. Formation of a Solid Binder Composition From the Adhesive Composition

The adhesive compositions may cured to provide a solid binder composition. In applications where the solid binder composition is used as a pressure-sensitive adhesive, it is desirable for the solid binder composition to possess adhesive tack at least over a temperature range of about 10° C. to about 30° C. The adhesive tack enables the solid binder composition to adhere to other materials, such as lignocellulosic materials.

Accordingly, another aspect of the invention provides a solid binder composition formed by curing an adhesive composition described herein. In certain embodiments, the solid binder composition is tacky at least over a temperature range of about 10° C. to about 30° C. In certain other embodiments, the solid binder composition is tacky at least over a temperature range of about 5° C. to about 30° C., about 15° C. to about 30° C., or about 20° C. to about 25° C. In certain embodiments, the solid binder composition has one or more of the following features: (a) comprises from about 10% to about 40% (w/w) isolated water-soluble protein fraction; (b) comprises from about 10% to about 80% (w/w) plasticizer; (c) comprises from about 2% to about 25% (w/w) protein-bonding agent (e.g., anhydride compound); (d) the ratio of (i) the weight percent of isolated water-soluble protein fraction in the adhesive composition to (ii) the weight percent of protein-bonding agent (e.g., anhydride compound) in the adhesive composition is from about 10:1 to about 1:1; and (e) is tacky at least over a temperature range of about 20° C. to about 30° C.

In certain embodiments, the solid binder composition has one or more of the following features: (a) comprises from about 10% to about 40% (w/w) isolated water-soluble protein fraction; (b) comprises from about 40% to about 80% (w/w) plasticizer; (c) comprises from about 2% to about 15% 25% protein-bonding agent (e.g., anhydride compound); (d) the ratio of (i) the weight percent of isolated water-soluble protein fraction in the adhesive composition to (ii) the weight percent of protein-bonding agent (e.g., anhydride compound) in the adhesive composition is from about 5:1 to about 1:1; and (e) is tacky at least over a temperature range of about 20° C. to about 30° C.

The solid binder composition can also be characterized according to performance in a Bleed Test. In a Bleed Test, the solid binder composition is brought into contact with ink, such as ink on a paper coupon, for a period of time at ambient conditions, and then the ink is visually inspected to determine if the ink bleed to a location different than that at the start of the experiment. Desirably, the binder composition does not induce visible bleeding of ink in a Bleed Test. An exemplary Bleed Test is described in Example 12. Ambient conditions are 25° C. in the presence of air having, for example, a relative humidity of about 50%. The length of the experiment can be adjusted as desired, such as where the solid binder composition is brought into constant contact with the ink for period of at least 7 days, 10 days, 14 days, or 30 days, before the ink is visually inspected to determine the presence of any bleeding.

XI. Applications of Adhesive Compositions

The adhesive compositions described herein can be used in a variety of different applications, which include, for example, bonding together many different types of substrates and/or creating composite materials.

Accordingly, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first article to the second article. The method optionally also comprises the step of, after step (b), permitting the adhesive composition to cure, which can be facilitated by the application of pressure, heat or both pressure and heat.

The adhesive compositions can be applied to the surfaces of substrates in any conventional manner Alternatively, the surfaces can be coated with the composition by spraying, or brushing, doctor blading, wiping, dipping, pouring, ribbon coating, combinations of these different methods, and the like.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adherend" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. In certain other embodiments, the first article and the second article are independently paper or cardboard. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied may be in the range of from about 5 to about 50 grams per square foot, from about 8 to about 60 grams per square foot, from about 10 to about 30 grams per square foot, from about 20 to about 50 grams per square foot, from about 15 to about 40 grams per square foot, of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass. The composite can be a thermosetting composite or a thermoplastic composite. As described above, the amount and identity of the components used to prepare the composite can be selected to optimize the performance properties of the composite. In one embodiment, the amount of protein component is selected in order to optimize the performance properties of the composite.

Viscosity, sprayability, and/or spreadability of the adhesive components can be controlled by adjusting the amount of water added (or other liquid diluents such as glycerin and corn syrup).

Articles of Manufacture

Another aspect of the invention provides an article produced by the methods described above. In certain embodiments, the article comprises (i) a substrate and (ii) a pressure-sensitive adhesive formed by curing an adhesive composition (described herein) on the substrate. In certain embodiments, the substrate is a lignocellulosic substrate, such as paper or cardboard.

Yet other embodiments of the invention provide an article produced using an adhesive composition described herein. In certain embodiments, the article comprises a lignocellulosic component. In certain embodiments, the article comprises paper, wood, glass, fiberglass, wood fiber, ceramic, ceramic powder, or a combination thereof.

Another aspect of the invention provides an article comprising two or more components bonded together using the adhesive composition described herein. In certain embodiments, the bonded components are selected from the group consisting of paper, wood, glass, metal, fiberglass, wood fiber, ceramic, ceramic powder, plastic, and a combination thereof. In certain embodiments, the article is a composite. In certain other embodiments, the composite is a random non-oriented homogeneous composite, an oriented composite, or a laminated composite. In certain other embodiments, the composite is chip board, particle board, fiber board, oriented strand board, plywood, laminated veneer lumber, glulam, laminated whole lumber, laminated composite lumber, composite wooden I-beams, medium density fiberboard, high density fiberboard, extruded wood, or fiberglass. In certain other embodiments, the composite is a thermosetting composite or a thermoplastic composite. In certain other embodiments, the article is a particle board composite.

XII. Definitions

To facilitate an understanding of the present invention, a number of terms and phrases are defined below.

As used throughout, the term "isolated" refers to material that is removed from its original environment (e.g., the natural environment if it is naturally occurring). For example, removal of water-soluble protein from plant material (such as soy plant meal or soy protein isolate, each of which contain a mixture of components) in order to provide the water-soluble protein in substantially pure form results in a water-soluble protein fraction that is "isolated" (i.e., isolated water-soluble protein fraction). "Substantially pure" refers to material having a purity of at least 90% (w/w) (or more preferably at least 95% (w/w) or 98% (w/w)).

The term "Bleed Test" refers to an assay to visually determine if ink migrates from its original location on an article to a new location on said article over a period of time, such as, at least 1 day, 3 days, 7 days, 10 days, 14 days, or 30 days. One example of a Bleed Test involves bringing a solid binder composition into contact with ink, such as ink on a coupon, for a period of time at ambient conditions, and then the ink is visually inspected to determine if the ink migrated to a location different than that at the start of the experiment (i.e., whether the ink "bleed"). The period of time is desirably 7 days or 14 days.

The term "alkyl" as used herein refers to a saturated straight or branched hydrocarbon, such as a straight or branched group of 1-12, 1-10, or 1-6 carbon atoms, referred to herein as $C_1$-$C_{12}$alkyl, $C_1$-$C_{10}$alkyl, and $C_1$-$C_6$alkyl, respectively. Exemplary alkyl groups include, but are not limited to, methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl, octyl, etc.

The term "cycloalkyl" as used herein refers to a monovalent saturated cyclic, bicyclic, or bridged cyclic (e.g., adamantyl) hydrocarbon group of 3-12, 3-8, 4-8, or 4-6 carbons, referred to herein, e.g., as "$C_{4-6}$cycloalkyl," derived from a cycloalkane. Exemplary cycloalkyl groups include, but are not limited to, cyclohexane, cyclopentane, cyclobutane, and cyclopropane.

The term "aryl" as used herein refers to refers to a mono-, bi-, or other multi-carbocyclic, aromatic ring system. Unless specified otherwise, the aromatic ring is optionally substituted at one or more ring positions with substituents selected from alkanoyl, alkoxy, alkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl and thiocarbonyl. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, and/or aryls. Exemplary aryl groups include, but are not limited to, phenyl, tolyl, anthracenyl, fluorenyl, indenyl, azulenyl, and naphthyl, as well as benzo-fused carbocyclic moieties such as 5,6,7,8-tetrahydronaphthyl. In certain embodiments, the aryl group is not substituted, i.e., it is unsubstituted.

The term "aralkyl" as used herein refers to an aryl group having at least one alkyl substituent, e.g. -aryl-alkyl-. Exemplary aralkyl groups include, but are not limited to, arylalkyls having a monocyclic aromatic ring system, wherein the ring comprises 6 carbon atoms. For example, "phenylalkyl" includes phenyl$C_4$alkyl, benzyl, 1-phenylethyl, 2-phenylethyl, etc.

The term "heteroaryl" as used herein refers to aromatic groups that include at least one ring heteroatom. In certain instances, a heteroaryl group contains 1, 2, 3, or 4 ring heteroatoms. Representative examples of heteroaryl groups includes pyrrolyl, furanyl, thiophenyl, imidazolyl, oxazolyl, thiazolyl, triazolyl, pyrazolyl, pyridinyl, pyrazinyl, pyridazinyl and pyrimidinyl, and the like. The heteroaryl ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —CO$_2$alkyl, carbonyl, carboxyl, alkylthio, sulfonyl, sulfonamido, sulfonamide, ketone, aldehyde, ester, heterocyclyl, aryl or heteroaryl moieties, —CF$_3$, —CN, or the like. The term "heteroaryl" also includes polycyclic ring systems having two or more rings in which two or more carbons are common to two adjoining rings (the rings are "fused rings") wherein at least one of the rings is heteroaromatic, e.g., the other cyclic rings may be cycloalkyls, cycloalkenyls, cycloalkynyls, and/or aryls.

The terms "heterocyclyl" or "heterocyclic group" are art-recognized and refer to saturated, partially unsaturated, or aromatic 3- to 10-membered ring structures, alternatively 3- to 7-membered rings, whose ring structures include one to four heteroatoms, such as nitrogen, oxygen, and sulfur. Heterocycles may also be mono-, bi-, or other multi-cyclic ring systems. A heterocycle may be fused to one or more aryl, partially unsaturated, or saturated rings. Heterocyclyl groups include, for example, biotinyl, chromenyl, dihydrofuryl, dihydroindolyl, dihydropyranyl, dihydrothienyl, dithiazolyl, homopiperidinyl, imidazolidinyl, isoquinolyl, isothiazolidinyl, isoxazolidinyl, morpholinyl, oxolanyl, oxazolidinyl, phenoxanthenyl, piperazinyl, piperidinyl, pyranyl, pyrazolidinyl, pyrazolinyl, pyridyl, pyrimidinyl, pyrrolidinyl, pyrrolidin-2-onyl, pyrrolinyl, tetrahydrofuryl, tetrahydroisoquinolyl, tetrahydropyranyl, tetrahydroquinolyl, thiazolidinyl, thiolanyl, thiomorpholinyl, thiopyranyl, xanthenyl, lactones, lactams such as azetidinones and pyrrolidinones, sultams, sultones, and the like. Unless specified otherwise, the heterocyclic ring is optionally substituted at one or more positions with substituents such as alkanoyl, alkoxy, alkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl and thiocarbonyl. In certain embodiments, the heterocylcyl group is not substituted, i.e., it is unsubstituted.

The term "carboxylate" as used herein refers to —C(O)O-M, wherein M is a cation, such as an alkali metal cation (e.g., Na$^+$ or K$^+$) or an ammonium group (e.g., N(R*)$_4^+$ where R* represents independently for each occurrence hydrogen, alkyl, aryl, aralkyl, etc.

In embodiments where it is indicated that a chemical group is substituted with a substituent, exemplary substituents include, for example, alkanoyl, alkoxy, alkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl and thiocarbonyl, unless indicated otherwise.

The terms "amine" and "amino" are art-recognized and refer to both unsubstituted and substituted amines, e.g., a moiety that may be represented by the general formula:

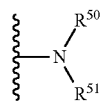

wherein R$^{50}$ and R$^{51}$ each independently represent hydrogen, alkyl, alkenyl, or —(CH$_2$)$_m$—R$^{61}$; or R$^{50}$ and R$^{51}$, taken together with the N atom to which they are attached complete a heterocycle having from 4 to 8 atoms in the ring structure; wherein R$^{61}$ is aryl, cycloalkyl, cycloalkenyl, a heterocycle or a polycycle; and m is zero or an integer in the range of 1 to 8. In certain embodiments, R$^{50}$ and R$^{51}$ each independently represent hydrogen or alkyl.

The terms "alkoxyl" or "alkoxy" are art-recognized and refer to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—(CH$_2$)$_m$—R$^{61}$, where m and R$^{61}$ are described above.

The term "amide" or "amido" as used herein refers to a radical of the form —R$_a$C(O)N(R$_b$)—, —R$_a$C(O)N(R$_b$)R$_c$, —C(O)NR$_b$R$_c$, or —C(O)NH$_2$, wherein R$_a$, R$_b$ and R$_c$ are each independently selected from alkoxy, alkyl, alkenyl, alkynyl, amide, amino, aryl, arylalkyl, carbamate, cycloalkyl, ester, ether, formyl, halogen, haloalkyl, heteroaryl, heterocyclyl, hydrogen, hydroxyl, ketone, and nitro. The amide can be attached to another group through the carbon, the nitrogen, R$_b$, R$_c$, or R$_a$. The amide also may be cyclic, for example R$_b$ and R$_c$, R$_a$ and R$_b$, or R$_a$ and R$_c$ may be joined to form a 3- to 12-membered ring, such as a 3- to 10-membered ring or a 5- to 6-membered ring. The term "carboxamido" refers to the structure —C(O)NR$_b$R$_c$.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

As a general matter, compositions specifying a percentage are by weight unless otherwise specified. Further, if a variable is not accompanied by a definition, then the previous definition of the variable controls.

The description herein describes multiple aspects and embodiments of the invention. The patent application contemplates all combinations of the aspects and embodiments, such as where one or more embodiments are combined, such as where a particular water-soluble protein fraction is combined with a particular protein-bonding agent (e.g., an anhydride compound) to form an adhesive composition.

Additional adhesive compositions, methods of making adhesive compositions, methods of using adhesive compositions, and articles are described in U.S. patent application Ser. Nos. 12/719,521; 13/154,607; and 13/154,607; the contents of which are hereby incorporated by reference.

Practice of the invention will be more fully understood from the foregoing examples, which are presented herein for illustrative purposes only, and should not be construed as limiting the invention in any way.

EXAMPLES

Example 1

Isolation of Polypeptide Compositions

Exemplary procedures for isolating and characterizing the water-insoluble polypeptide composition, water-soluble polypeptide composition, or a mixture thereof are described below.

Procedure A: Preparation of Water-Insoluble Polypeptide Composition and Preparation of Water-Soluble Polypeptide Composition.

Everlase digested protein from castor (experimental sample lot 5-90) was obtained from Prof. S. Braun at the Laboratory of the Department of Applied Biology at the Hebrew University of Jerusalem, Israel. Digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 20 g per kg of castor meal protein, and the mixture is stirred at the same temperature for about 4 hours. Finally, the resulting mixture is brought to a pH 3.5 with citric acid and spray-dried to provide a powder.

The Everlase digested protein from castor (lot 5-90) was fractionated to yield a water-soluble fraction, and a water-insoluble, dispersible fraction. In the first step, 300 g of digested castor was slurried into 1 liter of distilled water. The mixture was shaken by hand, and was then placed into a sonicator bath for a period of 30 minutes. The slurry then was removed and was allowed to set idle for a period of up to two days to allow the insoluble portion to settle (in separate experiments, it was found that centrifuging was equally adequate). At that point, the clear yellow/amber supernatant was pipetted away and was retained for future use. Fresh distilled water was then added to the sediment to bring the total volume back to the 1-Liter mark on the container. The process of shaking, sonicating, settling, supernatant extracting, and replenishing with fresh distilled water (washing) then was repeated (6 times in total). In the final step, the water was pipetted from the top of the grayish-black sediment, and the sediment was then dried in a vacuum oven at 45° C. Based on the sediment's dry weight, the water-insoluble/water-dispersible polypeptide fraction was determined to comprise of approximately 50% by weight of the digested castor. Separately, the $1^{st}$ and $2^{nd}$ supernatants were combined and were then dried to yield a transparent yellow-colored, water-soluble polypeptide fraction.

After drying the fractions, it was verified that the grayish-black sediment (the water-insoluble and dispersible fraction) could not be re-dissolved in water. On the other hand, the dried supernatant fraction (clear/amber, glassy solid) was completely soluble in water.

Figure 2:
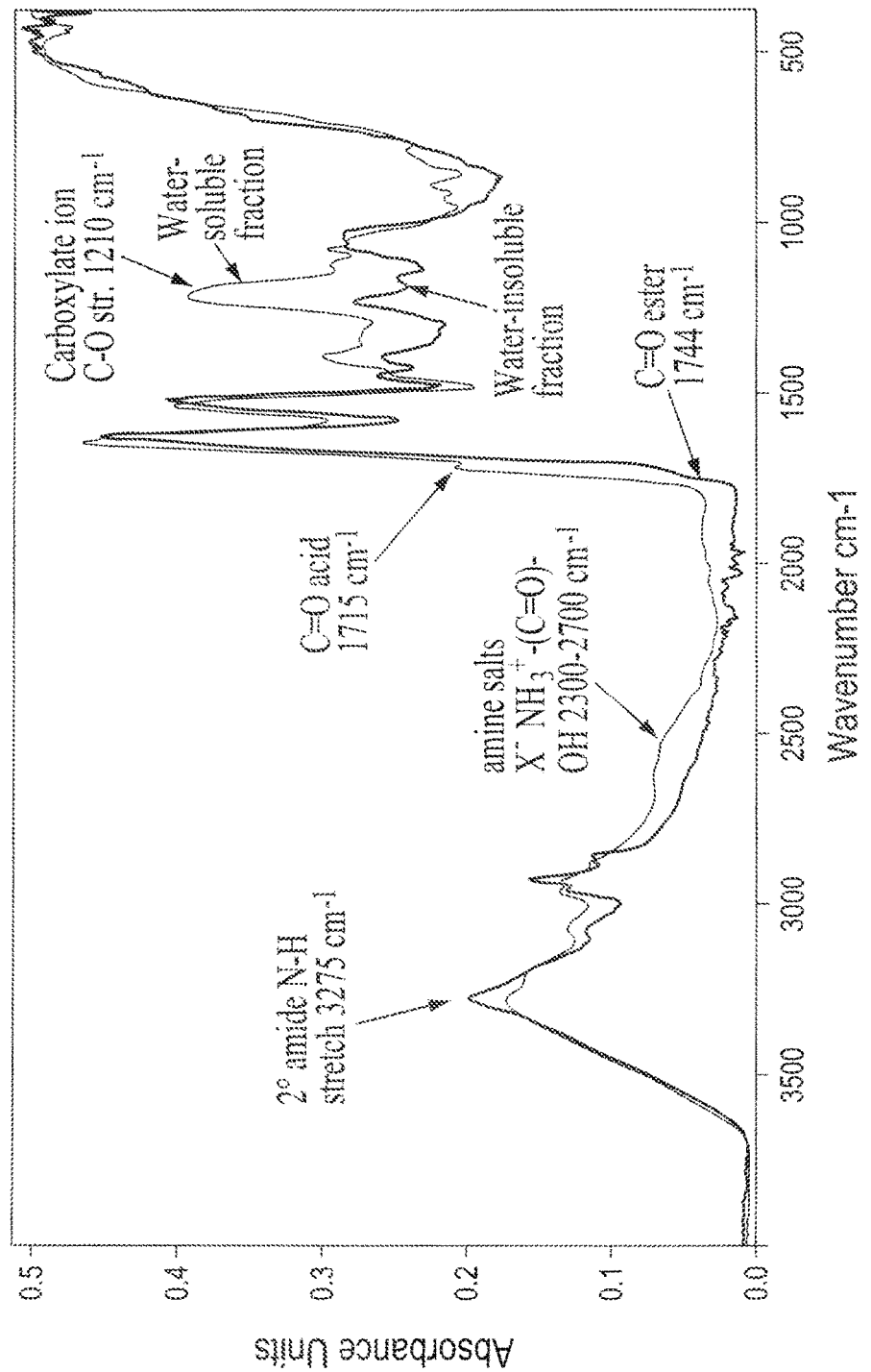
FIG. 2 shows overlaid solid state FTIR spectra for water-soluble and water-insoluble protein fractions isolated from digested castor lot 5-90.
Figure 3:
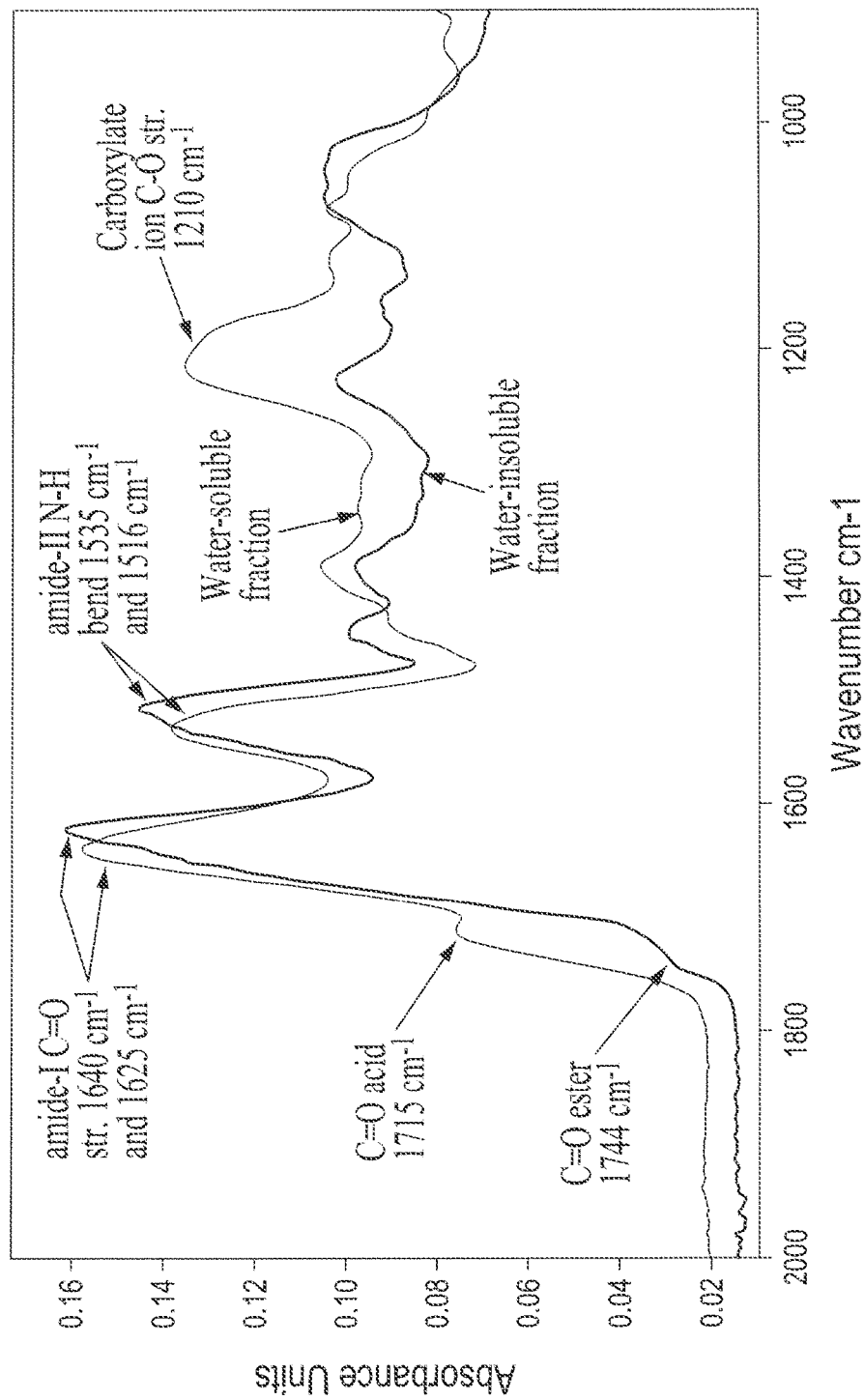
FIG. 3 shows solid state FTIR spectra of isolated water-soluble and water-insoluble fractions from digested castor, where the carbonyl amide region is expanded.
Figure 4:
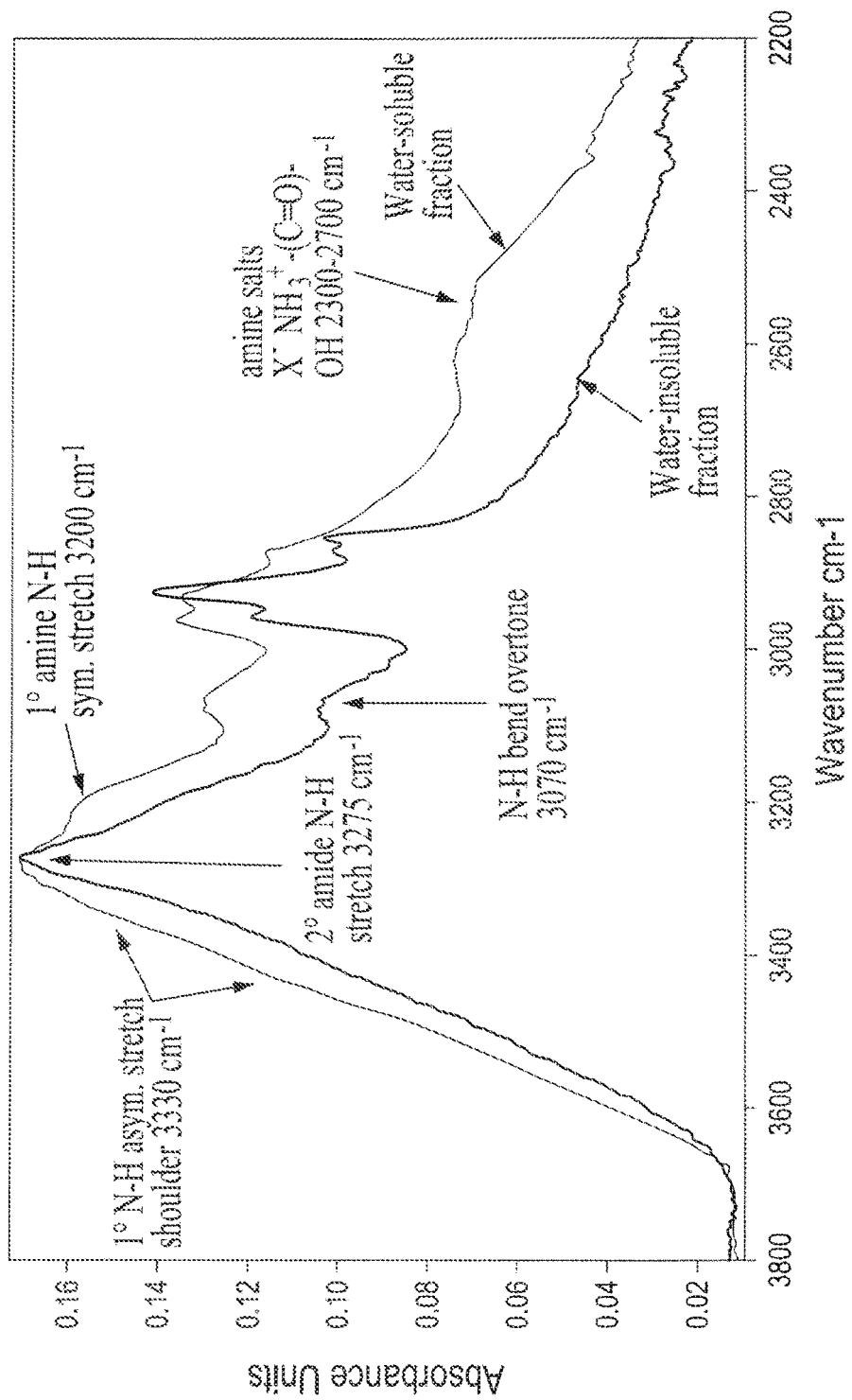
FIG. 4 shows solid state FTIR spectra of isolated water-soluble and water-insoluble fractions from digested castor where the N—H stretching region is expanded.

The two fractions were separately analyzed by solid state FTIR (see FIGS. 2-4). The spectra in FIG. 2 show that carboxylate and amine salt moieties are primarily associated with the water-soluble fraction. FIG. 3 shows that the amide carbonyl stretch band and the amide N—H bend bands are shifted to higher wavenumbers in the water-soluble polypeptide fraction. These components also appear to be present in the water-insoluble dispersible polypeptide fraction, but the predominant amide-I and amide-II bands are shifted to lower wavenumbers. Aside from hydrogen bonding effects, these differences also appear to be related to the presence of a higher fraction of primary amide groups in the water-soluble polypeptide fraction, and to a higher fraction of secondary amide groups in the water-dispersible polypeptide fraction (from the main-chain polypeptide chains). This is corroborated by the N—H stretching region depicted in FIG. 4.

FIG. 4 shows solid state FTIR spectra of isolated fraction from digested castor where the N—H stretching region from FIG. 2 is expanded. The spectra were vertically scaled to achieve equivalent absorbance intensities for the secondary amide N—H stretch band centered at 3275 $cm^{-1}$. FIG. 4 shows that the predominant type of amide in the water-dispersible fraction is the secondary main-chain amide as evidenced by the single, highly symmetric band centered at 3275 $cm^{-1}$. Although the water-soluble fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively.

These spectra show that the water-soluble polypeptide fraction contained a relatively high concentration of primary amines, free carboxylic acids, acid salts, and amine salts. Conversely, the water-insoluble/water-dispersible polypeptide fraction had a higher fraction of secondary amides. In addition, the amide-I carbonyl absorption band for the water-insoluble/water-dispersible fraction was observed to appear at a wavenumber of approximately 1625 $cm^{-1}$, whereas that of the water-soluble fraction was observed at approximately 1640 $cm^{-1}$. As will be discussed elsewhere, this feature is one of the distinguishing differences between the water-soluble and water-insoluble polypeptide fractions; not only for castor proteins, but for soy proteins and canola proteins as well.

Procedure B: Additional Procedure for Preparation of Water-Insoluble Polypeptide Composition and Preparation of Water-Soluble Polypeptide Composition.

Digested soy protein was obtained as an experimental sample (lot 5-81) from Prof. S. Braun, the Laboratory of Applied Biology at the Hebrew University of Jerusalem, Israel. The digested soy protein was prepared as follows. Soy protein isolate (Soy protein isolate SOLPRO 958® Solbar Industries Ltd, POB 2230, Ashdod 77121, Israel) was suspended in water at a ratio of 1:10 (w/w). The pH of the suspension was adjusted to pH 7 with 10N NaOH, and was then heated to 55° C. while stirring. Neutrase 0.8 L® (NOVOZYMES') then was added at a ratio of 20 g per kg of soy protein, and the mixture was stirred at the same temperature for 4 hours. The resulting mixture (pH 6.5) was spray-dried to yield a light tan powder.

Digested soy (lot 5-81) was fractionated to yield a water-soluble polypeptide fraction, and a water-insoluble/water-dispersible polypeptide fraction. In the first step, 300 g of digested soy was slurried into 1 liter of distilled water. The mixture was shaken by hand, and was then placed into a sonicator bath for a period of 30 minutes. Aliquots were placed into centrifuge tubes, and the tubes were then spun at 3,400 rpm for a period of approximately 35 minutes. The centrifuged supernatant, which contained the water-soluble fraction, was decanted off of the remaining water-insoluble sediment, and was poured into a separate container for later use (this clear yellow supernatant was placed into an open pan and was allowed to evaporate dry at a temperature of 37° C.). After the first washing step, fresh distilled water was then added to the tubes, and the remaining sediment was dispersed into the water by means of hand-stirring with a spatula. The combined centrifugation, decanting, and re-dispersion procedures were performed for a total of 5 cycles. After the final cycle, the free liquid containing residual water-soluble protein was decanted from the residual paste-like dispersion (yellowish-peach in color). The resulting dispersion (gravimetrically determined to be 16.24% solids by weight) contained the water-insoluble/water-dispersible proteins.

The paste-like dispersion was observed to be stable for a period of several weeks. It was also discovered that the dispersion could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the digested soy, nor the digested soy itself was capable of stabilizing a dispersion of PMDI in water.

Figure 5:
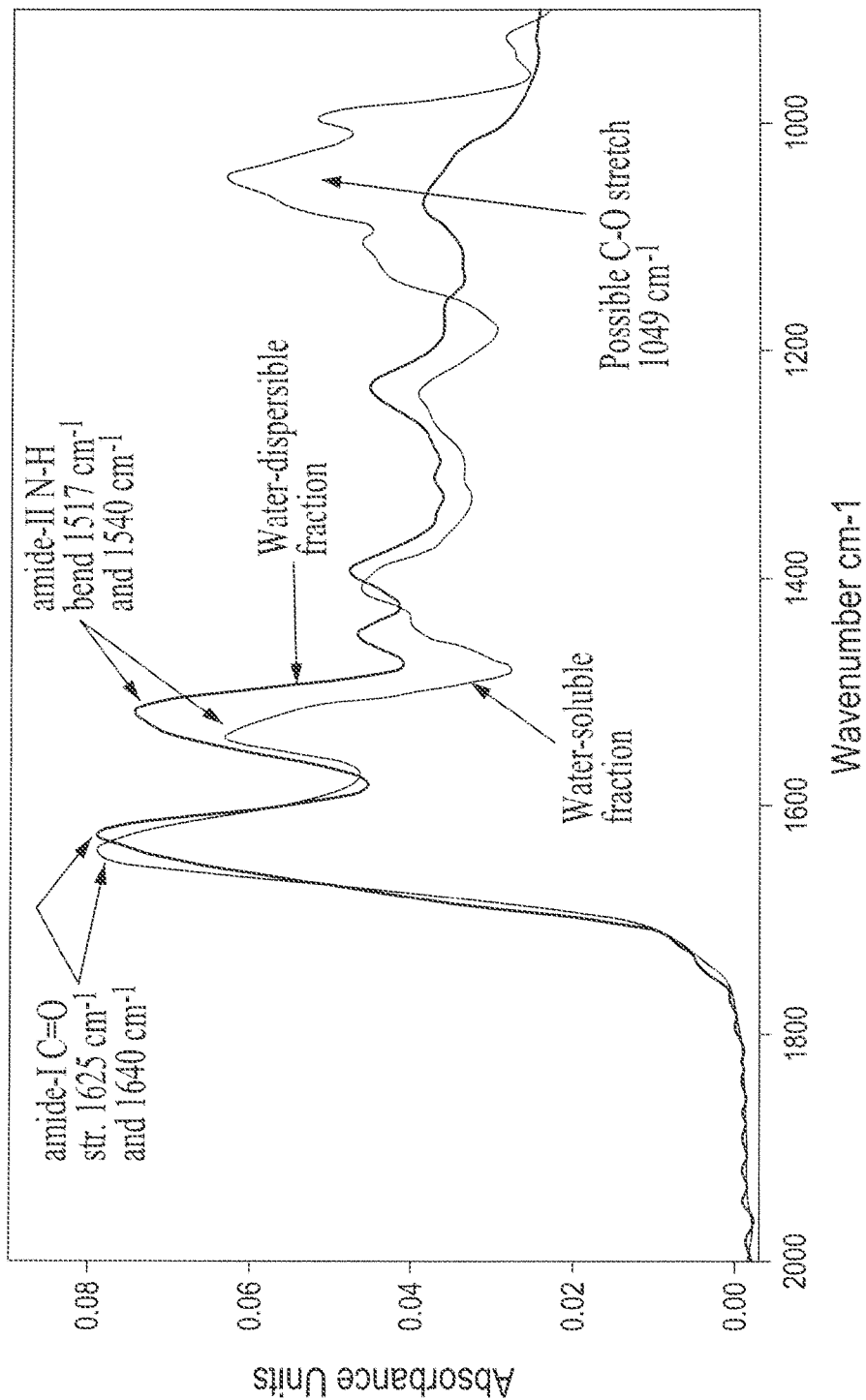
FIG. 5 shows overlaid solid state FTIR spectra of isolated fractions from castor protein (lot 5-94), showing an expansion of the carbonyl amide region (water-soluble fraction, and water-insoluble/water-dispersible fraction)
Figure 6:
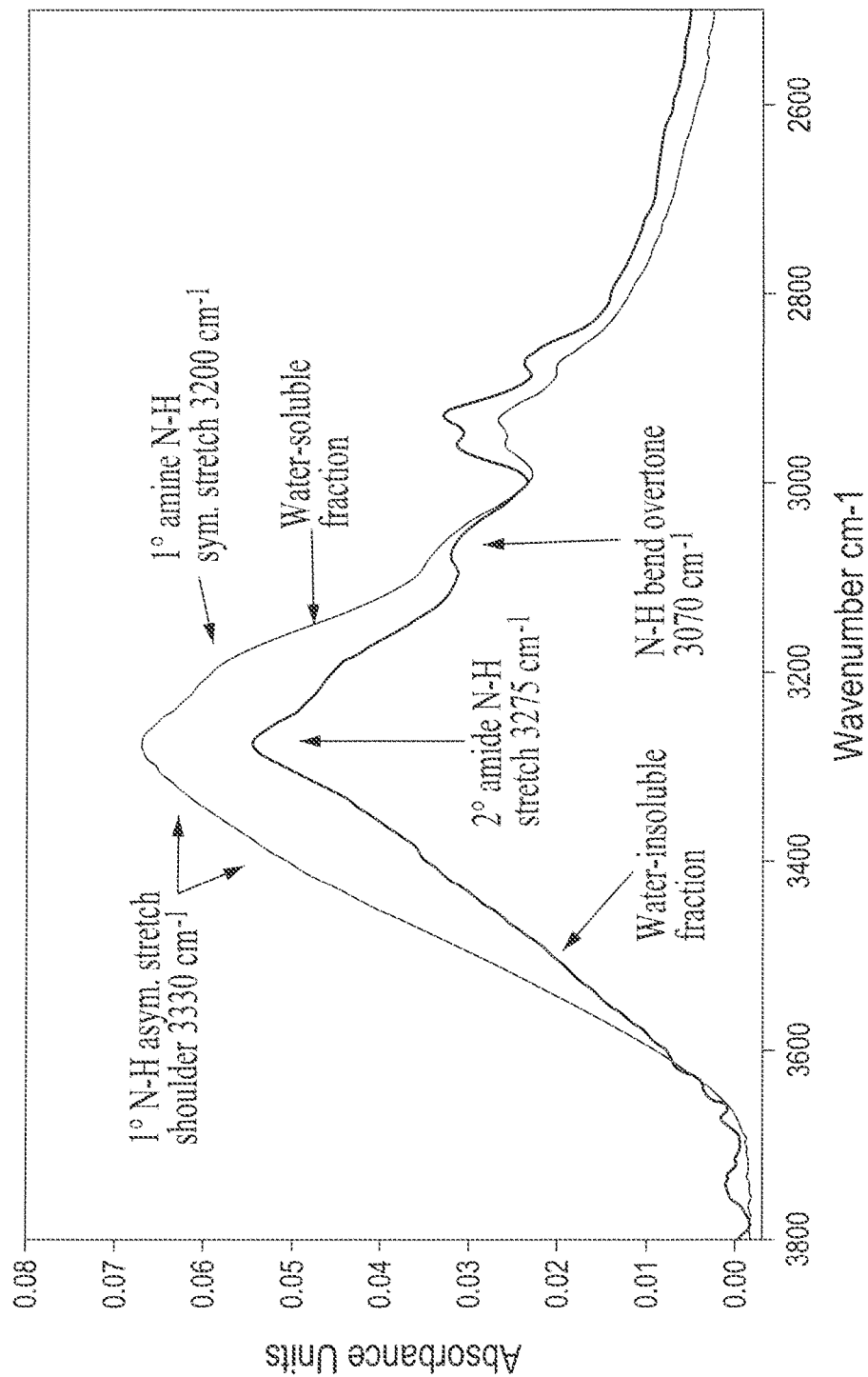
FIG. 6 shows the solid state FTIR spectra of isolated water-soluble and water-insoluble fractions from castor protein (lot 5-94), where the N—H and O—H stretch regions are expanded.
Figure 7:
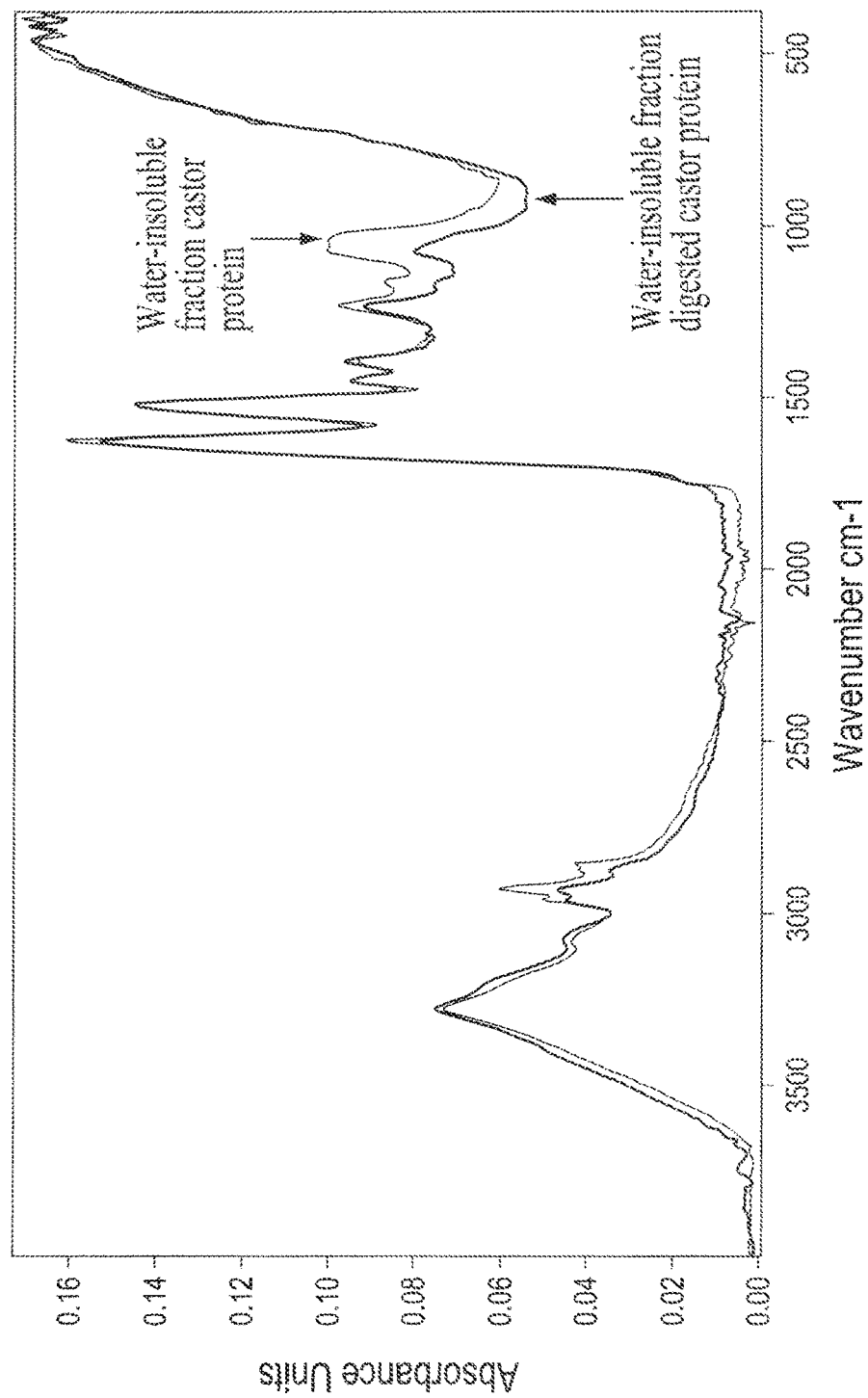
FIG. 7 shows overlaid solid state FTIR spectra of the isolated water-insoluble/water-dispersible fractions from castor protein (lot 5-94) and from enzyme digested castor (lot 5-90)
Figure 8:
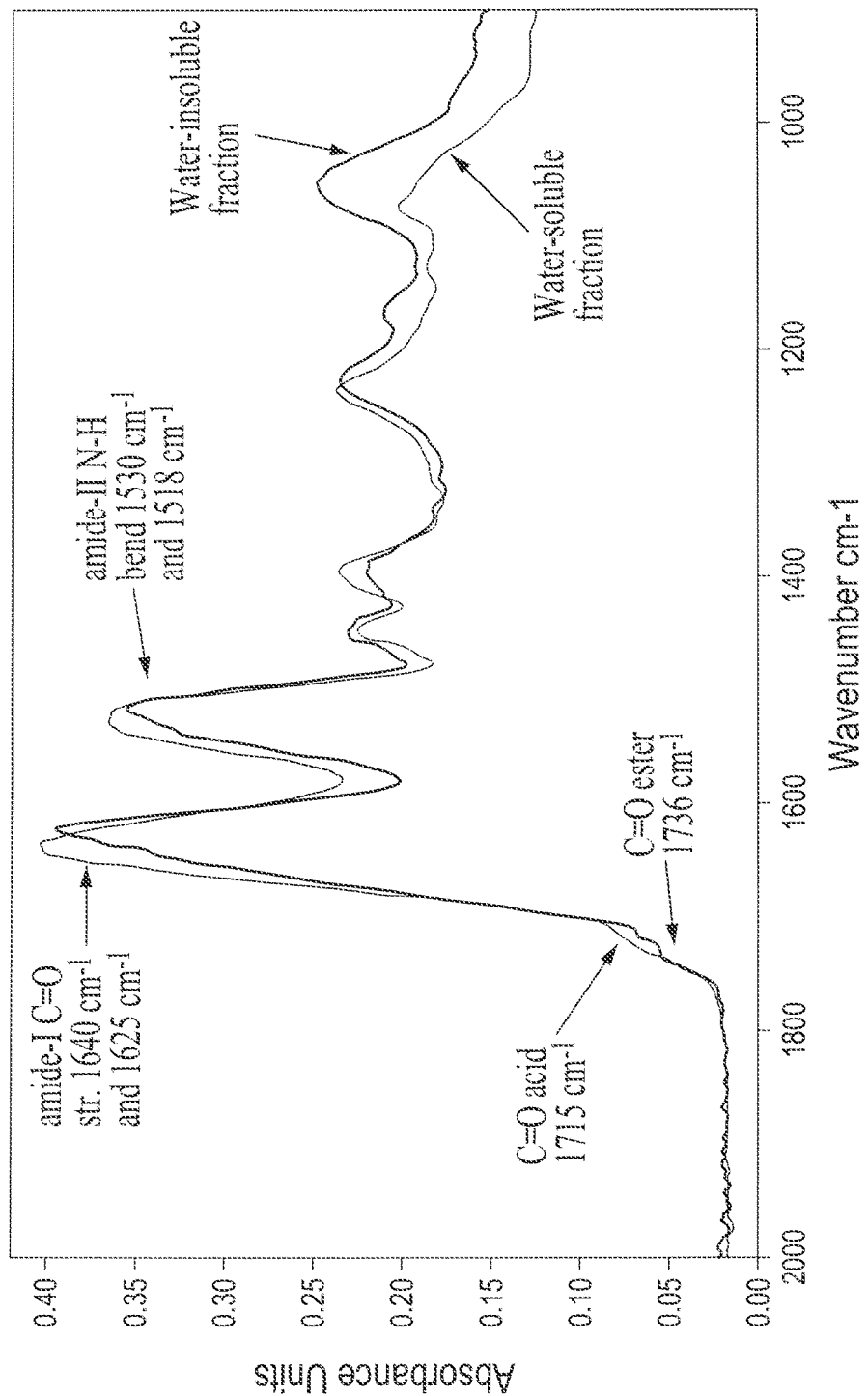
FIG. 8 shows overlaid solid state FTIR spectra of isolated water-soluble and water-insoluble fractions from digested soy, where the carbonyl amide region is expanded, where the spectra were vertically scaled to achieve equivalent absorbance intensities for the amide-I carbonyl stretch.
Figure 9:
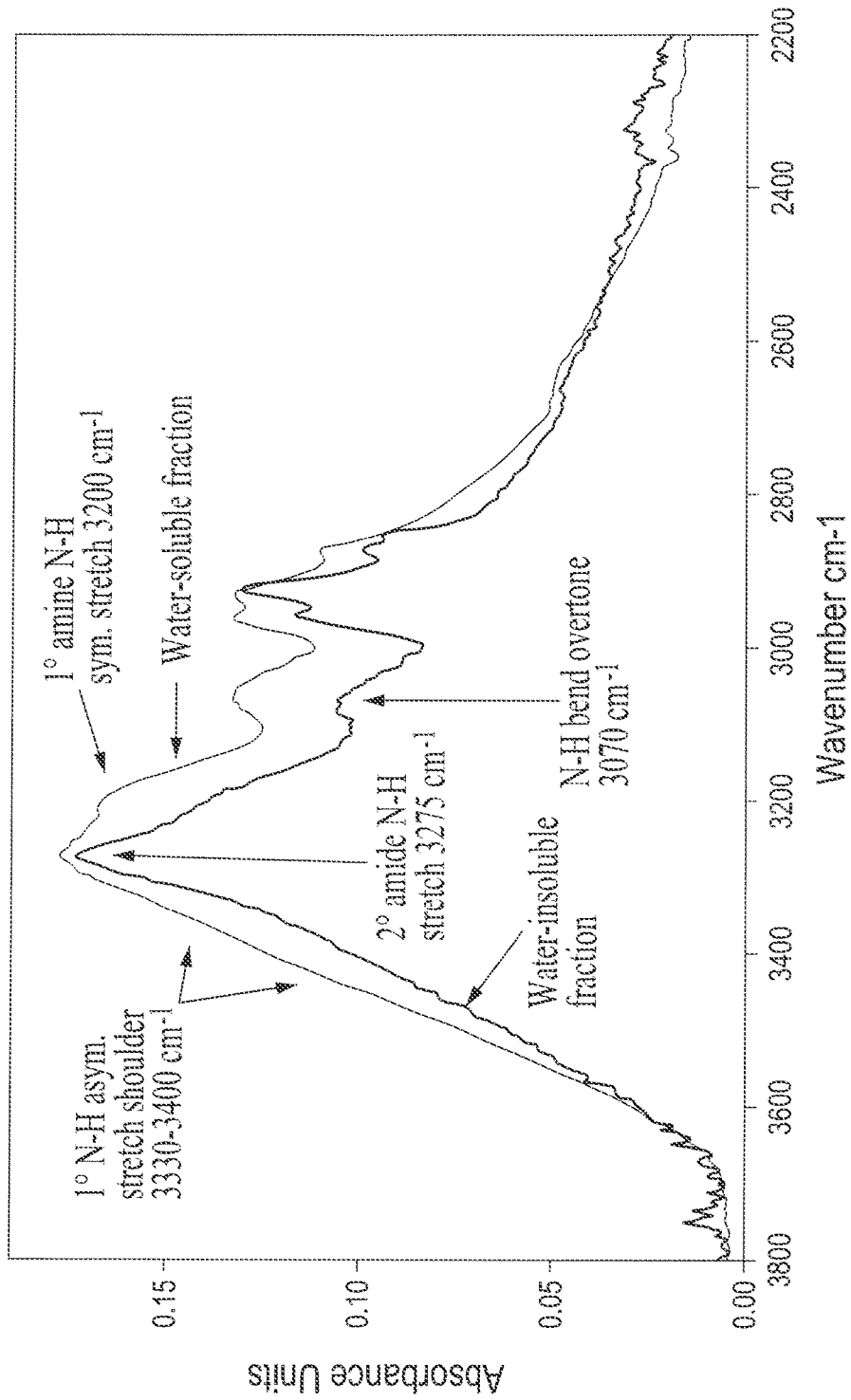
FIG. 9 shows overlaid solid state FTIR spectra of isolated water-soluble and water-insoluble fractions from digested soy, where the N—H stretching region is expanded.

After drying aliquots of both fractions, it was verified that the yellow sediment (the water-insoluble/water-dispersible extract) could not be re-dissolved in water. On the other hand, the dried supernatant fraction (clear/yellow solid) was completely soluble in water. The two dried extracts were separately analyzed by solid state FTIR (see FIGS. 5-8). FIG. 6 shows overlaid solid state FTIR spectra of isolated fractions from digested soy, where the N—H region is expanded. The spectra were vertically scaled to achieve equivalent absorbance intensities for the secondary amide N—H stretch band centered at 3275 $cm^{-1}$. FIG. 6 shows that the predominant type of amide in the water-dispersible fraction is the secondary main-chain amide as evidenced by the single, highly symmetric band centered at 3275 $cm^{-1}$. Although the water-soluble polypeptide fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively. Collectively, these spectra revealed that the water-soluble polypeptide fraction was comprised of a relatively high concentration of primary amines. Conversely, the water-insoluble, dispersible polypeptide fraction was comprised of a higher fraction of secondary amines As shown in FIG. 5, the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups (and/or primary amines) in the water-soluble polypeptide fraction (from lower molecular weight amino acid fragments), and to a higher fraction of secondary amide groups in the water-dispersible polypeptide fraction (from the main-chain polypeptide chains). This is supported by the N—H stretching region depicted in FIG. 4.

FIG. 6 shows that the predominant type of amide in the water-dispersible fraction is the secondary main-chain amide as evidenced by the single, highly symmetric band centered at 3275 $cm^{-1}$. Although the water-soluble fraction also contains this type of amide, it also contains significantly higher fractions of primary amines as evidenced by the presence of the two primary N—H stretching bands at 3200 $cm^{-1}$ (symmetric) and at approximately 3300 $cm^{-1}$ (asymmetric), respectively.

Figure 10:
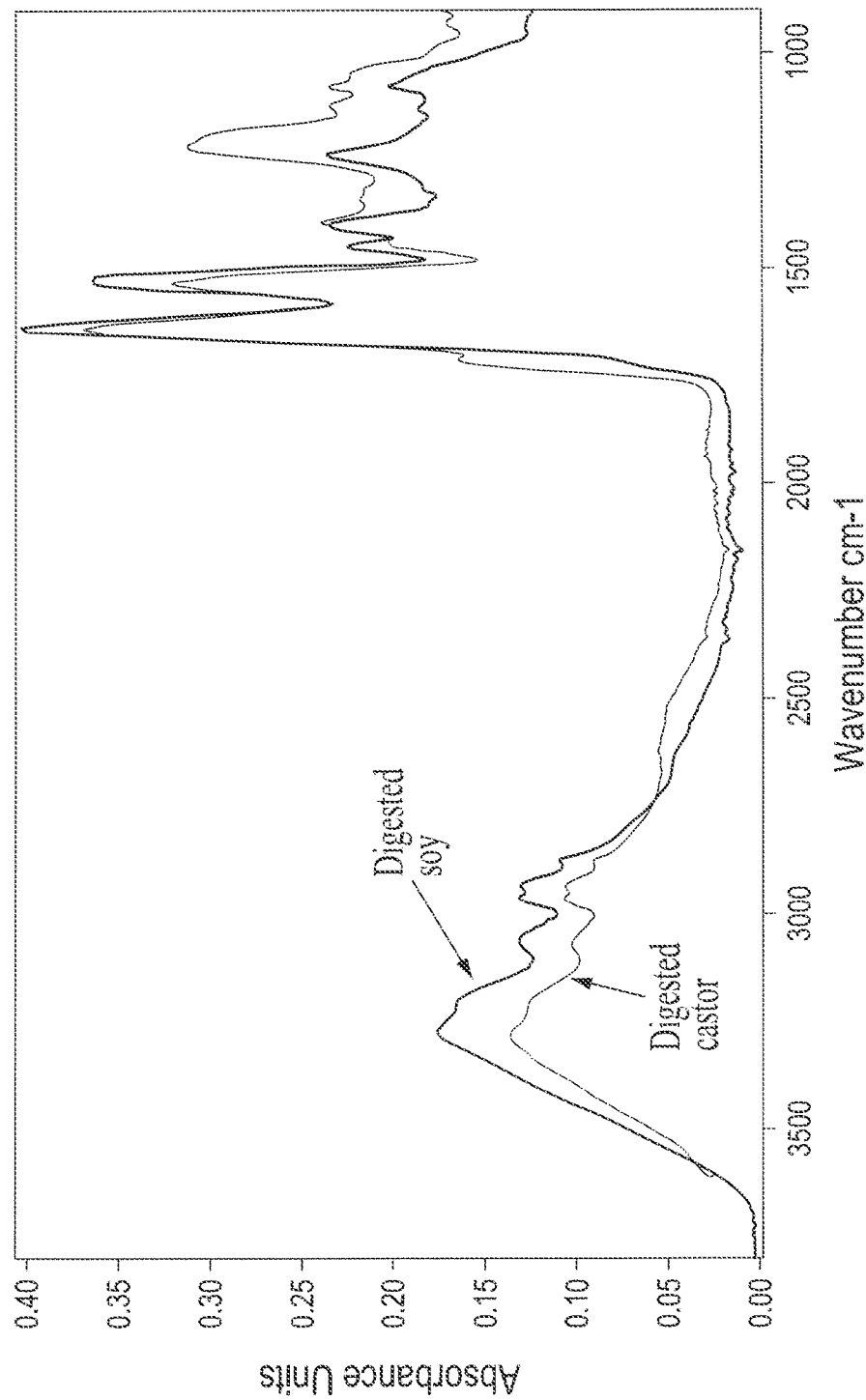
FIG. 10 shows overlaid solid state FTIR spectra of isolated water-soluble polypeptide fractions from digested soy and digested castor.
Figure 11:
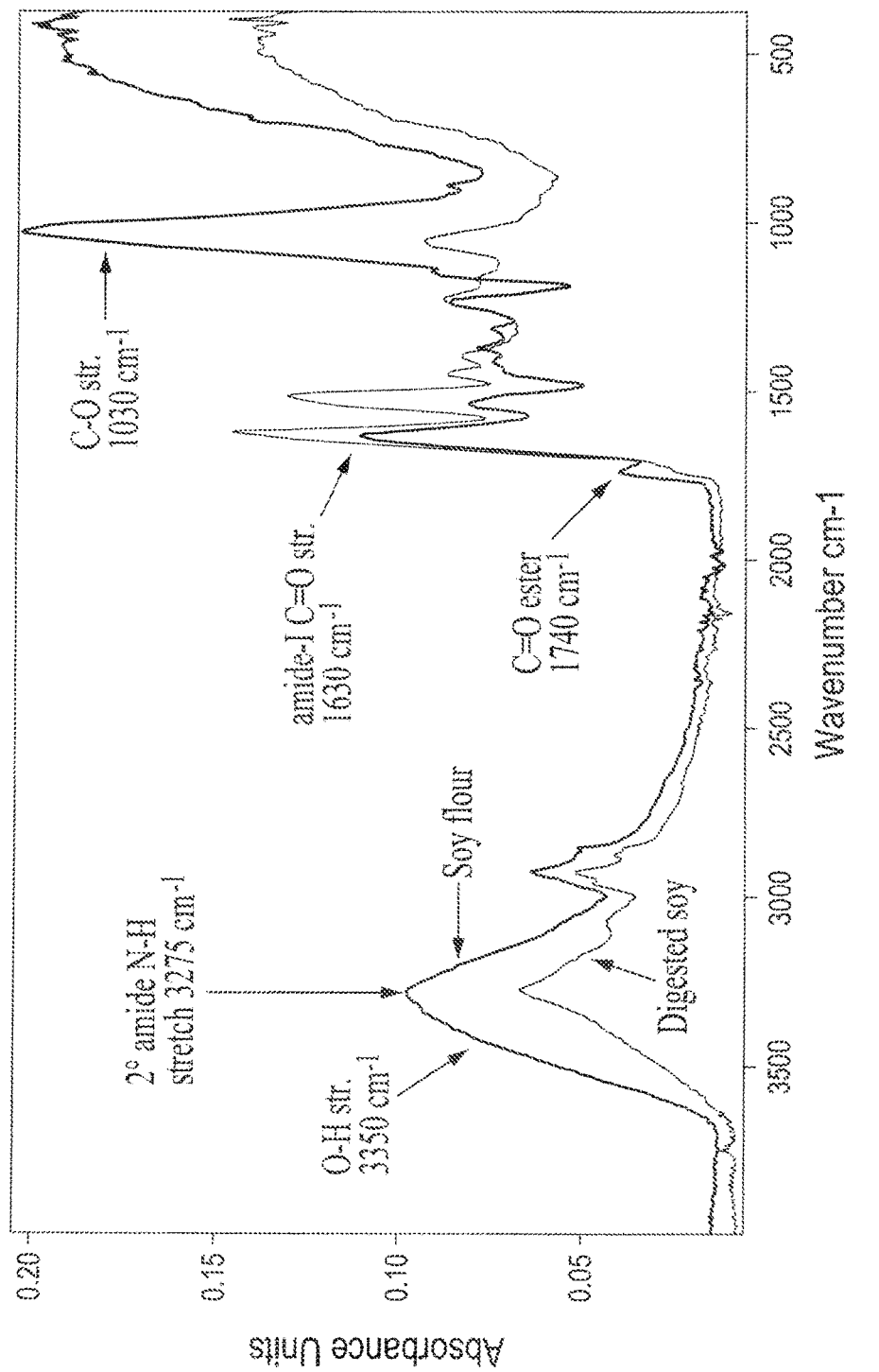
FIG. 11 shows overlaid solid state FTIR spectra of isolated water-insoluble fractions from digested soy and soy flour.
Figure 12:
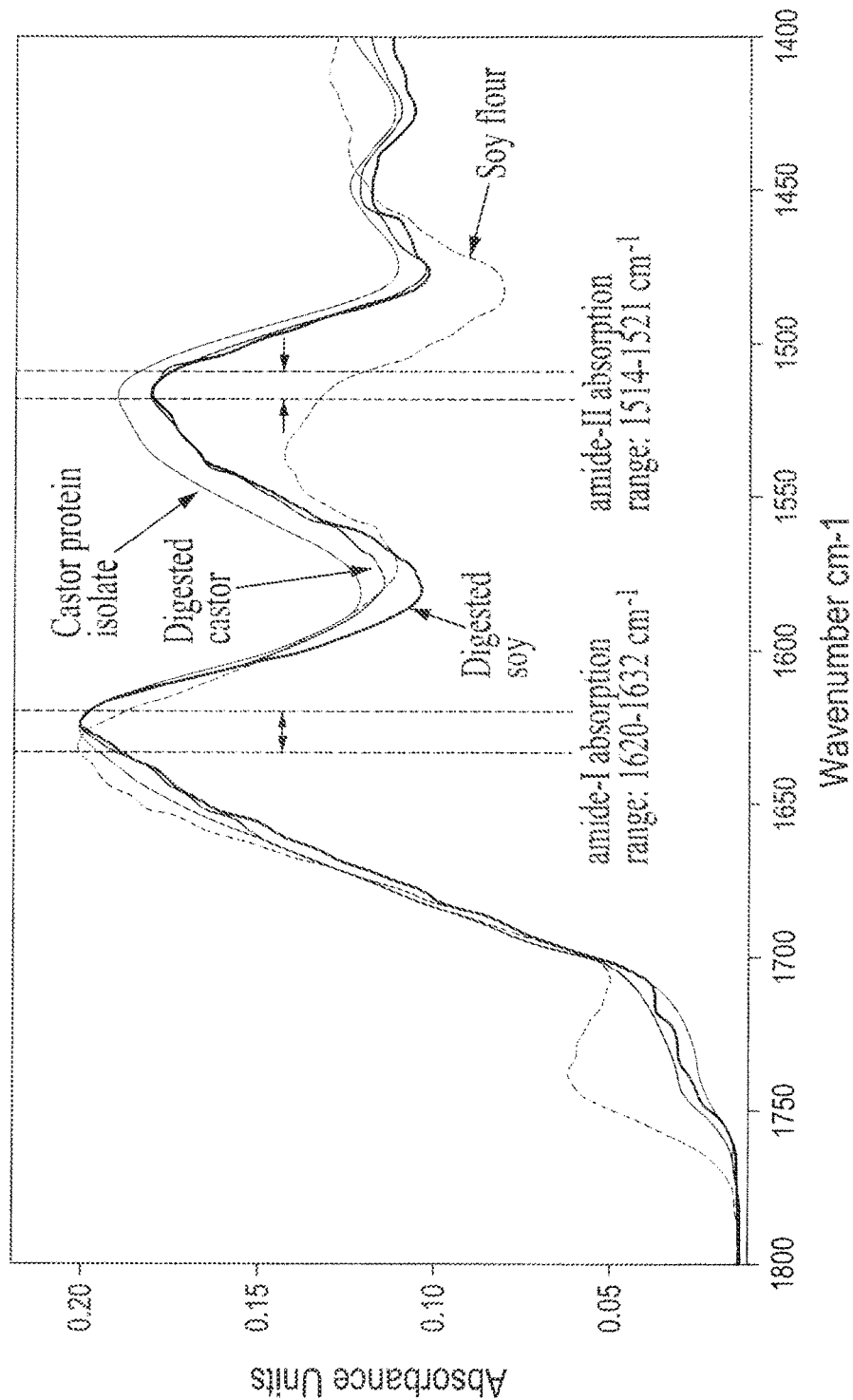
FIG. 12 shows overlaid solid state FTIR surface ATR spectra of the isolated water-insoluble/water-dispersible fractions from multiple protein samples (digested soy lot 5-81, soy flour, castor protein isolate lot 5-94, digested castor lot 5-90) where the carbonyl amide region is expanded.

In spite of being derived from different plant sources, the water-insoluble dispersible fractions from digested soy and digested castor are spectrally similar to one another (see FIG. 12). Conversely, the water-soluble polypeptide fractions appear to have different FTIR spectral characteristics (see FIG. 10). Further, MALDI mass spectroscopic indicates the water-soluble polypeptide fractions from digested soy and digested castor have different molecular weight characteristics. The commonality between the two types of water-soluble fractions is that they both appear to contain primary amines/amides.

Procedure C: Additional Procedure for Preparation of Water-Insoluble Polypeptide Composition and Preparation of Water-Soluble Polypeptide Composition Castor meal (4.0 kg containing 24.8% protein) was suspended in 0.1M NaOH at a 10:1 w/w meal to alkali ratio. The suspension was stirred for 18 hours at ambient temperature and the solids were then removed by centrifugation. The supernatant (about 32 liters) was acidified to pH 4.5 with 10 N HCl. The protein was allowed to sediment at about 10° C. for 12 hours, the clear supernatant solution was decanted, and the heavy precipitate (about 2 kg) was collected by centrifugation. The wet precipitate was freeze-dried yielding 670 g protein isolate.

The water-insoluble and water-soluble polypeptide fractions were obtained by means of extraction with water. In the first step, 10 g of the castor protein isolate (lot 5-94) was slurried into 50 g of distilled water. The mixture was dispersed via mechanical stirring for 2 hours. Aliquots then were placed into centrifuge tubes, and the tubes were then spun at 3,400 rpm for a period of approximately 35 minutes. The centrifuged supernatant, which contained the water-soluble fraction, was decanted from the remaining water-insoluble sediment, and was poured into a separate container (this clear yellow supernatant was saved and dried at 37° C. for subsequent dispersion experiments and solid state FTIR analyses). After the first washing step, fresh distilled water was then added to the tubes, and the remaining sediment was dispersed into the water by means of hand-stirring with a spatula. The combined centrifugation, decanting, and re-dispersion procedures were performed for a total of 13 cycles. After the final cycle, the free liquid was decanted from the residual paste-like dispersion (the water-insoluble polypeptide fraction from the starting castor protein). Upon drying, the paste was determined to contain 28.58% solids, and the total yield of the water-insoluble fraction was determined to be 62.87%. Thus, the starting castor protein itself contained 62.87% water-insoluble polypeptide material, and 37.12% water-soluble polypeptide material.

Procedure D: Preparation of Digested Whey Protein.

Digested whey protein (lot 5-72, referred to herein as digested whey protein pH 6.5) was obtained as an experimental sample from Prof. S. Braun, the Laboratory of Applied Biology at the Hebrew University of Jerusalem, Israel, and was prepared as follows; Whey protein (WPI-95® Whey Protein Isolate; Nutritteck, 24 Seguin Street, Rigaud, QC, Canada J0P 1P0) was suspended in water at a ratio of 1:6 (w/w). The pH of the suspension was adjusted to pH 7 with 5N NaOH, and was heated to 55° C. while stirring. FLAVOURZYME 500MG® (from NOVOZYMES') then was added at a ratio of 20 g per kg of whey protein, and the mixture was stirred at the same temperature for 4 hours. The resulting aqueous mixture was pH 6.5. The resulting mixture then was spray-dried to yield digested whey protein as a pale yellow powder containing a mixture of water-soluble and water-insoluble polypeptide.

Procedure E: Preparation of Digested Castor Protein Reacted with Sodium Nitrite.

Castor meal protein was suspended in water at a ratio of 1:10 (w/w). Calcium chloride was added at an effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at a ratio of 10 g per kg of castor meal protein, and the mixture was stirred at the same temperature for 4 hours. L-lactic acid (90%, 120 g per kg castor protein) then was added to bring the mixture to pH 4.4 followed by gradual addition (over a 20 hour period) of sodium nitrite solution in water (0.4 kg/1, 0.4 liter per kg castor protein) while stirring. The reaction then was left to stand at ambient temperature for 40 hours. $Na_2S_2O_5$ (0.2 kg per kg castor protein) was then added, and the reaction was heated to 60° C. and stirred for 15 minutes. After cooling to ambient temperature, the reaction was brought to pH 2.0 with concentrated HCl. It was then left at 10° C. for 18 hours, and the resulting precipitate was separated by centrifugation for 15 minutes at 24,000×xg. The precipitate was re-suspended in 10 mM citric acid (3 vol. per vol. precipitate), and then it was collected and subsequently freeze-dried to yield a tan powder containing a mixture of water-soluble and water-insoluble polypeptide.

Procedure F: Isolation of Water-Insoluble/Water-Dispersible Protein Fraction and Water-Soluble Protein Fraction by Washing Ground Soy Meal with Water, and Characterization of Same Part I: Isolation of Water-Insoluble/Water-Dispersible Protein Fraction and Water-Soluble Protein Fraction Soy meal (same as Example 1) having a particle size range of 20-70 μm was mixed with distilled water (pH approximately 7) to yield a 27.83% meal dispersion in water (w/w). In the first "wash" step, an aliquot of the dispersion was centrifuged for 60 minutes, and the clear supernatant containing a water-soluble protein fraction was decanted from the wet slurry that remained on the bottom of the centrifuged tube (in a separate experiment, this wet slurry was gravimetrically determined to contain approximately 33% solids in water (w/w); and the supernatant was gravimetrically determined to contain approximately 15% by weight solids (w/w)). The yield of the water-insoluble/water-dispersible protein fraction after the first "wash" step was determined to be approximately 80% of the starting meal weight.

In a second step, the 33% solids fraction from the first wash step was mixed and dispersed in fresh distilled water (pH approximately 7), and the dispersion was centrifuged for a second time. Again, the clear supernatant was decanted, and the remaining slurry was subjected to a third wash cycle (addition of fresh distilled water followed by centrifuging). After the third "wash" step and supernatant decanting, the resulting slurry of water-insoluble/water-dispersible protein fraction was gravimetrically determined to contain approximately 24% solids, and the yield was determined to be approximately 53% of the starting meal weight. Thus, the ground soy meal itself was comprised of approximately 53% of a water-insoluble/water-dispersible protein fraction, and approximately 47% of a water-soluble protein fraction.

Part II: Dispersion Analysis for Water-Insoluble/Water-Dispersible Protein Fraction, Water-Soluble Protein Fraction, and Ground Soy Meal An aliquot of the 24% solids dispersion of the isolated water-insoluble/water-dispersible protein fraction (washed 3 times as noted above) was blended with PMDI at a w/w ratio of 1 part PMDI to 1 part of protein fraction. The resulting mixture formed a stable dispersion, and remained stable during a 1 hour period of observation with no visual signs of phase separation.

In order to test dispersion ability of ground soy meal, a dispersion of 24% (w/w) ground soy meal in water was mixed with PMDI at a 1:1 w/w ratio of PMDI to soy meal solids. The soy meal comprised approximately 53% by weight of a water-insoluble/water-dispersible protein fraction and approximately 47% by weight of a water-soluble protein fraction. The mixture of ground meal and PMDI formed a stable dispersion which remained stable during a 1 hour period of observation with no visual signs of phase separation.

In order to test dispersion ability of water-soluble protein faction, water-soluble protein fraction obtained from the soy meal (by first washing the soy meal, then isolating the water-soluble fraction by drying the supernatant after centrifuging) was dissolved in water to yield a 24% solids solution (w/w). When PMDI was added to this solution (at a 1:1 weight ratio of PMDI to water-soluble protein fraction), the resulting mixture was unstable, and phase separation was visually evident—immediately after mixing.

The experimental results above demonstrate that water-emulsified PMDI-containing adhesive compositions can be prepared with i) water-insoluble/water-dispersible protein fractions obtained by washing ground plant meals, and ii) ground plant meal compositions that are comprised of both a water-insoluble/water-dispersible protein fraction and a water-soluble protein fraction. The water-soluble protein fraction does not facilitate dispersion, but the water-insoluble/water-dispersible protein fraction is present in an amount sufficient to facilitate dispersion.

Various commercially available compositions derived from plant meals, such as soy flour, are solvent-extracted which result in removal of water-insoluble protein components. Such compositions are unable to facilitate dispersion, and, thus, are less desirable for use making an adhesive.

Part III: FTIR Analysis of Water-Insoluble/Water-Dispersible Protein Fraction, Water-Soluble Protein Fraction, and Ground Soy Meal Solid state surface ATR FTIR experiments were performed on water-insoluble/water-dispersible protein fraction (this sample was collected after the third wash cycle and was allowed to dry at 23° C., and water-soluble protein fraction (this sample was collected from the clear supernatant after the third wash cycle, and was allowed to dry at 23° C. to yield a transparent amber solid) obtained by washing soy meal with water. Characteristics of the FTIR spectra are described below.

Figure 16:
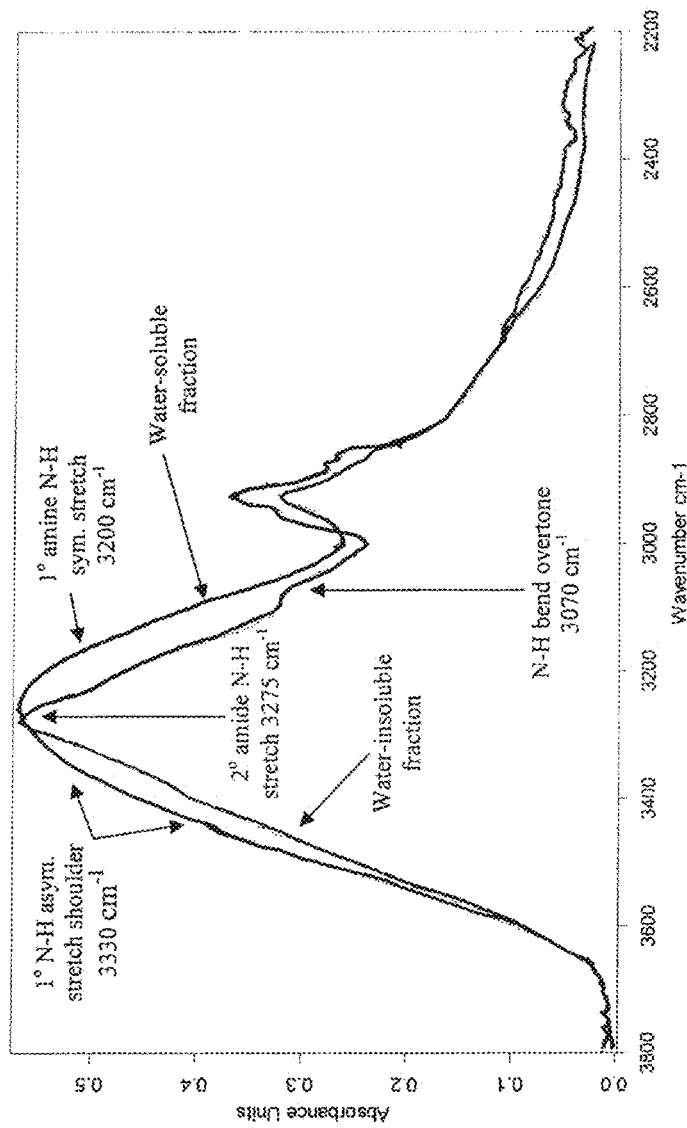
FIG. 16 shows solid state FTIR spectra of isolated water-soluble and water-insoluble fractions obtained from ground soy meal, where the N—H and O—H stretch regions are expanded.

FIG. 16 shows the solid state FTIR spectra for the isolated water-insoluble/water-dispersible protein fraction from soy meal together with the water-soluble protein fraction where the N—H stretching region has been expanded. The spectra were vertically scaled to achieve equivalent absorbance intensities for the secondary amide N—H stretch band centered at 3275 $cm^{-1}$. FIG. 16 shows that the predominant type of amide in the water-insoluble/water-dispersible protein fraction is the secondary main-chain amide as evidenced by the single, highly symmetric band centered near 3275 $cm^{-1}$. Although the water-soluble fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively.

Figure 17:
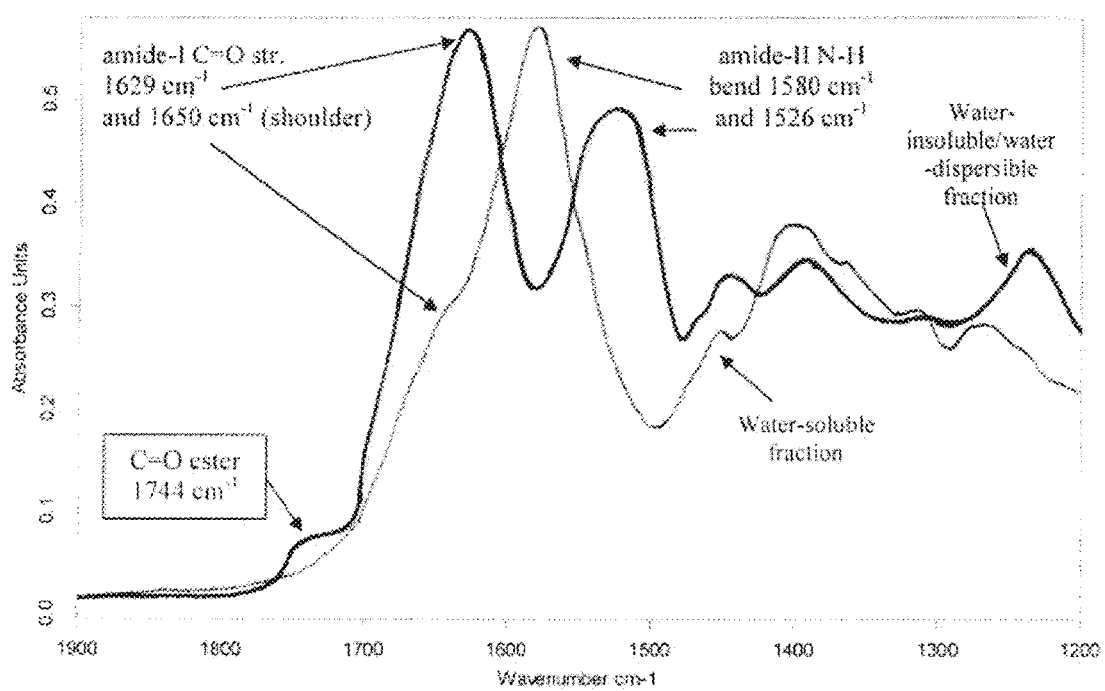
FIG. 17 shows overlaid solid state FTIR spectra of isolated water-soluble and water-insoluble fractions obtained from ground soy meal, where the carbonyl amide region is expanded and the spectra were vertically scaled to achieve equivalent absorbance intensities for the amide-1 carbonyl stretch.

As shown in FIG. 17, the amide-I carbonyl absorption band for the water-insoluble/water-dispersible protein fraction was observed to appear at a wavenumber of approximately 1629 $cm^{-1}$, whereas that of the water-soluble protein fraction was observed to appear at approximately 1650 $cm^{-1}$. This feature is one of the distinguishing differences between the water-soluble protein fraction and water-insoluble/water-dispersible protein fraction, not only for isolated polypeptides from castor and soy proteins, but for protein-containing fractions that are isolated directly from plant meals like soy meal. Moreover, the amide-II band for the water-insoluble/water-dispersible protein fraction was observed to appear as a broad band centered at approximately 1526 $cm^{-1}$, whereas that of the water-soluble protein fraction was observed to appear at approximately 1580 $cm^{-1}$ together with a weak shoulder at approximately 1547 $cm^{-1}$.

Example 2

Characterization of Polypeptide Compositions by Mass Spectrometry

This Example describes characterization of the various protein samples via MALDI Mass Spectrometry using an Ultraflex III instrument from Bruker.

The instrument was set in positive mode, in order to detect positive ions generated during the ionization process. The voltage applied to accelerate the ion into the TOF analyzer was set at 25 KV. The analysis was carried out by using the instrument in reflection mode which improves the resolution. Solid samples were dissolved in DMSO at a concentration of 10 mg/mL. Water-soluble supernatant fractions which were solvated in water.

Each sample solution was mixed with a matrix solution (for analytical purposes). The matrix was an inert compound of low molecular weight which absorbs at the same wavelength of the laser, Nd:YAG 355 nm. The matrices used were: α-CHCA, alpha-cyano-4-hydroxycinnamic acid, dissolved in a solution of ACN/$H_2O$ (70:30) with 0.1% of TFA at a concentration of 10 mg/mL; and DCTB, T-243-(4-t-Butyl-phenyl)-2-methyl-2-propenylidene]malononitrile, dissolved in THF at a concentration of 10 mg/mL. The first matrix was mainly used for the analysis of peptides and proteins while the second one, DCTB, was suitable for the analysis of polymers.

The matrix solutions and the sample solutions were mixed at a 10:1 volume ratio respectively. For the analysis where DCTB was used as matrix, NaTFA (10 mg/mL in THF) was added to the solution matrix/sample as a cationizing agent at a ratio 10:2:1 by volume (matrix:sample:salt, respectively). 0.8 μL of the resulting solutions were spotted on a target plate made of polished steel, and only after the solvents were completely dried was the target loaded into the instrument. The spectra were collected and manipulated by using Flex-Analysis software released by Bruker Daltonics.

Relative fragment intensities were normalized and used to calculate number average (Mn), weight average (Mw), and z-average (Mz) molecular weight parameters for various samples. The results are summarized in Table 2.

TABLE 2

| Sample ID | Mn | Mw | Mz | Mw/Mn |
|---|---|---|---|---|
| Castor protein isolate lot 5-94 [1] | 1149 | 1162 | 1179 | 1.01 |
| Digested castor lot 5-83 [2] | 951 | 1081 | 1250 | 1.13 |
| Digested castor lot 5-108 [3] | 897 | 1011 | 1169 | 1.12 |
| Digested castor Water-insoluble/dispersible fraction (lot 5-108) [3] | 1009 | 1371 | 1928 | 1.35 |
| Digested castor Water-soluble fraction (lot 5-108) [3] | 1532 | 1697 | 1894 | 1.10 |
| Soy Protein Isolate | 2023 | 2104 | 2161 | 1.03 |
| Digested Soy (lot 5-81) [4] | 894 | 989 | 1104 | 1.10 |
| Digested Soy Water-insoluble/dispersible fraction (lot 5-81) [4] | 910 | 1119 | 1512 | 1.22 |
| Digested Soy Water-soluble fraction (lot 5-81) [4] | 837 | 888 | 941 | 1.06 |

[1] see Example 1, Procedure C
[2] Castor meal protein digested with Everlast (Lot No. 5-83) was obtained from Prof. Sergei Braun of The Hebrew University of Jerusalem
[3] see Example 4
[4] see Example 1, Procedure B The results indicate that the molecular weight characteristics (as determined by MALDI mass spectroscopy) of the polypeptide composition can depend on the process used to obtain the polypeptide composition. For example, castor protein isolate was observed to have a higher number average molecular weight than its digested counterpart. Further, upon digestion, the number average molecular weight was observed to decrease while the polydispersity increased. The same trend was observed for the soy protein isolate and its digested counterpart.

Other experimental results indicate that proteins in the water-soluble polypeptide composition from digested castor have a higher number average molecular weight than its parent protein isolate. However, proteins in the water-soluble polypeptide composition from digested soy had a lower number average molecular weight than its parent soy protein isolate.

Collectively, these results indicate that it is possible to prepare compositions that both i) have particular molecular weight features, and ii) have the ability to disperse an oil in water or water in oil, by selecting a particular procedure for preparing the polypeptide composition.

Example 3

Characterization of Polypeptide Compositions by Two-Dimensional Proton-Nitrogen NMR Correlation Spectra and Characterization of a Water-Insoluble/Water-Dispersible Polypeptide Fraction The water-insoluble and water-soluble protein fractions were prepared as follows. Digested castor (lot 5-83) was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at the ratio of 10 g per kg of castor meal protein, and the mixture was stirred at the same temperature for 4 hours. The resulting mixture then was brought to a pH 3.5 with citric acid and was spray-dried to yield a tan powder. Then, the water-insoluble and water-soluble protein fractions were harvested as described in Example 1 (Procedure A) and were allowed to air-dry at 23° C.

The dried powder containing the water-insoluble protein fraction was dissolved in d6-DMSO (6.8% by weight) to yield a red homogeneous solution (Sample A). An aliquot of the as-made dried digested castor was also dissolved in d6-DMSO (6.8% solids by weight) to yield a comparative homogeneous red solution (Sample B). Solid-state FTIR analyses of the same dried powders revealed distinct differences in both the N—H stretching and carbonyl stretching regions of the solid state FTIR spectra. These spectral differences were attributed to differences in bonding environments for the polypeptide N—H moieties, possibly resulting from differences in secondary and tertiary structure. One of the specific differences involved a shift to lower wavenumbers for the amide-I carbonyl band in the water-insoluble/water-dispersible fraction. In order to further characterize these types of differences, a two-dimensional NMR technique was employed for the purpose of characterizing a very specific subset of bonded atomic nuclei; namely, protons bonded to nitrogens.

The samples were dissolved in DMSO-d6 and were placed into 5 mm NMR tubes. All $^1$H NMR spectra were recorded on a Varian INOVA 750 MHz spectrometer equipped with an HCN-PFG (pulsed field gradient) triple resonance Cryo Probe at 30° C. For one-dimensional (1D) $^1$H NMR spectra, a spectral window of 10000 Hz was used with an acquisition time of 3 seconds and relaxation delay of 5 seconds. The spectra were signal averaged for 16 transients using a proton 90° pulse width of 8.6 microseconds. The spectral data were zero filled to 132 k points and were processed with 1 Hz line broadening, then baseline corrected and referenced to an internal residual solvent DMSO-d6 peak at 2.50 ppm before integrating and making plots.

Phase sensitive two-dimensional (2D) $^1$H-$^{15}$N gradient-HSQC (heteronuclear single quantum coherence) data were collected with 2048 acquisition points in the F2 dimension and 768 points in the F1 dimension (90° pulse widths of 6.3 microseconds, and 33.5 microseconds were used for proton and nitrogen, respectively) 48 transients were collected for each increment, with a repetition delay of 1.2 seconds and acquisition time of 0.124 seconds with GARP decoupling during acquisition. The acquired data were processed with sine bell weighting and zero filled to 8196×8196 points in F2 and F1 dimensions before final transformation to produce the 2D correlation data.

Figure 13:
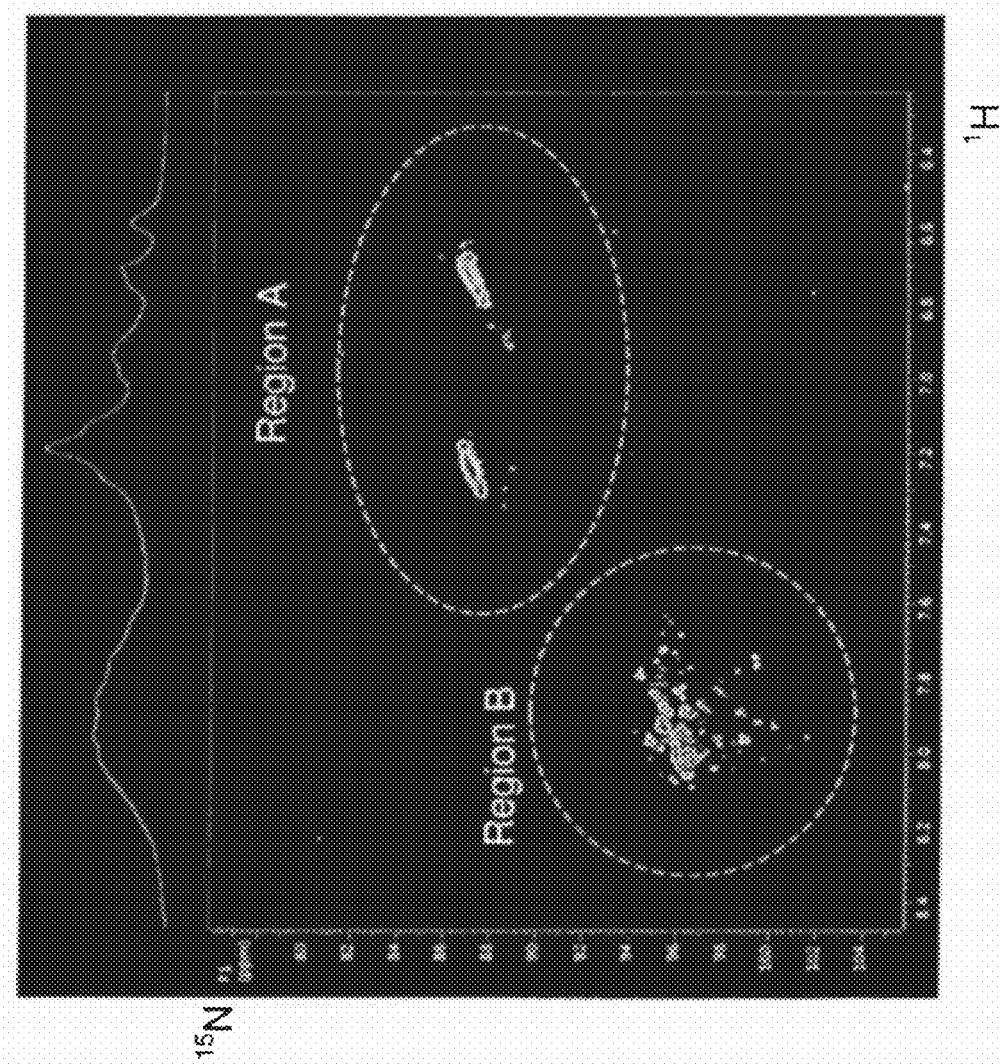
FIG. 13 is a two-dimensional HSQC $^1$H-$^{15}$N NMR spectrum for digested castor (lot 5-83) in d6-DMSO, showing two regions of interest denoted Region A and Region B.
Figure 14:
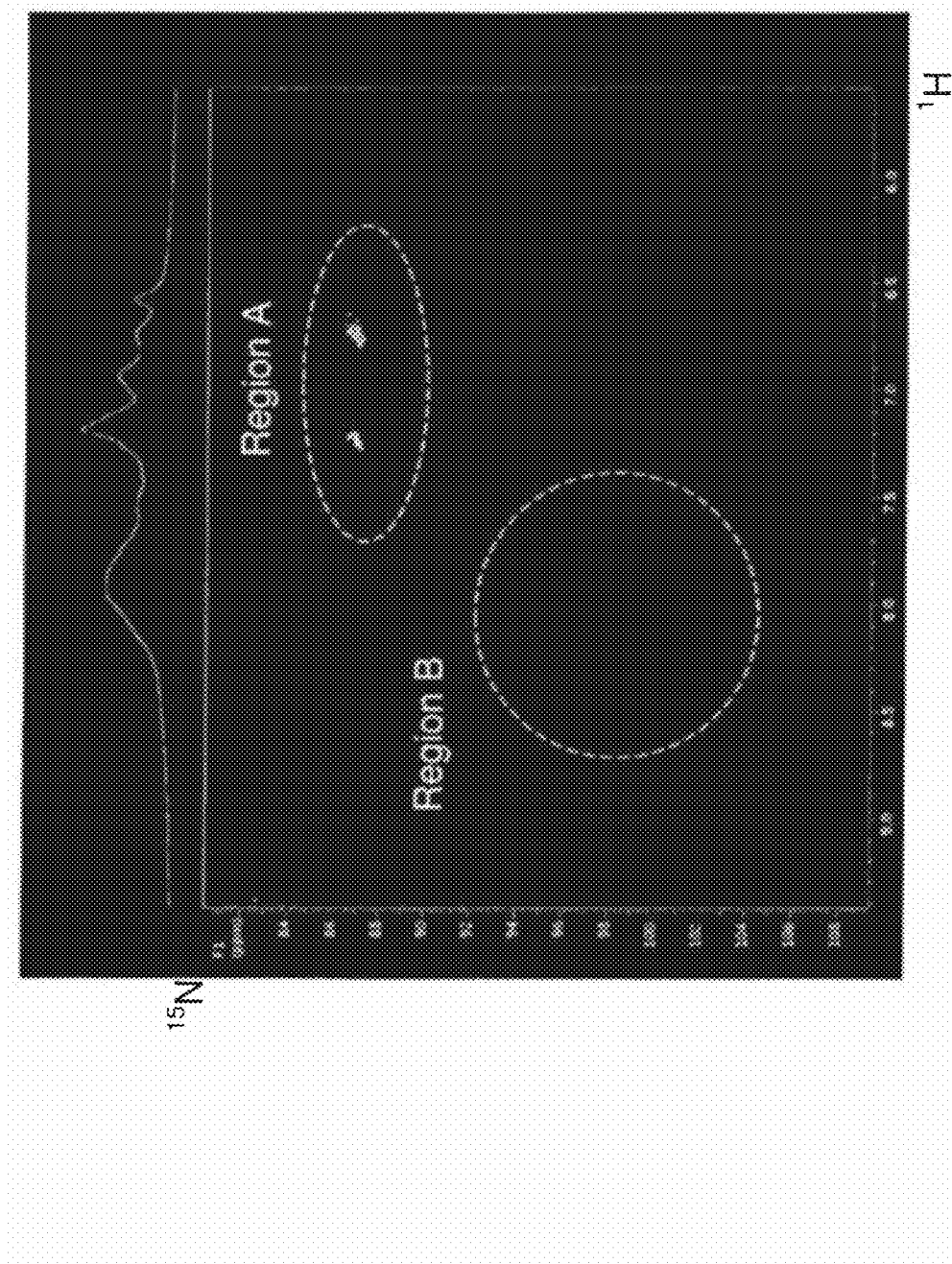
FIG. 14 is a two-dimensional HSQC $^1$H-$^{15}$N NMR spectrum for water-insoluble/water-dispersible polypeptide fraction derived from digested castor (lot 5-83) in d6-DMSO, again showing Region A and Region B.
Figure 15:
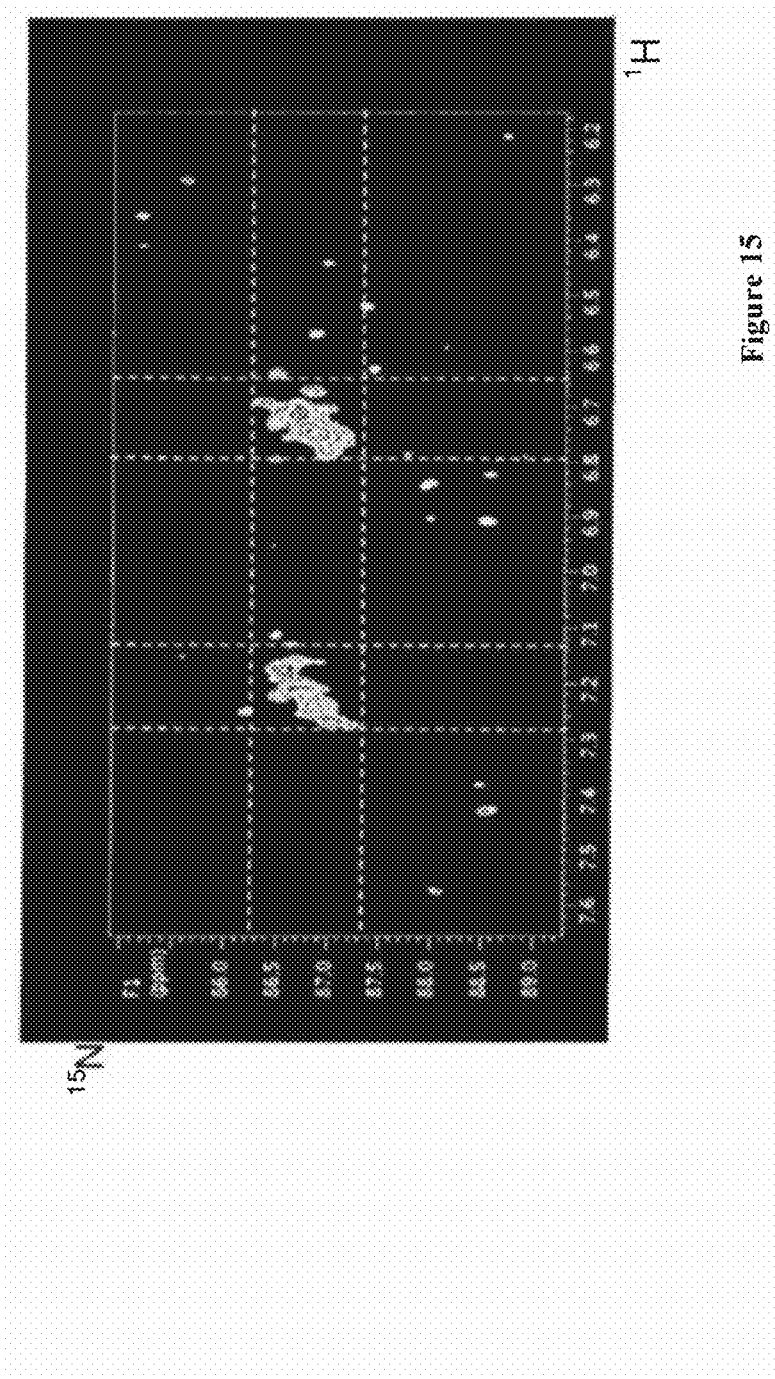
FIG. 15 is a two-dimensional HSQC $^1$H-$^{15}$N NMR spectrum, where Region A from FIG. 14 has been magnified.

The results are presented in FIGS. 13-15. FIG. 13 represents the two-dimensional HSQC $^1$H-$^{15}$N NMR spectrum for digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from all of the fractions that were present within the as-made digested castor (i.e., the water-insoluble/water-dispersible polypeptide fractions plus the water-soluble polypeptide fractions). The multiple peaks in region B were observed to disappear upon removal of the water-soluble fractions (see FIG. 14).

This indicates that these protonated nitrogens are specific to the water-soluble polypeptide fractions, whereas at least a portion of the peaks in region A are specific to the water-insoluble/water-dispersible fraction.

FIG. 14 represents the two-dimensional HSQC $^1$H-$^{15}$N NMR spectrum for the water-insoluble/water-dispersible polypeptide extract from digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from the water-insoluble/water-dispersible polypeptide fraction. The peaks within Region B were observed to be very weak in comparison to the analogous peaks within the digested castor before extraction (see FIG. 13). Conversely, the remaining peaks were predominantly from the protonated nitrogens in Region A. This indicates that these particular protonated nitrogens are specific to the water-insoluble polypeptide fractions. A magnified view of this region is presented in FIG. 15.

As shown in FIG. 14, the peaks within the spectrum represent protonated nitrogen atoms that are specific to the water-insoluble/water-dispersible polypeptide fraction. Upon expansion, the two "peaks" appear as narrow clusters that can be readily defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

The results of these studies revealed that while the water-soluble polypeptide fraction was composed of multiple types of protonated nitrogen atoms (see FIG. 13), the water-insoluble/water-dispersible fraction contained significantly fewer types of protonated nitrogens, and was predominantly characterized by the presence of two major proton-nitrogen cross peak clusters (see FIG. 14). These differences, like those as seen by solid state FTIR, illustrate that the chemical bonding environments within the water-soluble polypeptide fraction are distinctly different from those that exist within the water-insoluble/water-dispersible fraction.

Together, the solid state FTIR and NMR data characterize the water-insoluble/water-dispersible polypeptide fraction, where there is a solid-state infrared amide-I absorption band between 1620-1632 cm$^{-1}$; a solid-state infrared amide-II absorption band between 1514-1521 cm$^{-1}$; and a solution-state pair of protonated nitrogen clusters as determined by a $^1$H-$^{15}$N nuclear magnetic resonance correlation technique. More specifically, when the pair of protonated nitrogen clusters is observed by means of NMR with deuterated d6-DMSO as the solvent using a two-dimensional HSQC $^1$H-$^{15}$N NMR technique, the clusters are defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

Together, the solid state FTIR and NMR data also characterize the water-soluble polypeptide fraction, where there is a solid-state infrared amide-I absorption band between about 1633-1680 cm$^{-1}$; a solid-state infrared amide-II absorption band between 1522-1560 cm$^{-1}$; two prominent 1° amide N—H stretch absorption bands centered at about 3200 cm, and at about 3300 cm$^{-1}$, as determined by solid state FTIR, and a prominent cluster of protonated nitrogen nuclei defined by $^{15}$N chemical shift boundaries at about 94 ppm and at about 100 ppm, and $^1$H chemical shift boundaries at about 7.6 ppm and at about 8.1 ppm, as determined by solution state, two-dimensional proton-nitrogen coupled NMR.

Example 4

Oil Dispersion Characteristics of Water-Soluble and Water-Insoluble/Water-Dispersible Protein Fractions.

A water-insoluble/water-dispersible polypeptide fraction and a water-soluble polypeptide fraction were isolated from digested castor (lot 5-108) based on procedures described in Example 1 (Procedure A). The digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 10 g per kg of castor meal protein, and the mixture is stirred at the same temperature for about 4 hours. Finally, the resulting mixture is brought to a pH 3.5 with citric acid and spray-dried to provide a powder.

The MALDI fragmentation molecular weight characteristics of the isolated fractions are provided in Example 2. The solid state FTIR spectroscopic absorption characteristics for the isolated water-insoluble/water-dispersible polypeptide fraction conform with those as described in FIGS. 2-4, 7, and 9-12 (amide-I absorption range: 1620-1632 cm$^{-1}$; amide-II absorption range: 1514-1521 cm$^{-1}$). Solution state two-dimensional proton-nitrogen coupled NMR on the isolated water-insoluble/water-dispersible polypeptide fraction show two protonated nitrogen clusters enveloped by $^{15}$N chemical shift boundaries at approximately 86.2 ppm and 87.3 ppm; and with $^1$H chemical shift boundaries at approximately 7.14 and 7.29 ppm for the first cluster; and at approximately 6.66 and 6.81 ppm for the second cluster. Solution state two-dimensional proton-nitrogen coupled NMR on the isolated water-soluble polypeptide fraction show a cluster of protonated nitrogen nuclei defined by $^{15}$N chemical shift boundaries at about 94 ppm and at about 100 ppm, and $^1$H chemical shift boundaries at about 7.6 ppm and at about 8.1 ppm.

The water-insoluble/water-dispersible polypeptide fractions with these spectral characteristics (unlike their water-soluble counterparts) exhibit the unique ability to emulsify and stabilize dispersions of oil in water and water in oil. This unique oil-dispersing capability is observed with water-insoluble/water-dispersible polypeptide compositions that are extracted and isolated from multiple sources, including but not limited to (1) whole meals or protein-isolates from either soy, canola, or castor that are extracted of their water-soluble polypeptide components at or near pH-neutral conditions; (2) whole meals or protein-isolates from soy, canola or castor that are subjected to base catalyzed hydrolysis followed by acid addition and subsequent extraction of water-soluble polypeptide components; (3) whole meals or protein-isolates from soy, canola or castor that are subjected to acid catalyzed hydrolysis followed by base addition and subsequent extraction of their water-soluble polypeptide components; (4) whole meals or protein-isolates from soy, castor, or canola that are subjected to combinations of base catalyzed hydrolysis with enzyme digestion followed by acid addition and subsequent extraction of water-soluble polypeptide components.

It is understood that the stabilization of an oil-in-water or water-in-oil emulsion/dispersion depends on several factors, including but not limited to the presence or absence of a stabilizing entity such as a surfactant or a dispersant; the nature of the oil (i.e., its polarity, hydrophilicity, hydrophobicity, solubility parameter, etc.); the nature of the surfactant or dispersant (i.e., HLB value, charge characteristics, molecular weight, water solubility, oil solubility, etc.); the ionic strength of the water-phase; the presence or absence of additives and impurities in either the oil or water phases; the concentration of the oil (i.e., its weight percent in water); and the concentration of the stabilizing entity. It is further understood that the efficiency of a stabilizing entity (a "stabilizing entity" being a dispersant, an emulsifier, a surfactant, or the water-insoluble/water-dispersible polypeptide composition of the present invention) is often judged according to its ability stabilize an emulsion for some specified period of time (i.e., to prevent the macroscopic phase separation of immiscible oil and water components under shear or under static conditions).

In order to further demonstrate the generality of this finding, several oil-in-water dispersions were prepared with a water-insoluble/water-dispersible polypeptide composition that was isolated from a digested castor protein. The water-insoluble/water-dispersible polypeptide fraction was isolated as a paste-like dispersion in water. The paste was diluted with water to 16% solids, and separately to 14% solids. In the next step, 3-gram aliquots of each paste were separately weighed into 15 mL plastic beakers. Next, aliquots of the oils shown in Table 3 were separately added to individual paste aliquots at a ratio of 1 part oil to 1 part solid water-insoluble/water-dispersible polypeptide composition on a weight basis (20 mixtures in total). The mixtures were stirred by hand with a spatula, and were observed to form homogenous creams. The creams remained homogeneous with no visible signs of macroscopic phase separation for prolonged periods of time after mixing including periods ranging from 1 minute after mixing, 5 minutes after mixing, 10 minutes after mixing, 15 minutes after mixing, 30 minutes after mixing, 1 hour after mixing, and 2 hours after mixing. By contrast, the analogous water-soluble extract from the digested castor was incapable of stabilizing dispersions of the oils in water.

TABLE 3

| Oil Type | Source |
| --- | --- |
| PMDI | Rubinate-M from Huntsman Corporation |
| Mineral oil | Drakeol 35 from Penreco |
| Soybean oil | RBD from ADM Processing Co. |
| Motor oil | Castrol Syntec, 5W-50 |
| Castor oil | Pale Pressed Castor Oil from Alnor Oil Company, Inc. |
| Dibutyl Phthalate | 99% from Acros |
| Epoxidized soybean oil | From Aldrich |
| Caprylic triglyceride | Neobee M-5 from Stepan Co. |
| *Eucalyptus* oil | From Aromas Unlimited |
| Tributyl o-acetylcitrate | 98% from Aldrich |

Protein compositions not enriched for the water-insoluble/water-dispersible fractions are unable to disperse oils. For example, a 16% solids dispersion of soy protein isolate, Lot 5-81, (Soy protein isolate SOLPRO 958® Solbar Industries Ltd, POB 2230, Ashdod 77121, Israel; protein content approximately 90%) was prepared by adding 32 grams of soy protein isolate to 168 grams of water at a pH of approximately 4 to 6 (JM-570-1). Seven 10 gram aliquots of JM-570-1 were weighed into 20 mL disposable beakers. A 10 gram aliquot contained 1.6 grams of soy protein isolate and 8.4 grams of water. Seven different oils (namely, PMDI, mineral oil, soybean oil, motor oil, castor oil, dibutyl phthalate and epoxidized soybean oil) were added separately at a w/w ratio of 1 part oil to 1 part protein solids (1.6 grams oil was added to each 10 gram aliquot). The mixtures were stirred by hand with a spatula. None of the oils was observed to be dispersible in the 16% solids dispersion of the soy protein isolate.

Example 5

Physical Characterization by Gravimetric Analysis, FTIR Spectroscopy, and Oil-Dispersing Capacity of Ground Canola Meal, Water-Insoluble/Water-Dispersible Protein Fraction Extracted from Ground Canola Meal, and Water-Soluble Protein Fraction Extracted from Ground Canola Meal Ground canola meal, a water-insoluble/water-dispersible protein fraction that was extracted from ground canola meal, and a water-soluble protein fraction that was extracted from ground canola meal were subjected to physical characterization by gravimetric analysis, FTIR Spectroscopy, and ability to disperse oil. Experimental procedures and results are provided below.

General Experimental Procedure:

Water-insoluble/water-dispersible protein fraction and water-soluble protein fraction were isolated from ground canola meal using the isolation method described in Procedure F of Example 1. FTIR spectra were obtained using solid state FTIR procedures outlined in Part-III of Example 1. Ability of the ground plant meal and ability of the individual protein fractions (or a mixture of individual protein fractions) to disperse PMDI in water was tested using procedures described in Part-II of Example 1.

Gravimetric Solids Analysis:

After washing and supernatant decanting (3 cycles per the protocol in Procedure F of Example 1), the resulting slurry of water-insoluble/water-dispersible components (ca. 35% oven dried solids by weight) was gravimetrically adjusted to achieve a dispersion containing approximately 26% by weight solids (by adding water as necessary). The overall yield of water-insoluble/water-dispersible components was determined to be approximately 55% by weight of the starting meal weight. Thus, the ground canola meal contained (i) approximately 55% by weight of a water-insoluble/water-dispersible protein fraction, and (ii) approximately 45% by weight of a water-soluble fraction.

FTIR Spectroscopic Analysis:

To further characterize extracts from the ground canola meal, solid state surface ATR FTIR experiments were performed on the water-insoluble/water-dispersible protein fraction (this sample was collected after the third wash cycle and was allowed to dry at 23° C.), and on the water-soluble protein fraction (this sample was collected from the clear supernatant after the third wash cycle, and was allowed to dry at 23° C. to yield a transparent amber solid).

Figure 18:
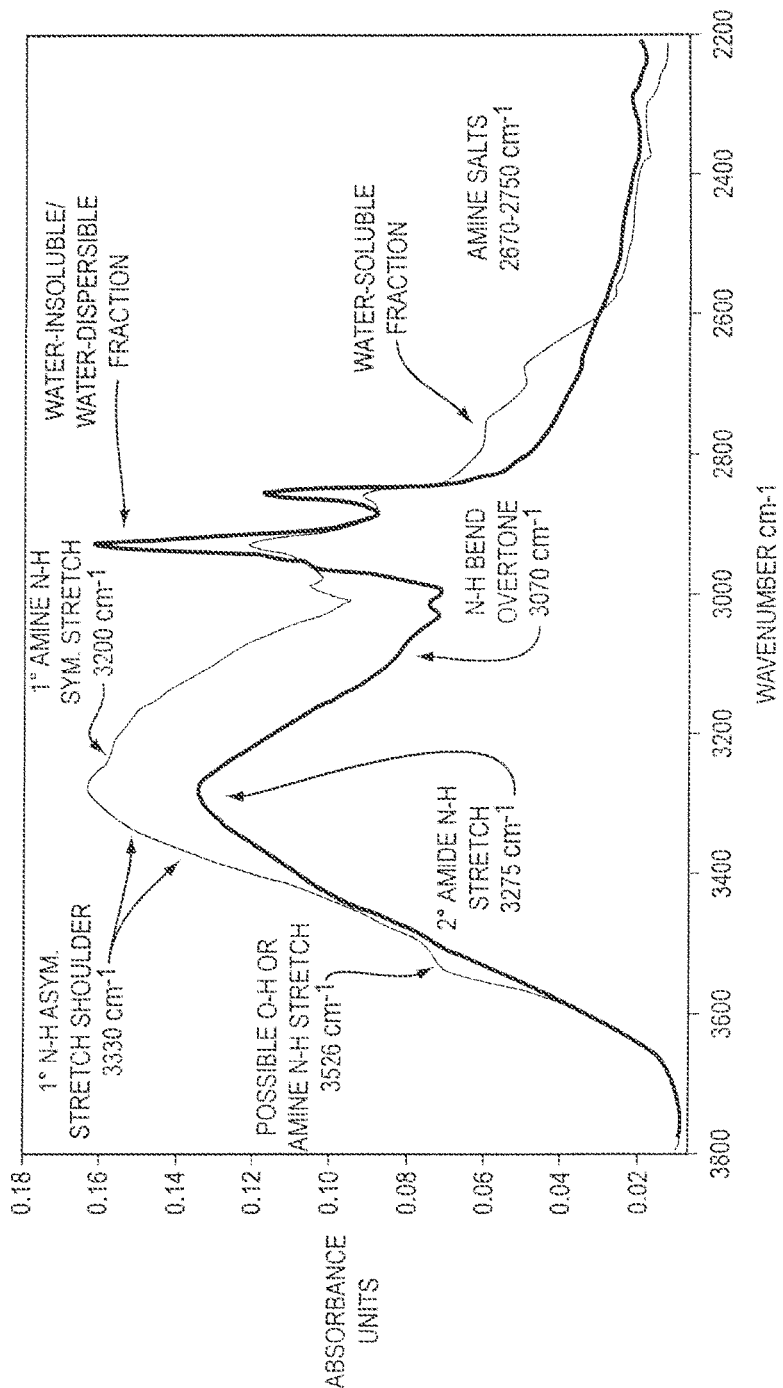
FIG. 18 shows overlaid solid state FTIR spectra of isolated water-soluble and water-insoluble/water-dispersible protein fractions obtained from ground canola meal, where the N—H and O—H stretch regions are expanded, as described further in Example 5.

FIG. 18 shows the solid state FTIR spectra for the water-insoluble/water-dispersible protein fraction isolated from canola meal together with the water-soluble protein fraction where the N—H stretching region has been expanded. This figure shows that the predominant type of amide in the water-insoluble/water-dispersible protein fraction is the secondary main-chain amide as evidenced by the single, highly symmetric N—H stretch band centered near 3275 cm$^{-1}$. Although the water-soluble protein fraction also contains this type of amide, it contains a significantly higher amount of amine salts (as evidenced by absorption over the region spanning from approximately 2670-2750 cm$^{-1}$) and primary amides as evidenced by the presence of the two primary N—H stretching bands at approximately 3200 cm$^{-1}$ (symmetric) and at approximately 3330 cm$^{-1}$ (asymmetric), respectively. The spectra also reveal that both fractions contain the characteristic spectroscopic signatures of proteins, even though both fractions were isolated from raw meal (raw meal contains other residual water-soluble and water-insoluble components such as grain hulls, carbohydrates, sugars, and oils).

Figure 19:
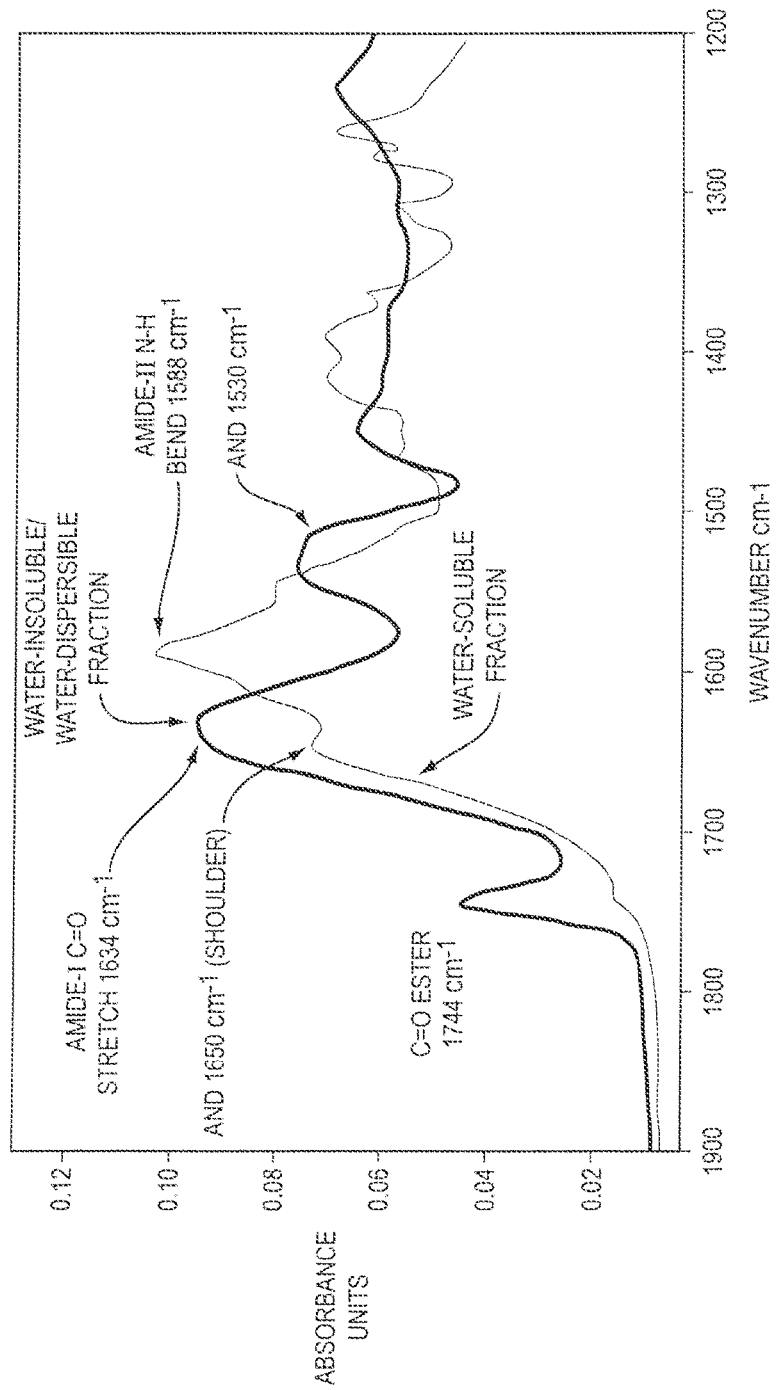
FIG. 19 shows overlaid solid state FTIR spectra of isolated water-soluble and water-insoluble/water-dispersible protein fractions obtained from ground canola meal, where the carbonyl amide region is expanded and the spectra were vertically scaled to achieve equivalent absorbance intensities for the amide-I carbonyl stretch, as described further in Example 5.

Further, as shown in FIG. 19, the amide-I carbonyl absorption band for the water-insoluble/water-dispersible protein fraction was observed to appear as a predominant component at a wavenumber of approximately 1634 cm$^{-1}$, whereas that of the water-soluble protein fraction was observed to appear as a lower-intensity shoulder at approximately 1650 cm$^{-1}$. As discussed elsewhere, this feature distinguishes the water-insoluble/water-dispersible protein fraction from the water-soluble protein fraction, not only for isolated protein fractions from castor proteins and soy proteins, but for protein-containing fractions that are isolated directly from plant meals like soy meal and canola meal. Moreover, the amide-II band for the water-insoluble/water-dispersible protein fraction was observed to appear as a broad band centered at approximately 1530 cm$^{-1}$, whereas that of the water-soluble protein fraction was observed to appear at approximately 1588 cm$^{-1}$ together with a weak shoulder at approximately 1550 cm$^{-1}$.

Analysis of the Capacity of Ground Plant Meal and Isolated Protein Fractions to Disperse Oil:

A dispersion of 26% (w/w) ground whole canola meal in water was mixed with PMDI at a 1:1 w/w ratio of PMDI to canola meal solids. The canola meal contained (i) approximately 55% by weight water-insoluble/water-dispersible protein fraction and (ii) approximately 45% by weight water-soluble protein fraction. The dispersion of ground whole canola meal formed a stable dispersion, which remained stable during a 1 hour period of observation with no visual signs of phase separation.

An aliquot of 26% by weight solids dispersion of water-insoluble/water-dispersible protein fraction (obtained from canola plant meal by washing three times per the protocol described in Procedure F of Example 1) was blended with PMDI at a w/w ratio of 1 part PMDI to 1 part of the water-insoluble/water-dispersible protein fraction (on a w/w PMDI/protein fraction-solids basis). This resulting mixture formed a stable dispersion, which remained stable during a 1 hour period of observation with no visible signs of phase separation.

The water-soluble protein fraction (obtained by extracting the canola meal and drying the supernatant after centrifuging) was dissolved in water to yield a 26% (w/w) solids solution. When PMDI was added to this solution (at a 1:1 weight ratio of PMDI to water-soluble protein fraction solid material), the resulting mixture was unstable, and it phase separated immediately after mixing.

The results above illustrate that water-emulsified PMDI-containing adhesive compositions can be prepared using water-insoluble/water-dispersible protein fraction obtained from ground plant meal. In addition, the results above illustrate that water-emulsified PMDI-containing adhesive can be prepared using ground plant meal compositions (that contain a sufficient amount of water-insoluble/water-dispersible protein fraction; it is understood that the ground plant meal composition also comprises some water-soluble protein fraction). Although the water-soluble protein fraction did not facilitate dispersion by itself in these experiments, the dispersion of PMDI (and other oils) is understood to be achievable so long as a sufficient amount of water-insoluble/water-dispersible protein fraction is present in the adhesive composition (or the ground plant meal used in the adhesive composition).

To further illustrate the oil-dispersing ability of mixtures containing a sufficient amount of water-insoluble/water-dispersible protein fraction, the oil-dispersing characteristics of a meal containing a large amount of water-insoluble/water-dispersible protein fraction was compared to the oil-dispersing characteristics of a commercially available soy-flour product containing a relatively small amount of water-insoluble/water-dispersible protein fraction. The commercially available soy-flour product used was Prolia PDI-90, which is a de-fatted soy flour obtained from Cargill).

As is understood, various commercially available derivatives from plant meals are themselves solvent-extracted (e.g., soy flour), which results in the removal of a substantial amount of the water-insoluble/water-dispersible protein fraction. Such compositions have not been found to facilitate dispersion of oil, and, thus, are less desirable for use in making an adhesive. For example, when PMDI was added to a 26% by weight solids dispersion of soy flour in water at a 1/1 (w/w) of soy flour/PMDI, the PMDI was observed to immediately phase separate from the mixture. By contrast, soy meal was used under similar conditions in Example 1 produced a stable dispersion.

Figure 20:
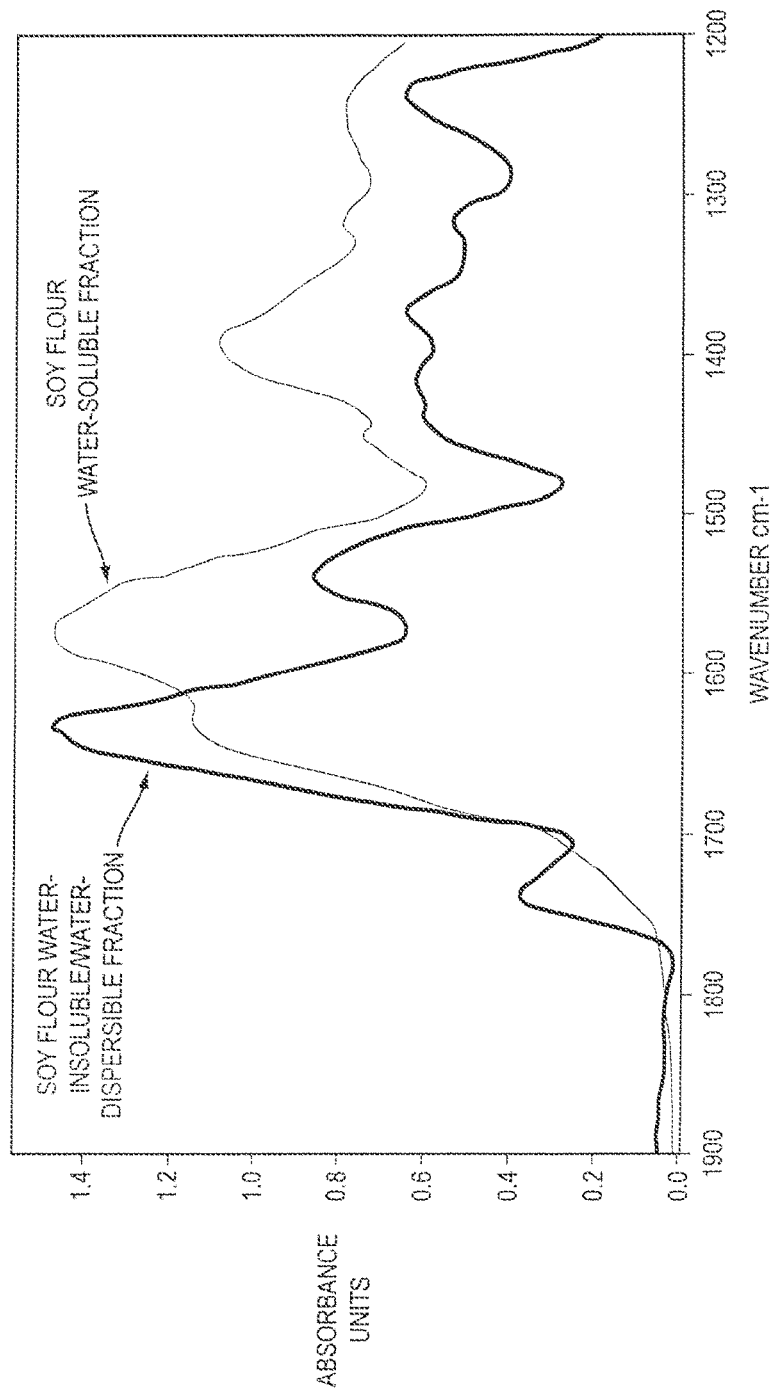
FIG. 20 shows overlaid solid state FTIR spectra of isolated water-soluble and water-insoluble/water-dispersible protein fractions obtained from soy flour, as described further in Example 5.

When soy flour was extracted using procedures discussed herein, the isolated water-insoluble/water-dispersible protein fraction was capable of dispersing PMDI in water. However, this fraction was gravimetrically determined to comprise only approximately 10% by weight of the starting soy flour mixture. Thus, the component needed for oil dispersion was present in the starting soy flour, but its effective concentration was too low for the soy flour disperse PMDI in water. FTIR spectra for the isolated water-insoluble/water-dispersible protein fraction and water-soluble protein fraction extracted from soy flour are provided in FIG. 20.

Figure 21:
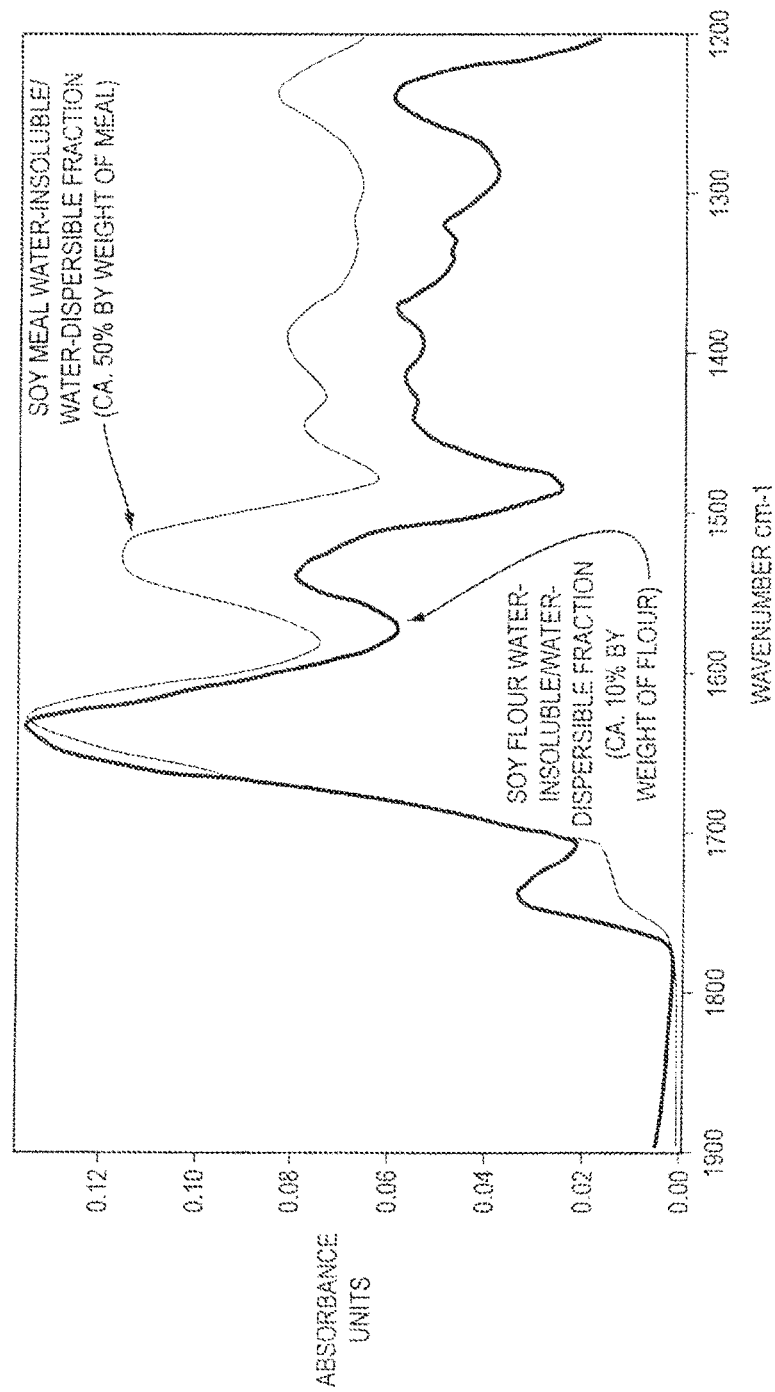
FIG. 21 shows overlaid solid state FTIR spectra of isolated water-insoluble/water-dispersible protein fractions obtained from soy meal and soy flour, as described further in Example 5.

In contrast to soy flour, the water-insoluble/water-dispersible protein fraction is a major component in soy meal (at a level of approximately 50% by weight), thus rendering the soy meal an effective dispersing agent for PMDI in water. Upon isolation, the water-insoluble/water-dispersible protein fraction extracted from both soy meal and soy flour (both of which were able to facilitate the dispersion of PMDI in water) were observed to contain similar spectral features as measured by FTIR. Solid state FTIR of the water-insoluble/water-dispersible protein fraction obtained from soy flour and soy meal are provided in FIG. 21.

Example 6

Preparation of Films & a Pressure-Sensitive Adhesive Made From Combinations of Water-Soluble Protein Fraction, Poly(vinylmethyl ether-co-maleic anhydride) and Optionally Glycerin Films and a pressure-sensitive adhesive were made from combinations of water-soluble protein fraction, poly(vinylmethyl ether-co-maleic anhydride), and optionally glycerin.

In particular, water-soluble protein fraction from canola meal was reacted with poly(vinylmethyl ether-co-maleic anhydride) (PMEMA) under basic conditions at a 1/1 w/w ratio to yield a gelled network polymer, and separately at a 3/1 w/w ratio to yield a pourable water-based dispersion, both of which were demonstrated to form rigid, water-swellable coatings and pressure-sensitive adhesives when plasticized with glycerin. The experimental procedures and results are described below.

Part I: Experimental Procedures

Ground canola meal (20-70 µm) was obtained from Columbia Innovations (a division of Columbia Forest Products, Inc.); NaOH pellets and glycerin were obtained from Sigma-Aldrich; and PMEMA was obtained from ISP (Ashland, Inc.) under the trade name Gantrez™ AN-169. Gantrez™ AN-169 is the tradename for poly(methyl vinyl ether-co-maleic anhydride) having CAS Reg. No. 9011-16-9 and characterized by a viscosity of 85 centipoise at 25° C., a nominal molecular weight of $1.98 \times 10^6$ g/mol, a Tg of 154° C., and a specific gravity of 1.017 at a temperature in the range of 22-25° C.

The ground canola meal was fractionated to yield a water-soluble protein fraction (WS fraction) based on procedures described International Patent Application Publication No. WO 2010/102284 and U.S. Patent Application Publication Nos. 2010/0310877 and 2011/0311833. The meal was dispersed in distilled water at a concentration of 15% w/w to yield a mildly acidic dispersion (pH=5-6), and the resulting slurry was centrifuged at 3,400 rpm for a period of approximately 35 minutes. The supernatant (WS-1), which contained the mildly acidic water-soluble protein fraction (a cloudy yellowish emulsion; 4.23% solids by weight; pH ca. 5), was decanted from the remaining water-insoluble sediment for later use. Under these conditions, polypeptide chain ends and side chain residues (e.g., primary amines, carboxylic acids, lysine residues, and other residues specific to canola protein isolates) tend to be protonated. See, for example, International Patent Application Publication No. WO 2010/102284 and *Canola Meal Feed Industry Guide;* Newkirk, R., Ed.; Canadian International Grains Institute, Canola Council of Canada: Winnipeg, 2009, 4$^{th}$ Edition, 2009, p. 10. An aliquot of the WS-1 emulsion was clarified by adding an aqueous 3.65 Molal NaOH solution to an endpoint concentration of 0.18 Molal (pH ca. 12-13) to yield a yellow solution (WS-2) containing 4% solids by weight.

In a separate step, PMEMA was dissolved in distilled water to yield a clear 4.06% (w/w) aqueous solution of the partially hydrolyzed form of the copolymer (PMEMA-mixed acid/anhydride; pH=5-6). An aliquot of this solution was then partially neutralized to yield the PMEMA-Na salt by adding aqueous 3.65 Molal NaOH to an endpoint concentration of 0.18 Molal. Water-based dispersions containing the water-soluble protein and the PMEMA copolymer (Table 1) were prepared as follows: 1) the WS-1 protein emulsion was extracted as noted above; 2) the WS-1 emulsion was optionally mixed with aqueous NaOH to form a solution; and 3) the protein emulsion, or optionally the protein solution (with NaOH) was mixed with either neat PMEMA (solid powder) or with the PMEMA-mixed acid/anhydride solution. A plasticized composition was also prepared by adding glycerin to the dispersion (Sample E=Sample D+250 phr glycerin).

The starting components and reaction products were dried on glass slides for a period of 1-hour at 100° C. for subsequent solid state FTIR analyses.

TABLE 1

REACTION CONDITIONS AND COMPOSITIONS OF DISPERSIONS

| Sample Id. | Ratio of Water-Soluble Protein Fraction/PMEMA (w/w) | Concentration of NaOH (Molal) | pH | Percent Total Non-volatile Components in Water (w/w) |
|---|---|---|---|---|
| A | 1/1 | 0 | 5-6 | 8.36 |
| B | 1/1 | 0.5 | 9-10 | 8.73 |
| C | 3/1 | 0 | 5-6 | 4.18 |
| D | 3/1 | 0.14 | 7-8 | 4.65 |
| E | 3/1 | 0.14 | 7-8 | 13.57 |

Solid state spectra were acquired by using a Bruker Alpha FTIR spectrometer equipped with a diamond ATR cell (by signal averaging 24 scans at 4 cm$^{-1}$ resolution using an ambient atmosphere background spectrum as the reference). Composite overlay spectra of the carbonyl amide and N—H bending regions (ca. 1900-1000 cm$^{-1}$) were generated for comparative analyses, and vertical baseline shifting was applied as necessary. Subtraction spectra were generated to test for the presence of new absorption bands in the 1/1 WS/PMEMA-mixed acid/anhydride product (Sample A), and in the 1/1 WS/PMEMA-Na salt product (Sample B). The spectra were generated by subtracting the absorbance spectrum of WS-2 from that of the 1/1 WS/PMEMA-Na spectrum, and by subtracting the absorbance spectrum of WS-1 from that of the 1/1 WS/PMEMA-mixed acid/anhydride spectrum (using factors of 0.41 and 0.5 respectively, which were sufficient to remove the spectral contribution of the starting protein as indicated by the disappearance of protein-specific bands at 1012 cm$^{-1}$ and 1654 cm$^{-1}$).

Spectral band assignments for the PMEMA-mixed acid/anhydride, the PMEMA-Na salt, the WS proteins, and the subtraction-resolved products were determined from literature references. See, for example, Vandamme, K. et al. *European Journal of Pharmaceutics and Biopharmaceutics* 2011, 79, 392-398; Barth, A. *Progress in Biophysics & Molecular Biology* 2000, 74, 141-173; Lu, Y.; Miller, J. D. *Journal of Colloid and Interface Science* 2002, 256, 41-52; and Colthup, N. B.; Daly, L. H.; Wiberley, S. E. *Introduction to Infrared and Raman Spectroscopy*, 3$^{rd}$ ed.; Academic Press: Boston, 1990.

Part II-Results & Discussion

Primary amines in the water-soluble protein fraction can be reacted with functionalized copolymers (e.g., maleic anhydride copolymers, epoxies, acid copolymers, etc.) to form water-borne solutions and dispersions for use as pressure-sensitive adhesives. The water-soluble protein fraction contains a higher concentration of primary amines than water-insoluble/water-dispersible protein fraction, according to NMR and FTIR studies. See, for example, International Patent Application Publication No. WO 2010/102284 and U.S. Patent Application Publication No. 2011/0311833.

Figure 22:
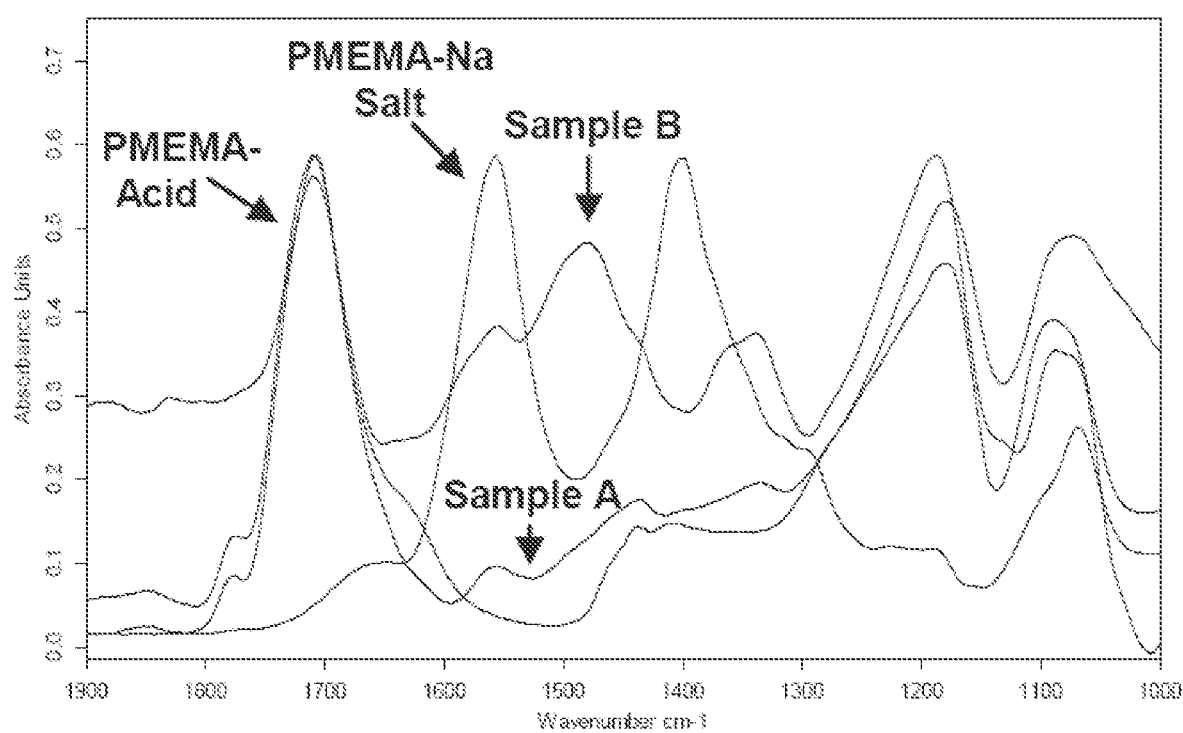
FIG. 22 is a solid state FTIR spectra of PMEMA-mixed acid/anhydride (PMEMA-Acid), overlaid with PMEMA-Na Salt, and the subtraction spectra representing the 1/1 WS/PMEMA-mixed acid/anhydride product (Sample A), and the 1/1 WS/PMEMA-Na salt product (Sample B), as described in Example 6.

FTIR analysis was performed on Samples A and B generated in Part I above to analyze the reaction product. FTIR subtraction spectra (FIG. 22) revealed the presence of two new absorption bands (centered at 1481 cm$^{-1}$ and between 1339-1361cm$^{-1}$) in the 1/1 WS/PMEMA-Na salt reaction product (Sample B) that were not present in the analogous material made under mildly acidic conditions (Sample A). This result indicates that the protein-PMEMA reaction was favored under basic conditions (i.e., under conditions favoring the formation of free, non-protonated amines). Similar findings were reported in studies detailing the use of maleic anhydride as a blocking agent for lysine residues in chymotrypsinogen, where the amine-anhydride reaction was observed to reach 90% conversion at pH =9 and less than 10% conversion at pH <6. See, for example, Butler, P. J. G. et al. in *Biochem. J.* 1969, 112, 679-689.

Evidence for water-soluble-amine deprotonation was obtained by comparing FTIR spectra for the WS-1 and WS-2 fractions (cast from mildly acidic and basic solutions, respectively). The spectra revealed the presence of two dominant absorption bands, one of which was consistent with amide-carbonyl stretching, and the other with amide C—NH vibration (combination C—N stretching and N—H bending). Under basic conditions (i.e., WS-2), the two bands were observed to shift towards higher wavenumbers (i.e., from 1617 cm$^{-1}$ to 1654 cm$^{-1}$, and from 1540 cm$^{-1}$ to 1573 cm$^{-1}$). In addition, a weak carbonyl band that was present in the WS-1 spectrum (shoulder at ca. 1710-1720 cm$^{-1}$) was observed to disappear in the WS-2 spectrum.

The above observations are consistent with the deprotonation of an α-amido acid to yield free amines and carboxylate salts. See, for example, Colthup, N. B. et al. in *Introduction to Infrared and Raman Spectroscopy*, 3$^{rd}$ ed.; Academic Press: Boston, 1990. In turn, the deprotonation of the WS protein chain ends and side-chain residues leads to the availability of primary amines which can participate in solution-phase amine acylation reactions with anhydride-functionalized polymers like PMEMA. See, for example, Schmidt, U. et al. in *J. Appl. Polym. Sci.* 2003, 87, 1255-1266. See, for example, Zhao, M. et al. in *J. Am. Chem. Soc.,* 1999, 121 (5), 923-930.

Upon subtracting the protein spectral contribution from the 1/1 WS/PMEMA-Na salt reaction product, three of the remaining bands were coincident with those of neat PMEMA in the mixed acid/anhydride form (1710 cm$^{-1}$, 1440 cm$^{-1}$, and 1180 cm$^{-1}$), and one was coincident with neat PMEMA in the Na-salt form (1557 cm$^{-1}$). The presence of these bands in combination with the new bands centered at 1481 cm$^{-1}$ and between 1339-1361 cm$^{-1}$ is suggestive of a reaction product (Scheme 1 below) composed of a combination of free acid groups, sodium carboxylate salts, and protein-PMEMA bonds.

SCHEME 1

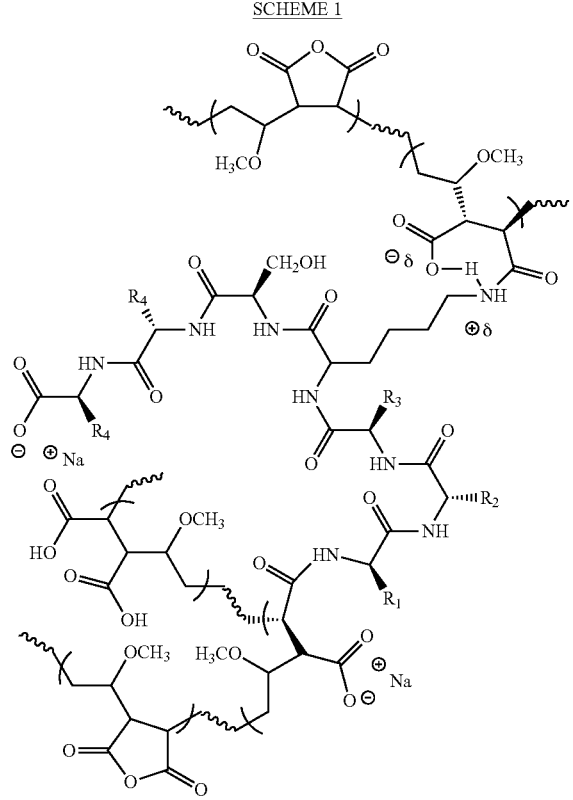

The positions of the new bands are too low in wavenumber to be consistent with the formation of cyclic imides. Instead, they are more likely to be consistent with the N—H bending and C—N stretching vibrations for cis-constrained amide structures. See, for example, Colthup, N. B. et al. in *Introduction to Infrared and Raman Spectroscopy*, 3$^{rd}$ ed.; Academic Press: Boston, 1990. This possibility is plausible given that the reaction between the protein amines (e.g., lysine) with the PMEMA under basic conditions would result in an amide that is directly adjacent to a free carboxylic acid group. Crosslinking reactions are also plausible given that the water-soluble proteins are likely to contain more than one amine equivalent per chain. This is supported by the observation that the 1/1 WS/PMEMA-Na salt formed a stable gel when reacted under basic conditions, and was also insoluble in water after drying (Table 2).

TABLE 2

REACTION PRODUCT QUALITATIVE OBSERVATIONS

| Sample Id. | State of Dispersion in Water | Qualitative Characteristics of Films Dried One Hour at 100° C. |
|---|---|---|
| A & C | Unstable yellow precipitate with settling (pourable) | Rigid, clear heterogeneous/grainy yellow film; swells and disintegrates in water |
| B | Stable, high viscosity yellow gel (not pourable) | Rigid, homogeneous, transparent yellow film; swells in water (not soluble) |
| D | Stable low viscosity dispersion | Rigid, homogeneous, transparent yellow film; swells in water (partially soluble) |
| E | Stable low viscosity dispersion | Transparent, low Tg, tacky film; swells in water (partially soluble) |

Another observation is that the most stable gels and emulsions were those that were formed under basic conditions.

In summary, water-soluble protein fraction isolated from meals like canola can be used in combination with functionalized copolymers (e.g., anhydride copolymers) produce reactive water-based gels and emulsions, which in turn, can be used to create and coatings and adhesives. The examples presented here illustrate how it is possible to utilize protein fractions from a low-cost organic meal to produce useful materials and products for the chemical industry.

Example 7

Preparation of Adhesives Containing Water-Soluble Protein Fraction Optionally With Plasticizer and/or Anhydride Compound Adhesives containing water-soluble protein fraction were prepared and characterized. The adhesives optionally contained a plasticizer and/or anhydride compound. Experimental procedures and results are described below.

Part I—Preparation of Water-Soluble Protein Fraction from Canola Meal

Multiple samples of water-soluble protein fraction were isolated from canola meal following the procedures described in Table 1 below. Distilled water used in the experiments had a pH of approximately 5-6. Physical characterization data for the samples of water-soluble protein fraction are described in Table 2 below.

TABLE 1

ISOLATION OF WATER-SOLUBLE PROTEIN FRACTION

| Sample No. | Experimental Procedure |
| --- | --- |
| JM-1003 | 525 grams of distilled water was weighed into a one quart, lined paint can. The can was placed into a heating mantle, manufactured by Glas-Col Apparatus Company, Terre Haute, IN. The heating mantle was combined with a Stir-Pak Laboratory Stirrer obtained from Cole Parmer Corporation. 225 grams of ground Cargill canola meal was added slowly to the water while stirring resulting in a 30% solids dispersion of canola meal in water. After the addition of the canola meal the temperature was increased and maintained in the temperature range 40° C. to 50° C. for 1.5 hours. The sample was taken out of the heating mantle, capped and allowed to cool on the bench top overnight. 500 grams of the cooled canola dispersion was diluted with 500 grams of distilled water to reduce the solids content to 15%. This was done to reduce viscosity and to facilitate centrifugation of the dispersion to separate out the solids. The 15% solids dispersion was centrifuged, 6 samples at a time, using 15 ml conical centrifuge tubes and a Cole Parmer centrifuge operating at 3400 rpm for approximately 35 minutes. The supernatant and the solids were collected in separate containers. This process was repeated until all of the dispersion was centrifuged. The percent solids, of the collected supernatant, were measured using oven drying and gravimetric methods and found to be 4.23%. |
| JM-1032-1 | Under ambient laboratory conditions, 331.2 grams of distilled water was added to a 500 ml high-density polyethylene bottle to which 8.8 grams of a 3.65 Molal solution of sodium hydroxide was added to yield 340 grams of a solution (effectively 0.082 Molal) having a pH of 12.88. 60 grams of ground Cargill canola meal was then added to the bottle resulting in a total mass of 400 grams. The pH of the dispersion was measured immediately after mixing and found to be 10.02. The sample was mixed overnight by rolling the bottle on a rolling mixer. The pH was measured after 16 hours of mixing and found to be 9.33. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 5.99%. |
| JM-1032-2 | Under ambient laboratory conditions, 340 grams of a 1.0 Molal calcium hydroxide solution, pH = 12.94, was added to a 500 ml high-density polyethylene bottle. 60 grams of ground Cargill canola meal was then added to the bottle resulting in a total mass of 400 grams. The pH of the dispersion was measured immediately after mixing and found to be 12.81. The sample was mixed overnight by rolling the bottle on a rolling mixer. The pH was measured after 16 hours of mixing and was found to be 12.84. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 5.36%. |
| JM-1032-3 | Under ambient laboratory conditions, 340 grams of distilled water, pH = 5.50, was added to a 500 ml high-density polyethylene bottle. 60 grams of ground Cargill canola meal was then added to the bottle resulting in a total mass of 400 grams. The pH of the dispersion was measured immediately after mixing and found to be 5.85. The sample was mixed overnight by rolling the bottle on a rolling mixer. The pH was measured after 16 hours of mixing and found to 6.01. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 3.78%. |
| JM-1039-1 | Under ambient laboratory conditions, 340 grams of a 0.053 Molal sodium hydroxide solution was added to a 500 ml high-density polyethylene bottle. 60 grams of ground Cargill canola meal was then added to the bottle resulting in a total mass of 400 grams. The pH of the dispersion was measured immediately after mixing and found to be 8.76. The sample was mixed overnight by rolling the bottle on a rolling mixer. The pH was measured after 16 hours of mixing and found to 8.44. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 4.35%. |
| JM-1039-2 | Under ambient laboratory conditions, 340 grams of a 0.032 Molal sodium hydroxide solution was added to a 500 ml high-density polyethylene bottle. 60 grams of ground Cargill canola meal was then added to the bottle resulting in a total mass of 400 grams. The pH of the dispersion was measured immediately after mixing and found to be 7.77. The sample was mixed overnight by rolling the bottle on a rolling mixer. The pH was measured after 16 hours of mixing and found to 7.42. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 4.31%. |
| JM-1042-1 | Under ambient laboratory conditions, 340 grams of a 0.042 Molal calcium hydroxide solution was added to a 500 ml high-density polyethylene bottle. 60 grams of ground Cargill canola meal was then added to the bottle resulting in a total mass of 400 grams. The pH of the dispersion was measured immediately after mixing and found to be 9.7. The sample was mixed overnight by rolling the bottle on a rolling mixer. The pH was measured after 16 hours of mixing and found to 9.01. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 3.88% |

TABLE 1-continued

ISOLATION OF WATER-SOLUBLE PROTEIN FRACTION

| Sample No. | Experimental Procedure |
|---|---|
| JM-1042-2 | Under ambient laboratory conditions, 340 grams of a 0.025 Molal calcium hydroxide solution was added to a 500 ml high-density polyethylene bottle. 60 grams of ground Cargill canola meal was then added to the bottle resulting in a total mass of 400 grams. The pH of the dispersion was measured immediately after mixing and found to be 8.7. The sample was mixed overnight by rolling the bottle on a rolling mixer. The pH was measured after 16 hours of mixing and found to 8.04. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 3.79%. |
| JM-1042-3 | Under ambient laboratory conditions, 340 grams of a 0.013 Molal calcium hydroxide solution was added to a 500 ml high-density polyethylene bottle. 60 grams of ground Cargill canola meal was then added to the bottle resulting in a total mass of 400 grams. The pH of the dispersion was measured immediately after mixing and found to be 7.18. The sample was mixed overnight by rolling the bottle on a rolling mixer. The pH was measured after 16 hours of mixing and found to 6.88. The plastic bottle was put into a Beckman CS-6 Centrifuge and spun at 3150 rpm for 30 minutes. The supernatant and the solids were collected in separate containers. The percent solids, of the collected supernatant, were measured using oven drying and gravimetric methods and found to be 3.75%. |

TABLE 2

WATER-SOLUBLE PROTEIN FRACTION ISOLATED FROM CANOLA MEAL

| Sample No. | Base | Base Concentration (moles/Kg water) | pH of Starting Solution (before adding meal) | pH of Supernatant Extract (after separation from meal) | Percent Solids in Extract (%) | Appearance of Extract |
|---|---|---|---|---|---|---|
| JM1003 | None | 0 | 5 to 6 | 5 to 6 | 4.23 | Yellow emulsion |
| JM1032-1 | NaOH | 0.082 | 12.88 | 9.18 | 5.99 | Amber translucent solution with dispersible sediment |
| JM1032-2 | Ca(OH)$_2$ | 1.0 (partially soluble) | 12.94 | 12.48 | 5.36 | Dark green translucent solution with dispersible sediment |
| JM1032-3 | None | 0 | 5.5 | 5.92 | 3.78 | Amber translucent solution with dispersible sediment |
| JM1039-1 | NaOH | 0.053 | 12.3 | 8.32 | 4.35 | Amber translucent solution with dispersible sediment |
| JM1039-2 | NaOH | 0.032 | 12.3 | 7.35 | 4.31 | Amber translucent solution with dispersible sediment |
| JM1042-1 | Ca(OH)$_2$ | 0.042 | 12.57 | 8.95 | 3.88 | Amber translucent solution with dispersible sediment |
| JM1042-2 | Ca(OH)$_2$ | 0.025 | 12.63 | 8.0 | 3.79 | Amber translucent solution with dispersible sediment |
| JM1042-3 | Ca(OH)$_2$ | 0.013 | 12.6 | 6.87 | 3.75 | Amber translucent solution with dispersible sediment |

Part II: Preparation of Adhesives Containing Water-Soluble Protein-Based Extracts In each of the following experiments, the water-based supernatants from Part I above were shaken thoroughly before use to re-disperse particulates that may have settled during storage. The water-soluble extracts were cast on glass slides and were dried at 100° C. for 1 hour. The resulting films were rigid, and were qualitatively observed to exhibit a high degree of adhesion to the glass slides (the films could not be removed unless they were scraped with a razor blade). Given that the films were not tacky, pressure activated adhesion was not possible at 25° C. For example, when 22 lb. (83 g/m$^2$) white letter paper was pressed against the coated slides, the paper did not stick, and fell off of the coated glass surface. The qualitative characteristics of the films are provided in Table 3.

TABLE 3

QUALITATIVE CHARACTERISTICS OF RIGID (NON-TACKY) ADHESIVES ON GLASS (CONTAINING WATER-SOLUBLE PROTEIN-BASED EXTRACTS FROM CANOLA MEAL)

| Sample No. | Color/clarity | Qualitative Adhesion Strength to Glass | Pressure Activated Adhesion to Paper | Qualitative Properties |
|---|---|---|---|---|
| JM1003 | yellow/transparent | high | none | Rigid, brittle, no tack |
| JM1032-1 | yellow/transparent | high | none | Rigid, brittle, no tack |
| JM1032-2 | yellow/transparent | high | none | Rigid, brittle, no tack |
| JM1032-3 | yellow/transparent | high | none | Rigid, brittle, no tack |
| JM1039-1 | yellow/transparent | high | none | Rigid, brittle, no tack |
| JM1039-2 | yellow/transparent | high | none | Rigid, brittle, no tack |
| JM1042-1 | yellow/transparent | high | none | Rigid, brittle, no tack |
| JM1042-2 | yellow/transparent | high | none | Rigid, brittle, no tack |
| JM1042-3 | yellow/transparent | high | none | Rigid, brittle, no tack |

Part III: Preparation of Protein-Based Adhesives With Plasticizer (Glycerin)

In each of the following experiments, the water-based supernatants from Part I above were shaken thoroughly before use to re-disperse particulates that may have settled during storage. In addition, the formulated adhesives (with glycerin) were also shaken prior to use for the purpose of re-dispersing particulates that may have settled. The water-soluble protein fraction was blended with glycerin for the purpose of plasticizing the materials (i.e., to reduce the glass transition temperature for the purpose of increasing tack). The adhesives were cast on glass slides and were dried at 100° C. for 1 hour to yield transparent yellow films (wet compositions are provided in Table 4, and solid compositions are given in Table 5). The coated glass specimens were pressed together by hand with pre-cut paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests.

The results in Table 6 describe the samples after being subjected to the peel tests. All the adhesives were observed to bond with paper and with glass. However, the adhesives were cohesively weak, and were observed to cohesively fail upon peeling the specimens. Moreover, the qualitative cohesive strength of the adhesives was observed to decrease with increasing levels of glycerin plasticizer. Tackiness of the adhesive was observed to increase with increasing glycerin content.

After the first and second peel tests were complete, the peeled specimens were once again re-adhered for a 3$^{rd}$ time, and were then re-evaluated 5 days later. Several of the specimens that had previously displayed poor paper-to-glass adhesion strength (see Table 6) were observed to become cohesively stronger, and were observed to invoked paper cohesive tear upon delamination (samples TP17-9, TP17-10, TP17-11, TP17-14, TP17-15, and TP-16). Thus, the adhesive materials have strengthened over time.

TABLE 4

WET COMPOSITIONS OF PLASTICIZED PROTEIN-BASED ADHESIVES

| Adhesive Sample No. | Water-Soluble Protein Fraction Sample No. | Counter-ion Type | Percent Water (%) | Percent Protein Meal Extract (%) | Percent Glycerin (%) | Percent Non-volatiles (%) |
|---|---|---|---|---|---|---|
| TP17-1 | JM1032-1 | Na | 82.37 | 5.25 | 12.38 | 17.63 |
| TP17-2 | JM1032-2 | Ca | 83.79 | 4.75 | 11.46 | 16.21 |
| TP17-3 | JM1032-3 | None | 87.69 | 3.45 | 8.86 | 12.31 |
| TP17-4 | JM1039-1 | Na | 85.49 | 3.89 | 10.62 | 14.51 |
| TP17-5 | JM1039-2 | Na | 84.48 | 3.81 | 11.72 | 15.52 |
| TP17-6 | JM1042-1 | Ca | 86.95 | 3.51 | 9.54 | 13.05 |
| TP17-7 | JM1042-2 | Ca | 86.12 | 3.39 | 10.48 | 13.88 |
| TP17-8 | JM1042-3 | Ca | 88.15 | 3.43 | 8.42 | 11.85 |
| TP17-9 | JM1032-1 | Na | 83.09 | 5.29 | 11.61 | 16.91 |
| TP17-10 | JM1032-2 | Ca | 85.59 | 4.85 | 9.56 | 14.41 |
| TP17-11 | JM1032-3 | None | 89.30 | 3.51 | 7.19 | 10.70 |
| TP17-12 | JM1039-1 | Na | 88.21 | 4.01 | 7.78 | 11.79 |
| TP17-13 | JM1039-2 | Na | 88.28 | 3.98 | 7.75 | 11.72 |
| TP17-14 | JM1042-1 | Ca | 88.89 | 3.59 | 7.52 | 11.11 |
| TP17-15 | JM1042-2 | Ca | 88.43 | 3.48 | 8.09 | 11.57 |
| TP17-16 | JM1042-3 | Ca | 89.28 | 3.48 | 7.24 | 10.72 |

TABLE 5

DRY COMPOSITIONS OF PLASTICIZED PROTEIN-BASED ADHESIVES

| Adhesive Sample No. | Water-Soluble Protein Fraction Sample No. | Counter-ion Type | Percent Water-Soluble Protein Fraction (%) | Percent Glycerin (%) | Phr Glycerin (parts per hundred resin) |
|---|---|---|---|---|---|
| TP17-1 | JM1032-1 | Na | 29.77 | 70.23 | 236 |
| TP17-2 | JM1032-2 | Ca | 29.28 | 70.72 | 242 |
| TP17-3 | JM1032-3 | None | 28.00 | 72.00 | 257 |
| TP17-4 | JM1039-1 | Na | 26.80 | 73.20 | 273 |
| TP17-5 | JM1039-2 | Na | 24.51 | 75.49 | 308 |
| TP17-6 | JM1042-1 | Ca | 26.89 | 73.11 | 272 |
| TP17-7 | JM1042-2 | Ca | 24.45 | 75.55 | 309 |
| TP17-8 | JM1042-3 | Ca | 28.98 | 71.02 | 245 |
| TP17-9 | JM1032-1 | Na | 31.31 | 68.69 | 219 |
| TP17-10 | JM1032-2 | Ca | 33.65 | 66.35 | 197 |
| TP17-11 | JM1032-3 | None | 32.78 | 67.22 | 205 |
| TP17-12 | JM1039-1 | Na | 34.03 | 65.97 | 194 |
| TP17-13 | JM1039-2 | Na | 33.92 | 66.08 | 195 |
| TP17-14 | JM1042-1 | Ca | 32.31 | 67.69 | 210 |
| TP17-15 | JM1042-2 | Ca | 30.10 | 69.90 | 232 |
| TP17-16 | JM1042-3 | Ca | 32.46 | 67.54 | 208 |

TABLE 6

QUALITATIVE CHARACTERISTICS OF PLASTICIZED PROTEIN-BASED FILMS, AND QUALITATIVE CHARACTERISTICS OF PAPER-TO-GLASS PEEL SPECIMENS AFTER PEEL TESTING

| Sample No. | Color/Clarity | Glass-to-Adhesive Degree of Delamination | Paper Cohesive Failure | Qualitative Stiffness of Adhesive | Tack of Exposed Adhesive | Re-adhesion After Peel |
|---|---|---|---|---|---|---|
| TP17-1 | Transparent/Yellow | None, adhesive remained adhered to glass & cohesively failed | None, adhesive remained adhered to paper & cohesively failed | Low stiffness | Tacky & weak | Same result as first peel test |
| TP17-2 | Transparent/Yellow | None, adhesive remained adhered to glass & cohesively failed | None, adhesive remained adhered to paper & cohesively failed | Low stiffness | Tacky & weak | Same result as first peel test |
| TP17-3 | Transparent/Yellow | None, adhesive remained adhered to glass & cohesively failed | None, adhesive remained adhered to paper & cohesively failed | Low stiffness | Tacky & weak | Same result as first peel test |
| TP17-4 | Transparent/Yellow | None, adhesive remained adhered to glass & cohesively failed | None, adhesive remained adhered to paper & cohesively failed | Low stiffness | Tacky & weak | Same result as first peel test |
| TP17-5 | Transparent/Yellow | None, adhesive remained adhered to glass & cohesively failed | None, adhesive remained adhered to paper & cohesively failed | Low stiffness | Tacky & weak | Same result as first peel test |
| TP17-6 | Transparent/Yellow | None, adhesive remained adhered to glass & cohesively failed | None, adhesive remained adhered to paper & cohesively failed | Low stiffness | Tacky & weak | Same result as first peel test |
| TP17-7 | Transparent/Yellow | None, adhesive remained adhered to glass & cohesively failed | None, adhesive remained adhered to paper & cohesively failed | Low stiffness | Tacky & weak | Same result as first peel test |
| TP17-8 | Transparent/Yellow | None, adhesive remained adhered to glass & cohesively failed | None, adhesive remained adhered to paper & cohesively failed | Low stiffness | Tacky & weak | Same result as first peel test |
| TP17-9 | Transparent/Yellow | None, adhesive remained adhered to glass & cohesively failed | None, adhesive remained adhered to paper & cohesively failed | Low stiffness | Tacky & weak | Same result as first peel test |

TABLE 6-continued

QUALITATIVE CHARACTERISTICS OF PLASTICIZED PROTEIN-
BASED FILMS, AND QUALITATIVE CHARACTERISTICS OF
PAPER-TO-GLASS PEEL SPECIMENS AFTER PEEL TESTING

| Sample No. | Color/ Clarity | Glass-to-Adhesive Degree of Delamination | Paper Cohesive Failure | Qualitative Stiffness of Adhesive | Tack of Exposed Adhesive | Re-adhesion After Peel |
|---|---|---|---|---|---|---|
| TP17-10 | Transparent/ Yellow | None, adhesive remained adhered to glass & cohesively failed | None, adhesive remained adhered to paper & cohesively failed | Low stiffness, but >TP17-9 | Tacky & weak | Same result as first peel test |
| TP17-11 | Transparent/ Yellow | None, adhesive remained adhered to glass & cohesively failed | None, adhesive remained adhered to paper & cohesively failed | Low stiffness, like TP17-10 | Tacky & weak | Same result as first peel test |
| TP17-12 | Transparent/ Yellow | None, adhesive remained adhered to glass & cohesively failed | None, adhesive remained adhered to paper & cohesively failed | Low stiffness, like TP17-10 | Tacky & weak | Same result as first peel test |
| TP17-13 | Transparent/ Yellow | None, adhesive remained adhered to glass & cohesively failed | None, adhesive remained adhered to paper & cohesively failed | Low stiffness, like TP17-10 | Tacky & weak | Same result as first peel test |
| TP17-14 | Transparent/ Yellow | None, adhesive remained adhered to glass & cohesively failed | None, adhesive remained adhered to paper & cohesively failed | Moderate stiffness (highest of group) | Tacky, but less tacky than TP17-13 | Same result as first peel test |
| TP17-15 | Transparent/ Yellow | None, adhesive remained adhered to glass & cohesively failed | None, adhesive remained adhered to paper & cohesively failed | Moderate stiffness like TP17-15 | Tacky, like TP17-14 | Same result as first peel test |
| TP17-16 | Transparent/ yellow | None, adhesive remained adhered to glass & cohesively failed | None, adhesive remained adhered to paper & cohesively failed | Low stiffness, like TP17-10 | Tacky & weak | Same result as first peel test |

Part IV: Preparation of Water-Soluble Protein Fraction Containing Adhesives With Plasticizer and Anhydride Polymer Due to the relatively low cohesive strengths of the adhesives described in Tables 4 through 6 (Part-III above), a polymer with anhydride functionality was incorporated into the formulas for the purpose of enhancing strength. Given that the water soluble proteins contain primary amines, it follows that the incorporation of an anhydride functionalized polymer could lead to chain extension and crosslinking, which in turn would help to enhance cohesive strength. In order to illustrate this, formulations were prepared with similar compositions to those presented in Tables 4 through 6 (Part-III above), but with one exception: some of the water soluble protein-based extract was replaced with Gantrez™ AN-169 (abbreviated as "GAN"). The overall level of glycerin plasticizer was similar to those that were used in several formulas from Part-III.

In each of the following experiments, the water-based supernatants from Part I above were shaken thoroughly before use to re-disperse particulates that may have settled during storage. Aliquots of the extracts were then mixed with a separate solution of Gantrez AN 169 (4.056% w/w in water) using various proportions in conjunction with glycerin to yield the wet adhesive compositions as described in Table 7. The formulated adhesives (containing the reaction products and glycerin) were shaken prior to use for the purpose of re-dispersing particulates that may have settled. The wet adhesives were cast on glass slides and were dried at 100° C. for 1 hour to yield transparent yellow films (solid compositions are given in Table 8). The coated glass specimens were pressed together by hand with pre-cut paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests.

The results in Table 9 describe the samples after being subjected to the peel tests. All adhesives were observed to bond paper to glass. Importantly, all of the adhesives were also cohesively stronger than their counterparts from Part-III, independent of whether the plasticizer concentration was higher or lower than that which was used in the comparative Part-III samples. These results illustrate the benefit of formulating adhesives with reaction products comprised of functionalized copolymers (i.e., a maleated copolymer in this case) reacted together with the water-based protein fractions. Adhesives of this type exhibit improved cohesive strength characteristics, and allow for the formulation of adhesives with characteristics ranging from reversible (e.g., TP18-2) to non-reversible (e.g., TP19-2).

TABLE 7

WET COMPOSITIONS OF PLASTICIZED PROTEIN-BASED ADHESIVES WITH GAN

| Sample No. | Water-Soluble Protein Fraction Sample No. | Counter-ion Type | Percent Water (%) | Percent Water-Soluble Protein Fraction (%) | Percent Glycerin (%) | Percent GAN Anhydride Polymer (%) | Ratio of Protein/GAN Anhydride (w/w) | Percent non-volatiles (%) |
|---|---|---|---|---|---|---|---|---|
| TP18-1 | JM1032-1 | Na$^+$ | 84.42 | 3.67 | 10.78 | 1.14 | 3.23 | 15.58 |
| TP18-2 | JM1032-2 | Ca$^{2+}$ | 85.50 | 3.48 | 10.00 | 1.01 | 3.44 | 14.50 |
| TP18-3 | JM1032-3 | None | 88.76 | 2.75 | 7.69 | 0.79 | 3.48 | 11.24 |
| TP18-4 | JM1039-1 | Na$^+$ | 86.89 | 2.98 | 9.22 | 0.91 | 3.29 | 13.11 |
| TP18-5 | JM1039-2 | Na$^+$ | 87.05 | 2.97 | 9.09 | 0.89 | 3.33 | 12.95 |
| TP18-6 | JM1042-1 | Ca$^{2+}$ | 88.07 | 2.76 | 8.33 | 0.84 | 3.30 | 11.93 |
| TP18-7 | JM1042-2 | Ca$^{2+}$ | 88.42 | 2.72 | 8.04 | 0.82 | 3.34 | 11.58 |
| TP18-8 | JM1042-3 | Ca$^{2+}$ | 89.28 | 2.71 | 7.18 | 0.83 | 3.26 | 10.72 |
| TP19-1 | JM1042-3 | Ca$^{2+}$ | 89.27 | 2.71 | 7.19 | 0.83 | 3.25 | 10.73 |
| TP19-2 | JM1042-3 | Ca$^{2+}$ | 89.38% | 3.12 | 7.11 | 0.39 | 8.04 | 10.62 |
| TP19-3 (prophetic) | JM1042-3 | Ca$^{2+}$ | 89.35 | 3.05 | 7.13 | 0.47 | 6.52 | 10.65 |
| TP19-4 (prophetic) | JM1042-3 | Ca$^{2+}$ | 89.38 | 3.19 | 7.11 | 0.32 | 10.00 | 10.62 |

TABLE 8

DRY COMPOSITIONS OF PLASTICIZED PROTEIN-BASED ADHESIVES WITH GAN

| Sample No. | Water-Soluble Protein Fraction Sample No. | Counter-ion Type | Percent Protein Meal Extract (%) | Percent Glycerin (%) | Percent GAN Anhydride Polymer | Protein/GAN Anhydride (w/w) | Phr Glycerin (parts per hundred resin) |
|---|---|---|---|---|---|---|---|
| TP18-1 | JM1032-1 | Na$^+$ | 23.53 | 69.17 | 7.29 | 3.23 | 224 |
| TP18-2 | JM1032-2 | Ca$^{2+}$ | 24.03 | 68.98 | 6.99 | 3.44 | 222 |
| TP18-3 | JM1032-3 | None | 24.50 | 68.47 | 7.03 | 3.48 | 217 |
| TP18-4 | JM1039-1 | Na$^+$ | 22.72 | 70.37 | 6.91 | 3.29 | 238 |
| TP18-5 | JM1039-2 | Na$^+$ | 22.93 | 70.18 | 6.89 | 3.33 | 235 |
| TP18-6 | JM1042-1 | Ca$^{2+}$ | 23.12 | 69.87 | 7.00 | 3.30 | 232 |
| TP18-7 | JM1042-2 | Ca$^{2+}$ | 23.52 | 69.44 | 7.04 | 3.34 | 227 |
| TP18-8 | JM1042-3 | Ca$^{2+}$ | 25.29 | 66.95 | 7.76 | 3.26 | 203 |
| TP19-1 | JM1042-3 | Ca$^{2+}$ | 25.23 | 66.99 | 7.78 | 3.25 | 203 |
| TP19-2 | JM1042-3 | Ca$^{2+}$ | 29.41 | 66.93 | 3.66 | 8.04 | 202 |
| TP19-3 (prophetic) | JM1042-3 | Ca$^{2+}$ | 28.65 | 66.96 | 4.39 | 6.52 | 203 |
| TP19-4 (prophetic) | JM1042-3 | Ca$^{2+}$ | 30.04 | 66.96 | 3.01 | 10.00 | 203 |

TABLE 9

QUALITATIVE CHARACTERISTICS OF PLASTICIZED PROTEIN-BASED FILMS WITH GAN, AND QUALITATIVE CHARACTERISTICS OF PAPER-TO-GLASS PEEL SPECIMENS AFTER PEEL TESTING

| Sample No. | Color/Clarity | Glass-to-Adhesive Degree of Delamination | Paper Cohesive Failure | Qualitative Stiffness & Cohesive Properties of Adhesive | Tack of Exposed Adhesive | Re-adhesion After Peel |
|---|---|---|---|---|---|---|
| TP18-1 | Transparent/Yellow | None | Fibers left on surface of adhesive | Higher than comparable formulas TP17-1 and TP17-9 | moderate | Low adhesion due to fiber on surface |
| TP18-2 | Transparent/Yellow | None | None (paper peels cleanly) | Higher than comparable formulas TP17-2 and TP17-10 | Low-to moderate | Easily peels and re-adheres |

TABLE 9-continued

QUALITATIVE CHARACTERISTICS OF PLASTICIZED PROTEIN-BASED
FILMS WITH GAN, AND QUALITATIVE CHARACTERISTICS OF PAPER-
TO-GLASS PEEL SPECIMENS AFTER PEEL TESTING

| Sample No. | Color/ Clarity | Glass-to- Adhesive Degree of Delamination | Paper Cohesive Failure | Qualitative Stiffness & Cohesive Properties of Adhesive | Tack of Exposed Adhesive | Re-adhesion After Peel |
|---|---|---|---|---|---|---|
| TP18-3 | Transparent/ Yellow | None | Extreme paper tear | Higher than comparable formulas TP17-3 and TP17-11 | High tack | Non-reversible |
| TP18-4 | Transparent/ Yellow | None | Fibers left on surface of adhesive | Higher than comparable formulas TP17-4 and TP17-12 | Moderate | Low adhesion due to fiber on surface |
| TP18-5 | Transparent/ Yellow | None | Extreme paper tear | Higher than comparable formulas TP17-5 and TP17-13 | High tack | Non-reversible |
| TP18-6 | Transparent/ Yellow | None | Extreme paper tear | Higher than comparable formulas TP17-6 and TP17-14 | High tack | Non-reversible |
| TP18-7 | Transparent/ Yellow | None | Extreme paper tear | Higher than comparable formulas TP17-7 and TP17-15 | High tack | Non-reversible |
| TP18-8 | Transparent/ Yellow | None | Extreme paper tear | Higher than comparable formulas TP17-8 and TP17-16 | High tack | Non-reversible |
| TP19-1 | Transparent/ Yellow | None | Extreme paper tear | Higher than comparable formulas TP17-8 and TP17-16 | High tack | Non-reversible |
| TP19-2 | Transparent/ Yellow | None | Extreme paper tear | Higher than comparable formulas TP17-8 and TP17-16 | High tack | Non-reversible |

Example 8

Preparation of Pressure-Sensitive Adhesive From Water-Soluble Protein Fraction and Anhydride-Functionalized Copolymer Pressure-sensitive adhesives were prepared that contain an anhydride-functionalized copolymer reacted together with a water-soluble protein fraction obtained from canola meal in the presence of NaOH. The resulting adhesives were plasticized with various levels of glycerin to illustrate the varying degrees of tack and stiffness that are possible. Of course, it is understood that other types monomeric and polymeric plasticizers, as well as other additives, could also be used in conjunction with the protein-based adhesive.

The adhesives in this example were prepared with the water-soluble protein fraction JM1003 (4.23% w/w solids) as described in Example 7. A protein-based solution (12-1) was prepared by adding 0.73 g of a 3 Molal NaOH solution to 15 g of JM1003 (the final pH was approximately 7). A second protein-based solution (12-2) was prepared by adding 0.85 g of a 3 Molal NaOH solution to 15 g of JM1003 (the final pH was approximately 8).

A separate solution of Gantrez AN 169 (4.056% w/w in water; abbreviated as "GAN") was added to aliquots of the 12-1 and 12-2 solutions using various proportions in conjunction with glycerin to yield the wet compositions as described in Table 1. The adhesives were cast on glass slides and were dried at 100° C. for 1 hour to yield transparent yellow films (solid compositions are given in Table 2). The coated glass specimens were pressed together by hand with paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests.

The results in Table 3 describe the samples after being subjected to the peel tests. All of the adhesives were observed to bond paper to glass.

After the peel tests were complete, two of the adhesives (samples TP12-2-3 and TP12-2-4) were observed to completely delaminate from the glass, and the adhesive films remained adhered to the paper. These specimens were separately pressed against paper coupons to yield paper-to-adhesive-to-paper laminates. The paper laminates were then allowed to set for approximately 18 hours and were subsequently peeled apart. The adhesives were qualitatively observed to form strong bonds with the paper, and the paper was observed to cohesively tear in both cases. These results suggest that the adhesives can be alternatively cast onto releasing substrates (e.g., silicone-coated paper) for the purpose of preparing transfer pressure-sensitive adhesives for paper (e.g., to form adhesive-backed paper labels).

TABLE 1

WET COMPOSITIONS OF PLASTICIZED WATER-SOLUBLE PROTEIN-CONTAINING ADHESIVES

| Sample No. | Water-Based Extract Type | Counter-ion Type | Percent Water (%) | Percent Protein Meal Extract + NaOH (%) | Percent Glycerin (%) | Percent GAN Anhydride Polymer (%) | Ratio of Protein/GAN Anhydride (w/w) | Percent Non-volatiles (%) |
|---|---|---|---|---|---|---|---|---|
| TP12-1-1 | 12-1 | Na$^+$ | 89.87 | 3.29 | 5.97 | 0.87 | 3.36/1 | 10.13 |
| TP12-1-2 | 12-1 | Na$^+$ | 88.29 | 3.23 | 7.62 | 0.86 | 3.36/1 | 11.71 |
| TP12-1-3 | 12-1 | Na$^+$ | 85.94 | 3.14 | 10.09 | 0.83 | 3.36/1 | 14.06 |
| TP12-2-1 | 12-2 | Na$^+$ | 89.09 | 3.30 | 6.75 | 0.86 | 3.36/1 | 10.91 |
| TP12-2-2 | 12-2 | Na$^+$ | 88.60 | 3.28 | 7.26 | 0.85 | 3.36/1 | 11.40 |
| TP12-2-3 | 12-2 | Na$^+$ | 85.77 | 3.18 | 10.23 | 0.83 | 3.36/1 | 14.23 |
| TP12-2-4 | 12-2 | Na$^+$ | 84.54 | 3.13 | 11.51 | 0.81 | 3.36/1 | 15.46 |

TABLE 2

DRY COMPOSITIONS OF PLASTICIZED WATER-SOLUBLE PROTEIN-CONTAINING ADHESIVES

| Sample No. | Phr Glycerin (parts per hundred resin) | Percent Protein Meal Extract + NaOH (%) | Percent Glycerin (%) | Percent GAN Anhydride Polymer (%) | Ratio of Protein/GAN Anhydride (w/w) |
|---|---|---|---|---|---|
| TP12-1-1 | 144 | 32.45 | 58.94 | 8.61 | 3.36/1 |
| TP12-1-2 | 187 | 27.58 | 65.11 | 7.31 | 3.36/1 |
| TP12-1-3 | 254 | 22.35 | 71.72 | 5.93 | 3.36/1 |
| TP12-2-1 | 162 | 30.25 | 61.88 | 7.87 | 3.36/1 |
| TP12-2-2 | 176 | 28.80 | 63.71 | 7.49 | 3.36/1 |
| TP12-2-3 | 255 | 22.32 | 71.87 | 5.81 | 3.36/1 |
| TP12-2-4 | 292 | 20.26 | 74.47 | 5.27 | 3.36/1 |

TABLE 3

QUALITATIVE CHARACTERISTICS OF PAPER-TO-GLASS PEEL SPECIMENS AFTER PEEL TESTING.

| Sample No. | Color/Clarity | Glass-to-Adhesive Degree of Delamination | Paper Cohesive Failure | Qualitative Stiffness of Adhesive | Tack of Exposed Adhesive | Re-adhesion After Peel | Phr Glycerin (parts per hundred resin) |
|---|---|---|---|---|---|---|---|
| TP12-1-1 | Transparent/yellow | Remained adhered | Partial; paper fibers near adhesive surface | Highest of group | Low (due to paper fibers on surface) | Low (due to paper fibers) | 144 |
| TP12-1-2 | Transparent/yellow | 80% remained adhered; some transfer to paper (legs) | None; some adhesive transfer to paper | <TP12-1-1 | moderate | Reversible, but lower delamination force | 187 |
| TP12-1-3 | Transparent/yellow | 50% remained adhered; 50% transfer to paper (legs & film-forming) | None | Low; <TP12-1-2; like TP12-2-2 | >TP12-1-1 | Reversible with similar tack and delamination force | 254 |
| TP12-2-1 | Transparent/yellow | Like TP12-1-2 | None | Like TP12-1-2 | Moderate | Reversible with similar tack and delamination force | 162 |
| TP12-2-2 | Transparent/yellow | Remained adhered | Partial; paper fibers near adhesive surface | Like TP12-2-1 | Low (due to paper fibers on surface) | Low (due to paper fibers) | 176 |
| TP12-2-3 | Transparent/yellow | Good adhesion to glass, but slow peel allowed complete transfer to paper | None (adhesive transferred to paper) | <TP12-2-2 | moderate | Reversible with similar tack and delamination force | 255 |

TABLE 3-continued

QUALITATIVE CHARACTERISTICS OF PAPER-TO-GLASS PEEL SPECIMENS AFTER PEEL TESTING.

| Sample No. | Color/ Clarity | Glass-to-Adhesive Degree of Delamination | Paper Cohesive Failure | Qualitative Stiffness of Adhesive | Tack of Exposed Adhesive | Re-adhesion After Peel | Phr Glycerin (parts per hundred resin) |
|---|---|---|---|---|---|---|---|
| TP12-2-4 | Transparent/ yellow | Good adhesion to glass, but slow peel allowed complete transfer to paper | None (adhesive transferred to paper) | <TP12-2-3 | moderate | Reversible with similar tack and delamination force | 292 |

Example 9

Preparation of High-Solids Pressure-Sensitive Adhesives from Water-Soluble Protein Fraction and Anhydride-Functionalized Copolymer High-solids pressure-sensitive adhesives were prepared from an anhydride-functionalized copolymer and water-soluble protein fraction obtained from canola meal. The water-soluble protein fraction was isolated and spray-dried by CanPro Ingredients, Ltd., Arborfield, Saskatchewan, Canada. The CanPro water-soluble protein fraction was mixed with water in the presence and absence of base (1-molal $Ca(OH)_2$) to yield the 50% solids (w/w) mixtures described in Table 1.

TABLE 1

50% (W/W) SOLIDS WATER-SOLUBLE PROTEIN FRACTIONS

| Sample No. | Liquid Carrier | Weight Percent CanPro Water-Soluble Protein Fraction (%) | pH After Mixing |
|---|---|---|---|
| JM1072-1 | 1-molal aqueous $Ca(OH)_2$ | 50 | 6.14 |
| JM1074-5 | JM1072-1 [1-molal aqueous $Ca(OH)_2$) + 1-molal NaOH solution] | 50 | 7.6 |
| JM1074-4 | water | 50 | 6.10 |

The samples from Table 1 were mixed with various Gantrez AN 169 solutions (15%, 20%, and 25% w/w GAN solutions in water) together with glycerin, to yield the wet adhesive compositions described in Table 2. The percentage of non-volatile solids in these formulations was greater than 50% by weight.

The adhesives were cast on glass slides and were dried at 100° C. for 1 hour to yield transparent yellow films (solid compositions are given in Table 3). A first set of the coated glass specimens was qualitatively evaluated for pressure-sensitive tack (under ambient conditions) by touching the samples with a nitrile glove, and then by gauging the relative force of resistance required to pull the glove away. Qualitative tack results are given in Table 4. A second set of the coated glass specimens were pressed together by hand with paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests. The results in Table 5 describe the samples after being subjected to the peel tests. All of the adhesives were observed to bond paper to glass.

After the peel tests were complete, three of the adhesives (JM1077-16, JM1077-13, and JM1077-10) were observed to completely delaminate from the glass, and the adhesive films remained adhered to the paper. These specimens were separately pressed against corrugated cardboard coupons to yield paper-to-adhesive-to-cardboard laminates. The laminates were then allowed to set for approximately 18 hours and were subsequently peeled apart. The adhesives were qualitatively observed to form strong bonds with the substrates.

TABLE 2

WET COMPOSITIONS OF PLASTICIZED HIGH-SOLIDS WATER-SOLUBLE PROTEIN-CONTAINING ADHESIVES

| Sample No. | Water-Based Extract Type | Counter-ion Type | Weight Percent Water (%) | Weight Percent Protein Meal Extract + Base (%) | Weight Percent Glycerin (%) | Weight Percent GAN Anhydride Polymer (%) | Ratio of Protein/ GAN Anhydride (w/w) | Weight Percent Non-volatiles (%) |
|---|---|---|---|---|---|---|---|---|
| JM1077-10 | JM1072-1 | $Ca^{2+}$ | 45.67 | 18.90 | 30.71 | 4.72 | 4.00 | 54.33 |
| JM1077-11 | JM1072-1 | $Ca^{2+}$ | 49.83 | 38.33 | 8.01 | 3.83 | 10.00 | 50.17 |
| JM1077-12 | JM1072-1 | $Ca^{2+}$ | 48.78 | 29.27 | 17.07 | 4.88 | 6.00 | 51.22 |
| JM1077-13 | JM1074-5 | $Ca^{2+}/Na^+$ | 45.67 | 18.90 | 30.71 | 4.72 | 4.00 | 54.33 |
| JM1077-14 | JM1074-5 | $Ca^{2+}/Na^+$ | 49.83 | 38.33 | 8.01 | 3.83 | 10.00 | 50.17 |
| JM1077-15 | JM1074-5 | $Ca^{2+}/Na^+$ | 48.78 | 29.27 | 17.07 | 4.88 | 6.00 | 51.22 |
| JM1077-16 | JM1074-4 | None | 45.67 | 18.90 | 30.71 | 4.72 | 4.00 | 54.33 |
| JM1077-17 | JM1074-4 | None | 49.83 | 38.33 | 8.01 | 3.83 | 10.00 | 50.17 |
| JM1077-18 | JM1074-4 | None | 48.78 | 29.27 | 17.07 | 4.88 | 6.00 | 51.22 |

TABLE 3

DRY COMPOSITIONS OF PLASTICIZED WATER-SOLUBLE PROTEIN-CONTAINING ADHESIVES

| Sample No. | Phr Glycerin (parts per hundred resin) | Weight Percent Protein Meal Extract + base (%) | Weight Percent Glycerin (%) | Weight Percent GAN Anhydride Polymer (%) | Ratio of Protein/GAN Anhydride (w/w) |
|---|---|---|---|---|---|
| JM1077-10 | 130.0 | 34.78 | 56.52 | 8.70 | 4.00 |
| JM1077-11 | 19.0 | 76.39 | 15.97 | 7.64 | 10.00 |
| JM1077-12 | 50.0 | 57.14 | 33.33 | 9.52 | 6.00 |
| JM1077-13 | 130.0 | 34.78 | 56.52 | 8.70 | 4.00 |
| JM1077-14 | 19.0 | 76.39 | 15.97 | 7.64 | 10.00 |
| JM1077-15 | 50.0 | 57.14 | 33.33 | 9.52 | 6.00 |
| JM1077-16 | 130.0 | 34.78 | 56.52 | 8.70 | 4.00 |
| JM1077-17 | 19.0 | 76.39 | 15.97 | 7.64 | 10.00 |
| JM1077-18 | 50.0 | 57.14 | 33.33 | 9.52 | 6.00 |

TABLE 4

QUALITATIVE PRESSURE-SENSITIVE TACK CHARACTERISTICS OF DRY COMPOSITIONS OF PLASTICIZED WATER-SOLUBLE PROTEIN-CONTAINING ADHESIVES

| Qualitative Relative Tack | Phr Glycerin (parts per hundred resin) | Tack Characteristics for Particular Sample Nos. (Arranged from Lowest Tack to Highest Tack in Series) | Ratio of Protein/GAN Anhydride (w/w) |
|---|---|---|---|
| Lowest tack samples | 19 | JM1077-14 < JM1077-11 < JM1077-17 | 10.0 |
| Intermediate tack samples | 50 | JM1077-12 = JM1077-15 = JM1077-18 | 6.0 |
| High tack samples | 130 | JM1077-16 < JM1077-13 < JM1077-10 | 4.0 |

TABLE 5

QUALITATIVE CHARACTERISTICS OF PAPER-TO-GLASS PEEL SPECIMENS AFTER PEEL TESTING.

| Sample No. | Color/Clarity | Glass-to-Adhesive Degree of Delamination | Paper Cohesive Failure | Tack of Exposed Adhesive | Re-adhesion After Peel | Phr Glycerin (parts per hundred resin) |
|---|---|---|---|---|---|---|
| JM1077-10 | Transparent/yellow | Complete peel delamination | none | high | reversible | 130.0 |
| JM1077-11 | Transparent/yellow | Remained adhered | Partial tear; paper fibers near adhesive surface | Low (due to paper fibers on surface) | Low (due to paper fibers) | 19.0 |
| JM1077-12 | Transparent/yellow | Remained adhered | High tear; paper fibers near adhesive surface | Low (due to paper fibers on surface) | Low (due to paper fibers) | 50.0 |
| JM1077-13 | Transparent/yellow | Complete peel delamination | none | high | reversible | 130.0 |
| JM1077-14 | Transparent/yellow | Remained adhered | High tear; paper fibers near adhesive surface | Low (due to paper fibers on surface) | Low (due to paper fibers) | 19.0 |
| JM1077-15 | Transparent/yellow | Partial delamination from glass | Partial tear; paper fibers near adhesive surface | Low (due to paper fibers on surface) | Low (due to paper fibers) | 50.0 |
| JM1077-16 | Transparent/yellow | Complete peel delamination | none | high | reversible | 130.0 |
| JM1077-17 | Transparent/yellow | Remained adhered | High tear; paper fibers near adhesive surface | Low (due to paper fibers on surface) | Low (due to paper fibers) | 19.0 |
| JM1077-18 | Transparent/yellow | Partial delamination from glass | Partial tear; paper fibers near adhesive surface | Low (due to paper fibers on surface) | Low (due to paper fibers) | 50.0 |

The results demonstrate that the identity and quantity of components in the adhesive composition may be selected in order to achieve a particular adhesive response (e.g., a composition having low tack, high tack, low paper tear, or high paper tear, etc.). Features of the adhesive composition that are understood to be important for impacting the adhesive response include, for example, (1) the ratio of protein to GAN (e.g., 10/1, 6/1, and 4/1); (2) the phr of plasticizer (e.g., 19 to 130 phr); and (3) the counter-ion of the base when present (e.g., no counterion, $Na^+$, $Ca^{2+}$, and mixtures of $Na^+$ with $Ca^{2+}$). Moreover, the results demonstrates wet compositions containing greater than 50% non-volatile solids can be used to produce compositions with a range of adhesive responses.

It is contemplated that the above adhesive compositions can be modified to include, for example, additives described in the detailed description above, such as one or more latex polymers and/or tackifiers. In addition, a carboxylic acid containing polymer or a carboxylate salt containing polymer may be used in addition to GAN, or in lieu of GAN. Also, the sodium or calcium cations may be replaced with other metal ions, such as $K^+$, $Mg^{2+}$, $Zn^{2+}$, and $Fe^{2+}$.

Example 10

Preparation of Pressure-Sensitive Adhesives From Water-Soluble Protein Fraction and Sodium Alginate High-solids pressure-sensitive adhesives were prepared with a sodium alginate polymer obtained from Sigma-Aldrich, Inc. (CAS No. 9005-38-3) reacted together with a water-soluble protein fraction obtained from canola meal. The water-soluble protein fraction in this example was isolated and spray-dried by CanPro Ingredients, Ltd., Arborfield, Saskatchewan, Canada. The CanPro water-soluble protein fraction was mixed with water in the presence and absence of base (1-molal $Ca(OH)_2$ with and without NaOH) to yield the 50% solids (w/w) solution mixtures described in Table 1. A separate solution was prepared containing urea.

TABLE 1

50% (W/W) SOLIDS WATER-SOLUBLE PROTEIN FRACTIONS

| Sample No. | Liquid Carrier | Weight Percent CanPro Water-Soluble Protein Fraction (%) | pH After Mixing |
|---|---|---|---|
| JM1072-1 | 1-molal aqueous $Ca(OH)_2$ | 50 | 6.14 |
| JM1074-5 | JM1072-1 [1-molal aqueous $Ca(OH)_2$) + 1-molal NaOH solution] | 50 | 7.6 |
| JM1074-4 | water | 50 | 6.10 |
| JM-1086-1 | 10% Urea solution | 50 | 6.14 |

Samples from Table 1 were mixed with various sodium alginate solutions (10% and w/w) together with glycerin, to yield the wet adhesive compositions described in Table 2. The percentage of non-volatile solids in these formulations was greater than 52% by weight.

The adhesives were cast on glass slides and were dried at 100° C. for 1 hour to yield transparent yellow films (solid compositions are given in Table 3). A first set of coated glass specimens was qualitatively evaluated for pressure-sensitive tack (under ambient conditions) by touching the samples with a nitrile glove, and then by gauging the relative force of resistance required to pull the glove away. Qualitative tack results are given in Table 4. second set of coated glass specimens were pressed together by hand with paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests.

The results in Table 5 describe the samples after being subjected to the peel tests. All of the adhesives were observed to bond paper to glass.

TABLE 2

WET COMPOSITIONS OF PLASTICIZED HIGH-SOLIDS WATER-SOLUBLE PROTEIN-CONTAINING ADHESIVES

| Sample No. | Water-Based Extract Type | Counter-ion Type or Base | Weight Percent Water (%) | Weight Percent Protein Meal Extract + Base (%) | Weight Percent Glycerin (%) | Weight Percent Na-Alginate Polymer (%) | Ratio of Protein/Na-Alginate (w/w) | Weight Percent Non-volatiles (%) |
|---|---|---|---|---|---|---|---|---|
| JM1083-1 | JM-1072-1 | $Ca^{2+}$ | 45.81 | 19.09 | 30.39 | 4.72 | 4.05 | 54.19 |
| JM-1083-2 | JM-1074-5 | $Ca^{2+}$/Na | 45.50 | 18.85 | 30.95 | 4.70 | 4.01 | 54.50 |
| JM-1083-3 | JM-1074-4 | None | 45.51 | 18.89 | 30.90 | 4.70 | 4.02 | 54.49 |
| JM-1086-2 | JM-1086-1 | Urea | 47.27 | 18.88 | 30.71 | 3.15 | 5.99 | 52.74 |
| JM-1086-3 | JM-1086-1 | Urea | 45.69 | 18.84 | 30.74 | 4.74 | 3.98 | 54.31 |

TABLE 3

DRY COMPOSITIONS OF PLASTICIZED WATER-SOLUBLE PROTEIN-CONTAINING ADHESIVES

| Sample No. | Phr Glycerin (parts per hundred resin) | Weight Percent Protein Meal Extract + base (%) | Weight Percent Glycerin (%) | Weight Percent Na-Alginate Polymer (%) | Ratio of Protein/Na-Alginate (w/w) |
| --- | --- | --- | --- | --- | --- |
| JM-1083-1 | 127.7 | 35.22 | 56.08 | 8.70 | 4.05 |
| JM-1083-2 | 131.4 | 34.58 | 56.78 | 8.63 | 4.01 |
| JM-1083-3 | 131.0 | 34.67 | 56.71 | 8.62 | 4.02 |
| JM-1086-2 | 139.4 | 35.80 | 58.22 | 5.98 | 5.99 |
| JM-1086-3 | 130.4 | 34.68 | 56.59 | 8.72 | 3.98 |

TABLE 4

QUALITATIVE PRESSURE-SENSITIVE TACK CHARACTERISTICS OF DRY COMPOSITIONS OF PLASTICIZED WATER-SOLUBLE PROTEIN-CONTAINING ADHESIVES

| Qualitative Relative Tack | Tack Characteristics for Particular Sample Nos. (Arranged from Lowest Tack to Highest Tack in Series) | Weight Ratio of Protein to Na-Alginate |
| --- | --- | --- |
| Highest relative tack group; all similar to one another | 1083-1 = 1083-2 = 1083-3 | ~4 |
| Lower relative tack group | 1086-3 < 1086-2 < 1083-1 = 1083-2 = 1083-3 | ~6 |

TABLE 5

QUALITATIVE CHARACTERISTICS OF PAPER-TO-GLASS PEEL SPECIMENS AFTER PEEL TESTING

| Sample No. | Color/Clarity | Glass-to-Adhesive Degree of Delamination | Paper Cohesive Failure | Tack of Exposed Adhesive | Re-adhesion After Peel | Phr Glycerin (parts per hundred resin) |
| --- | --- | --- | --- | --- | --- | --- |
| JM-1083-1 | Transparent/Yellow-Brown | Remained adhered | Partial tear; paper fibers near adhesive surface | Low (due to paper fibers on surface) | Low (due to paper fibers) | 127.7 |
| JM-1083-2 | Transparent/Yellow-Brown | Remained adhered | Partial tear; paper fibers near adhesive surface | Low (due to paper fibers on surface) | Low (due to paper fibers) | 131.4 |
| JM-1083-3 | Transparent/Yellow-Brown | Remained adhered | Partial tear; paper fibers near adhesive surface | Low (due to paper fibers on surface) | Low (due to paper fibers) | 131.0 |
| JM-1086-2 | Transparent/Yellow-Brown | Remained adhered | Partial tear; paper fibers near adhesive surface | Low (due to paper fibers on surface) | Low (due to paper fibers) | 139.4 |
| JM-1086-3 | Transparent/Yellow-Brown | Remained adhered | Partial tear; paper fibers near adhesive surface | Low (due to paper fibers on surface) | Low (due to paper fibers) | 130.4 |

The results demonstrate that combinations of a carboxylate-salt functionalized polymer and water-soluble protein fraction can be used to produce a composition having adhesive tack. In addition, this example demonstrates that urea may be used to modulate the pH of the composition.

Example 11

Preparation of Pressure-Sensitive Adhesives From Water-Soluble Protein Fraction and Anhydride-Functionalized Copolymer With a Latex Polymer High-solids pressure-sensitive adhesives were prepared with an EVA latex (a carboxylated vinyl acetate-ethylene terpolymer stabilized with poly-(vinyl alcohol), commercially known as VINNAPAS 426® from Wacker Chemical Corp.; 63% solids by weight and formerly known as AIRFLEX 426® from Air Products, Inc.) and an anhydride-functionalized copolymer reacted together with a water-soluble protein fraction obtained from canola meal. The water-soluble protein fraction in this example was isolated and spray-dried by CanPro Ingredients, Ltd., Arborfield, Saskatchewan, Canada. The CanPro water-soluble protein fraction was mixed with water in the presence and absence of base (1-molal Ca(OH)$_2$ with and without NaOH) to yield the 50% solids (w/w) solution mixtures described in Table 1. A separate solution was prepared with urea.

TABLE 1

50% (W/W) SOLIDS WATER-SOLUBLE PROTEIN FRACTIONS

| Sample No. | Liquid Carrier | Weight Percent CanPro Water-Soluble Protein Fraction (%) | pH After Mixing |
|---|---|---|---|
| JM1072-1 | 1-molal aqueous Ca(OH)$_2$ | 50% | 6.14 |
| JM1074-5 | JM1072-1 (1-molal aqueous Ca(OH)$_2$) + 1-molal NaOH solution | 50% | 7.6 |

TABLE 1-continued

50% (W/W) SOLIDS WATER-SOLUBLE PROTEIN FRACTIONS

| Sample No. | Liquid Carrier | Weight Percent CanPro Water-Soluble Protein Fraction (%) | pH After Mixing |
|---|---|---|---|
| JM1074-4 | water | 50% | 6.10 |
| JM-1086-1 | 10% Urea solution | 50% | 6.14 |

Samples from Table-1 were mixed with a Gantrez AN 169 solution (15% w/w GAN in water) together with glycerin and a carboxylic acid functionalized EVA terpolymer latex (Vinnapas 426) to yield the wet adhesive compositions described in Table 2. The percentage of non-volatile solids in these formulations was greater than 50% by weight.

The adhesives were cast on glass slides and were dried at 100° C. for 1 hour to yield transparent yellow films (solid compositions are given in Table 3). A first set of coated glass specimens was qualitatively evaluated for pressure-sensitive tack (under ambient conditions) by touching the samples with a nitrile glove, and then by gauging the relative force of resistance required to pull the glove away. Qualitative tack results are given in Table 4. second set of coated glass specimens were pressed together by hand with paper coupons, and were allowed to set for approximately 18 hours before being subjected to qualitative peel delamination testing. The paper coupons were then partially peeled from the glass to evaluate relative peel characteristics. The samples were then re-adhered by hand, and were subjected to second peel tests.

The results in Table 5 describe the samples after being subjected to the peel tests. All of the adhesives were observed to bond paper to glass.

TABLE 2

WET COMPOSITIONS OF PLASTICIZED HIGH-SOLIDS WATER-SOLUBLE PROTEIN-CONTAINING ADHESIVES WITH EVA LATEX*

| Sample No. (Water-Based Extract Type) | Counter-ion Type or Base | Weight Percent Protein Meal Extract + Base (%) | Weight PercentGAN Anhydride (%) | Weight Percent EVA Latex (solids basis %) | Ratio of Protein/GAN Anhydride (w/w) | Ratio of Protein/(GAN Anhydride + EVA-acid) (w/w) | Weight Percent Non-volatiles (%) |
|---|---|---|---|---|---|---|---|
| TP36-1 (JM1074-4) | none | 23.32 | 2.91 | 13.12 | 8.00 | 1.45 | 52.46 |
| TP36-2 (JM1072-1) | Ca$^{2+}$ | 23.32 | 2.91 | 13.12 | 8.00 | 1.45 | 52.46 |
| TP36-3 (JM1074-5) | Ca$^{2+}$/Na$^+$ | 23.32 | 2.91 | 13.12 | 8.00 | 1.45 | 52.46 |
| TP36-4 (JM1086-1) | Urea | 23.32 | 2.91 | 13.12 | 8.00 | 1.45 | 52.46 |

*All samples contained (i) 13.11% glycerin by weight, and (ii) 47.54% water by weight.

TABLE 3

DRY COMPOSITIONS OF PLASTICIZED WATER-SOLUBLE PROTEIN-CONTAINING ADHESIVES WITH EVA LATEX

| Sample No. | Phr Glycerin (parts per hundred resin) | Weight Percent Protein Meal Extract + base (%) | Weight Percent Glycerin (%) | Weight Percent GAN Anhydride (%) | Weight Percent EVA (%) | Ratio of Protein/GAN Anhydride (w/w) | Ratio of Protein/(GAN Anhydride + EVA-acid) (w/w) |
|---|---|---|---|---|---|---|---|
| TP36-1 | 33.3 | 44.45% | 25.00% | 5.55% | 25.00% | 8.00 | 1.45 |
| TP36-2 | 33.3 | 44.45% | 25.00% | 5.55% | 25.00% | 8.00 | 1.45 |
| TP36-3 | 33.3 | 44.45% | 25.00% | 5.56% | 25.00% | 8.00 | 1.45 |
| TP36-4 | 33.3 | 44.45% | 25.00% | 5.56% | 25.00% | 8.00 | 1.45 |

TABLE 4

QUALITATIVE PRESSURE-SENSITIVE TACK CHARACTERISTICS OF DRY COMPOSITIONS OF PLASTICIZED WATER-SOLUBLE PROTEIN-CONTAINING ADHESIVES WITH EVA LATEX

| Qualitative Relative Tack | Phr Glycerin (parts per hundred resin) | Tack Characteristics for Particular Sample Nos. (Arranged from Lowest Tack to Highest Tack in Series) | Weight Ratio of Protein to GAN Anhydride | Weight Ratio of Protein to (GAN Anhydride + EVA-acid) |
|---|---|---|---|---|
| All samples were similar to one another; relative tack was similar to Intermediate tack samples in Table 4 of Example 9 | 33.3 | TP36-1 = TP36-2 = TP36-3 = TP36-4 | 8.00 | 1.45 |

TABLE 5

QUALITATIVE CHARACTERISTICS OF PAPER-TO-GLASS PEEL SPECIMENS AFTER PEEL TESTING

| Sample No. | Color/Clarity | Glass-to-Adhesive Degree of Delamination | Paper Cohesive Failure | Tack of Exposed Adhesive | Re-adhesion After Peel | Phr Glycerin (parts per hundred resin) |
|---|---|---|---|---|---|---|
| TP36-1 | Transparent/yellow | Remained adhered | High tear; paper fibers near adhesive surface | Low (due to paper fibers on surface) | Low (due to paper fibers) | 33.3 |
| TP36-2 | Transparent/yellow | Remained adhered | High tear; paper fibers near adhesive surface | Low (due to paper fibers on surface) | Low (due to paper fibers) | 33.3 |
| TP36-3 | Transparent/yellow | Remained adhered | High tear; paper fibers near adhesive surface | Low (due to paper fibers on surface) | Low (due to paper fibers) | 33.3 |
| TP36-4 | Transparent/yellow | Remained adhered | High tear; paper fibers near adhesive surface | Low (due to paper fibers on surface) | Low (due to paper fibers) | 33.3 |

The results demonstrate that combinations of an anhydride compound, carboxylic acid functionalized polymer, and water-soluble protein fraction can be used to produce a composition having adhesive tack. The carboxylic acid functionalized polymer (VINNAPAS 426® (formerly Air-Flex-426 from Wacker Chemical Corp)) was provided in the form of a latex. It is understood that the adhesive tack of the composition can be modulated by selecting a latex polymer having a different Tg, using a mixture of latex polymers having different Tg values, and/or adjusting the amount of plasticizer and/or tackifier in the composition.

Example 12

Bleed Test Analysis of Adhesive Formulations

The adhesive formulations as described in Tables 2 and 3 from Example 11 (TP36-1, TP36-2, TP36-3 and TP36-4) were cast as thin films on glass microscope slides using a metal spatula to spread the adhesive on one side of the glass. The coated slides were placed in an oven and dried at 100° C. for 1 hour to yield transparent, yellow, tacky films. Two sets of glass slides were prepared for each adhesive sample.

Using a Hewlett Packard, HP Photosmart 3100 series printer, the phase "BLEED TEST" was printed on Staples Multipurpose 22 lb. (83g/m$^3$), 98 Brightness paper. The phrase "BLEED TEST" was printed three times: once in black font, once in red font, and once in blue font. The HP Photosmart 3100 series uses ink cartridge numbers HP 92 (black) and HP 93 (color). When printed on paper, these inks are susceptible to running, smearing and bleeding into the paper when they come into contact with liquids (e.g., water, glycerin, oils, etc.). These inks are also susceptible to bleeding from contact with adhesive formulations, particularly when the formulation ingredients are capable of migrating through the paper.

Figure 23:
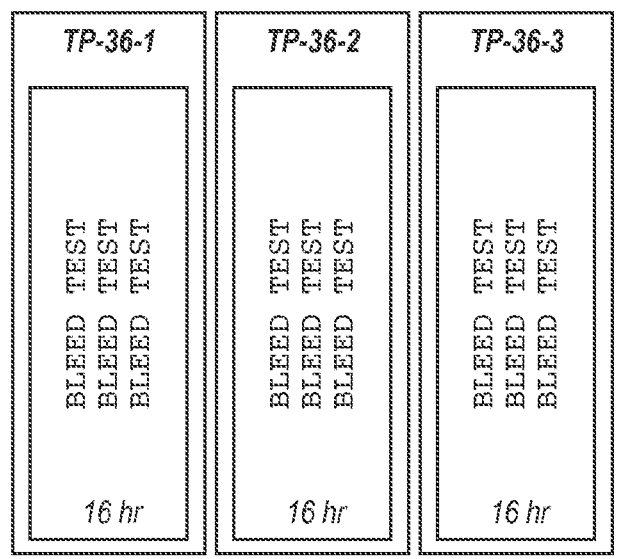
FIG. 23 depicts paper coupons containing the phrase "BLEED TEST" in ink, where the coupons have been pressed by hand onto pre-dried, adhesive-coated glass slides (where the left-most recitation of "BLEED TEST" on each coupon was printed using black ink, the middle recitation of "BLEED TEST" on each coupon was printed using red ink, and the right-most recitation of "BLEED TEST" on each coupon was printed using blue ink), as described in Example 12.

The paper specimens were cut into 2-cm×6-cm coupons, and were printed with the phase "BLEED TEST" in three separate colors (i.e., black, red, and blue as described above). The coupons were then pressed by hand onto the pre-dried, adhesive-coated glass slides, as illustrated in FIG. 23 (where the left-most recitation of "BLEED TEST" on each coupon was printed using black ink, the middle recitation of "BLEED TEST" on each coupon was printed using red ink, and the right-most recitation of "BLEED TEST" on each coupon was printed using blue ink). The two sets of samples were then placed in a 100° C. oven. One set of samples was removed from the oven after 1 hour, and the samples were examined for possible penetration of the adhesive through the paper (as judged by off-white discoloration), and for any signs of smearing or distortion of the printed ink. None of the 1-hour samples showed any signs of adhesive penetration into the paper or blurring/bleeding of the printed words.

The second set of samples remained in the oven for 16 hours. Upon removal from the oven, the 16-hour samples were also examined for possible penetration of the adhesive through the paper and for any smearing or distortion of the printed inks. Like the 1-hour samples, the 16-hour samples showed no signs of adhesive penetration into the paper or blurring/bleeding of the printed words.

All samples were placed on a bench top, and were allowed to remain there for 7 days under ambient laboratory conditions. After 7 days, the samples were re-examined Sample TP36-4 showed evidence of adhesive penetration through the paper and the printed words were observed to bleed. Sample TP36-1 also showed signs of adhesive penetration but not as much as TP36-4. By contrast, samples TP36-2 and TP36-3 showed no sign of adhesive penetration into the paper or blurring/bleeding of the printed words.

The samples were then allowed to remain on the benchtop under ambient laboratory conditions for 21 days. The paper coupons on samples TP36-1 and TP36-4 remained discolored and the words were observed to bleed and smear due to continued adhesive penetration through the paper. On the other hand, samples TP 36-2 and TP 36-3 showed no sign of adhesive penetration into the paper or blurring/bleeding of the printed words.

It is noted that sample TP36-2 contained $Ca^{2+}$ counterions, and sample TP36-3 contained $Ca^{2+}$ and $Na^{1+}$ counterions. In contrast, samples TP36-1 and TP-36-4 did not have $Ca^{2+}$ counterions or $Na^{1+}$ counterions. The bleed test results show that combinations of an anhydride functionalized compound, a carboxylic acid functionalized polymer, and a water-soluble protein fraction can be used to produce an adhesive composition having both good adhesive tack characteristics and good bleed resistance, particularly when the adhesive formulation also incorporates a counterion (e.g., $Ca^{2+}$ or $Na^{1+}$). Such formulations are contemplated for use in the preparation bleed-resistant printed labels for various end-use applications. It is further understood from results of this bleed test that bleed-resistance of the adhesive can be tuned by the selection of components used in the adhesive composition.

Accordingly, experimental results in this Example and other Examples presented herein collectively demonstrate that it is possible to adjust the properties of the adhesive composition by selecting particular components for inclusion in the adhesive composition. For instance, as noted in Example 9, multiple features of the adhesive composition are capable of impacting the adhesive properties including, for example, (1) the ratio of protein to anhydride-functionalized polymer, (2) the phr of the plasticizer; and (3) the counter-ion of the base when present. As noted in Example 6, the water-soluble protein fraction was observed to preferentially react with an anhydride copolymer in the presence of a base. In addition, the presence of a counterion from the base (e.g., $Ca^{2+}$ or $Na^{1+}$) led to the additional formation of carboxylate salts. Importantly, bidentate counterions such as $Ca^{2+}$ can lead to the formation of interchain crosslinking via ionic bridging between carboxylate groups from neighboring polymeric chains. It can be appreciated that these types of reaction products can lead to the formation of adhesive polymers with enhanced properties such as increased toughness, higher cohesive strength, improved moisture resistance, and improved bleed resistance as demonstrated by the present example (the two samples that contained the base counterion exhibited better bleed resistance than analogous samples made without the counterions). As noted in this Example, the presence of sodium or calcium can make the adhesive composition more resistant to bleeding.

In an analogous set of experiments, printed paper coupons were also adhered to glass slides using the sodium alginate-based adhesives from Example 10. Most of these adhesive formulations were prepared with base counterions like those used to prepare the adhesive formulations in Example 11. Like the adhesives from Example 11, none of the sodium alginate-based samples showed signs of penetration into the paper or blurring/bleeding of the printed words after 1 hour or 16 hours in the oven. By contrast however, when the sodium alginate-based samples were aged on a bench top for 7 days under ambient laboratory conditions, all of the sodium alginate samples from Example 10 showed penetration of the adhesive through the paper. This was manifested as a darkening of the paper accompanied by a blurring/bleeding of the ink.

Thus, the use of a counterion with a carboxylate functionalized polymer is not necessarily sufficient to impart bleed resistance. Instead, it is also important to consider the other formulation ingredients that are used in combination with the water-soluble protein fraction. As shown in this comparative example, an anhydride copolymer with a carboxylated EVA latex polymer is favored over the use of sodium alginate polymer alone.

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

We claim:

1. An adhesive composition comprising:
   (a) an isolated water-soluble protein fraction; and
   (b) at least 0.1% (w/w) of a protein-bonding agent selected from the group consisting of a carboxylic acid compound, carboxylate salt compound, and combinations thereof;
   wherein the adhesive composition does not contain a reactive prepolymer.

2. The composition of claim 1, wherein the isolated water-soluble protein fraction comprises one or more of the following features:
   i. an amide-I absorption band between about 1633 $cm^{-1}$ and 1680 $cm^{-1}$, as determined by solid state FTIR;
   ii. an amide-II band between approximately 1522 $cm^{-1}$ and 1560 $cm^{-1}$, as determined by solid state FTIR;
   iii. two prominent 1° amide N—H stretch absorption bands centered at about 3200 $cm^{-1}$, and at about 3300 $cm^{-1}$, as determined by solid state FTIR;
   iv. a prominent cluster of protonated nitrogen nuclei defined by $^{15}N$ chemical shift boundaries at about 94 ppm and at about 100 ppm, and $^1H$ chemical shift boundaries at about 7.6 ppm and at about 8.1 ppm, as determined by solution state, two-dimensional proton-nitrogen coupled NMR;
   v. an average molecular weight of between about 600 and about 2,500 Daltons; or
   vi. an inability to stabilize an oil-in-water emulsion, wherein, when an aqueous solution comprising 14 parts by weight of protein dissolved or dispersed in 86parts by weight of water is admixed with 14 parts by weight of PMDI, the aqueous solution and the PMDI produce an unstable suspension that macroscopically phase separates under static conditions within five minutes after mixing.

3. The composition of claim 1, wherein the isolated water-soluble protein fraction is derived from corn, wheat, sunflower, cotton, rapeseed, canola, castor, soy, camelina, flax, jatropha, mallow, peanuts, algae, sugarcane bagasse, tobacco, whey, or a combination thereof.

4. The composition of claim 3, wherein the composition comprises from about 5% (w/w) to about 50% (w/w) isolated water-soluble protein fraction.

5. The composition of claim 3, wherein the composition comprises from about 2% (w/w) to about 5% (w/w) isolated water-soluble protein fraction.

6. An adhesive composition comprising:
   (a) ground plant meal; and
   (b) at least 0.1% (w/w) of a protein-bonding agent selected from the group consisting of a carboxylic acid compound, carboxylate salt compound, and combinations thereof;
   wherein the adhesive composition does not contain a reactive prepolymer.

7. The composition of claim 1, wherein the composition comprises from 0.1% (w/w) to about 20% (w/w) protein-bonding agent.

8. The composition of claim 1, wherein the composition comprises from 0.1% (w/w) to about 1.5% (w/w) protein-bonding agent.

9. The composition of claim 1, wherein the protein-bonding agent is a carboxylic acid compound.

10. The composition of claim 9, wherein the carboxylic acid compound is a polymer containing at least one carboxylic acid group.

11. The composition of claim 9, wherein the carboxylic acid compound is (i) a polysaccharide containing at least one carboxylic acid group, or (ii) an acrylic acid copolymer.

12. The composition of claim 9, wherein the carboxylic acid compound is alginic acid, carboxymethyl cellulose, poly(sebacic acid), poly(succinic acid), poly(glycolic acid), poly(lactic acid), or a copolymer of lactic acid and glycolic acid.

13. The composition of claim 1, wherein the protein-bonding agent is a carboxylate salt compound.

14. The composition of claim 13, wherein the carboxylate salt compound is a polymer containing at least one carboxylate salt group.

15. The composition of claim 13, wherein the carboxylate salt compound is (i) a polysaccharide containing at least one carboxylate salt group, or (ii) a copolymer comprising an alkylene carboxylate salt.

16. The composition of claim 13, wherein the carboxylate salt compound is a metal salt of alginate.

17. The composition of claim 1, wherein the composition is in the form of a liquid.

18. The composition of claim 1, further comprising water.

19. The composition of claim 1, wherein the composition is in the form of an aqueous dispersion.

20. The adhesive composition of claim 13, wherein the carboxylate salt compound contains at least one $—CO_2^-M^+$ functional group where $M^+$is a metal cation.

21. The adhesive composition of claim 20, wherein the metal cation is selected from the group consisting of an alkali metal cation, an alkaline earth metal cation, a transition metal cation, and combinations thereof.

22. The adhesive composition of claim 20, wherein the metal cation is selected from the group consisting of $Na^+$, $K^+$, $Ca^{2+}$, $Mg^{2+}$, $Zn^{2+}$, $Fe^{2+}$, and combinations thereof, wherein any divalent metal cation is bonded to two carboxylate groups.

23. A solid binder composition formed by curing a composition of claim 1.

24. A method of bonding a first article to a second article comprising:
   (a) depositing on a surface of the first article the adhesive composition of claim 1 thereby to create a binding area; and
   (b) contacting the binding surface with a surface of the second article thereby to bond the first article to the second article.

25. A method of producing a composite material comprising:
   (a) combining a first article and a second article with the adhesive composition of claim 1 to produce a mixture; and
   (b) curing the mixture produced by step (a) to produce the composite material.

26. The method of claim 24, wherein the first article, the second article or both the first and second articles are lignocellulosic materials, or composite materials containing lignocellulosic material.

27. An article produced using the adhesive composition of claim 1.

28. An article comprising two or more components bonded together using the adhesive composition of claim 1.

29. The article of claim 28, wherein the bonded components are selected from the group consisting of paper, wood, glass, metal, fiberglass, wood fiber, ceramic, ceramic powder, plastic, and a combination thereof.

30. The composition of claim 6, wherein the protein-bonding agent is a carboxylic acid compound that is (i) a polysaccharide containing at least one carboxylic acid group, or (ii) an acrylic acid copolymer.

31. The composition of claim 6, wherein the protein-bonding agent is a carboxylic acid compound that is alginic acid, carboxymethyl cellulose, poly(sebacic acid), poly(succinic acid), poly(glycolic acid), poly(lactic acid), or a copolymer of lactic acid and glycolic acid.

32. The composition of claim 6, wherein the protein-bonding agent is a carboxylate salt compound that is (i) a polysaccharide containing at least one carboxylate salt group, or (ii) a copolymer comprising an alkylene carboxylate salt.

33. The composition of claim 6, wherein the protein-bonding agent is a carboxylate salt compound that is a metal salt of alginate.

34. The composition of claim 6, wherein the ground plant meal is derived from corn, wheat, sunflower, cotton, rapeseed, canola, castor, soy, camelina, flax, jatropha, mallow, peanuts, algae, sugarcane bagasse, tobacco, whey, or a combination thereof.

* * * * *